US012638641B2

(12) United States Patent
Isenhour et al.

(10) Patent No.: US 12,638,641 B2
(45) Date of Patent: May 26, 2026

(54) FIBER OPTIC CONNECTORS HAVING ONE OR MORE SECURING BUTTONS WITH SPECIFIC SHAPES

(71) Applicant: Corning Research & Development Corporation, Corning, NY (US)

(72) Inventors: Micah Colen Isenhour, Lincolnton, NC (US); Lukasz Piotr Janasz, Lodz (PL); Michael Wimmer, Berlin (DE)

(73) Assignee: CORNING RESEARCH & DEVELOPMENT CORORATION, Corning, NY (US)

( * ) Notice: Subject to any disclaimer, the term of this patent is extended or adjusted under 35 U.S.C. 154(b) by 518 days.

(21) Appl. No.: 17/992,299

(22) Filed: Nov. 22, 2022

(65) Prior Publication Data

US 2023/0077583 A1      Mar. 16, 2023

Related U.S. Application Data

(63) Continuation of application No. PCT/US2021/032904, filed on May 18, 2021.
(Continued)

(51) Int. Cl.
*G02B 6/38* (2006.01)

(52) U.S. Cl.
CPC ......... *G02B 6/3869* (2013.01); *G02B 6/3873* (2013.01)

(58) Field of Classification Search
CPC ... G02B 6/3869; G02B 6/3873; G02B 6/3887
See application file for complete search history.

(56) References Cited

U.S. PATENT DOCUMENTS 3,074,107 A      1/1963      Kiyoshi et al.
3,532,783 A      10/1970    Pusey et al.
(Continued)

FOREIGN PATENT DOCUMENTS

AU      2006232206 A1    10/2006
CN         1060911 A       5/1992
(Continued)

OTHER PUBLICATIONS

International preliminary report on patentability/IPRP of corresponding PCT international application PCT/US2021/032904 filed May 18, 2021. (Year: 2021).*

(Continued)

*Primary Examiner* — Andrew Jordan
(74) *Attorney, Agent, or Firm* — Michael E. Carroll, Jr.

(57) ABSTRACT

Fiber optic connectors and cable assemblies comprising a retention body with a portion that fits within a connector housing when assembled and is secured to the connector housing using one or more securing buttons are disclosed. The connector housing comprises at least one connector housing aperture and the retention body comprises at least one retention body securing portion for cooperating with the one or more securing buttons when aligned for assembly. The fiber optic connectors disclosed advantageously allow for the termination of a wide variety of fiber optic cables of various shapes and/or construction for different requirements or preferences. Methods for securing the fiber optic connector to a cable for forming a cable assembly are also disclosed.

66 Claims, 17 Drawing Sheets

Related U.S. Application Data

(60) Provisional application No. 63/082,036, filed on Sep. 23, 2020, provisional application No. 63/029,991, filed on May 26, 2020.

(56) References Cited

U.S. PATENT DOCUMENTS

| | | |
|---|---|---|
| 3,792,284 A | 2/1974 | Kaelin |
| 3,912,362 A | 10/1975 | Hudson |
| 4,003,297 A | 1/1977 | Mott |
| 4,077,567 A | 3/1978 | Ginn et al. |
| 4,148,557 A | 4/1979 | Garvey |
| 4,167,303 A | 9/1979 | Bowen et al. |
| 4,168,109 A | 9/1979 | Dumire |
| 4,188,088 A | 2/1980 | Andersen et al. |
| 4,336,977 A | 6/1982 | Monaghan et al. |
| 4,354,731 A | 10/1982 | Mouissie |
| 4,373,777 A | 2/1983 | Borsuk et al. |
| 4,413,880 A | 11/1983 | Forrest et al. |
| 4,423,922 A | 1/1984 | Porter |
| 4,428,645 A * | 1/1984 | Korbelak ............... G02B 6/444 |
| | | 156/502 |
| 4,440,471 A | 4/1984 | Knowles |
| 4,461,537 A | 7/1984 | Raymer et al. |
| 4,515,434 A | 5/1985 | Margolin et al. |
| 4,547,937 A | 10/1985 | Collins |
| 4,560,232 A | 12/1985 | O'Hara |
| 4,615,581 A | 10/1986 | Morimoto |
| 4,634,214 A | 1/1987 | Cannon et al. |
| 4,634,858 A | 1/1987 | Gerdt et al. |
| 4,684,205 A | 8/1987 | Margolin et al. |
| 4,688,200 A | 8/1987 | Poorman et al. |
| 4,690,563 A | 9/1987 | Barton et al. |
| 4,699,458 A | 10/1987 | Ohtsuki et al. |
| 4,705,352 A | 11/1987 | Margolin et al. |
| 4,711,752 A | 12/1987 | Deacon et al. |
| 4,715,675 A | 12/1987 | Kevern et al. |
| 4,723,827 A | 2/1988 | Shaw et al. |
| 4,741,590 A | 5/1988 | Caron |
| 4,763,983 A | 8/1988 | Keith |
| 4,783,137 A | 11/1988 | Kosman et al. |
| 4,842,363 A | 6/1989 | Margolin et al. |
| 4,844,570 A | 7/1989 | Tanabe |
| 4,854,664 A | 8/1989 | Mccartney |
| 4,856,867 A | 8/1989 | Gaylin |
| 4,877,303 A | 10/1989 | Caldwell et al. |
| 4,902,238 A | 2/1990 | Iacobucci |
| 4,913,514 A | 4/1990 | Then |
| 4,921,413 A | 5/1990 | Blew |
| 4,944,568 A | 7/1990 | Danbach et al. |
| 4,960,318 A | 10/1990 | Nilsson et al. |
| 4,961,623 A | 10/1990 | Midkiff et al. |
| 4,964,688 A | 10/1990 | Caldwell et al. |
| 4,979,792 A | 12/1990 | Weber et al. |
| 4,994,134 A | 2/1991 | Knecht et al. |
| 4,995,836 A | 2/1991 | Toramoto |
| 5,007,860 A | 4/1991 | Robinson et al. |
| 5,016,968 A | 5/1991 | Hammond et al. |
| 5,028,114 A | 7/1991 | Krausse et al. |
| 5,058,984 A | 10/1991 | Bulman et al. |
| 5,067,783 A | 11/1991 | Lampert |
| 5,073,042 A | 12/1991 | Mulholland et al. |
| 5,076,656 A | 12/1991 | Briggs et al. |
| 5,085,492 A | 2/1992 | Kelsoe et al. |
| 5,088,804 A | 2/1992 | Grinderslev |
| 5,091,990 A | 2/1992 | Leung et al. |
| 5,095,176 A | 3/1992 | Harbrecht et al. |
| 5,129,023 A | 7/1992 | Anderson et al. |
| 5,131,735 A | 7/1992 | Berkey et al. |
| 5,134,677 A | 7/1992 | Leung et al. |
| 5,136,683 A | 8/1992 | Aoki et al. |
| 5,142,602 A | 8/1992 | Cabato et al. |
| 5,146,519 A | 9/1992 | Miller et al. |
| 5,155,900 A | 10/1992 | Grois et al. |
| 5,162,397 A | 11/1992 | Descamps et al. |
| 5,180,890 A | 1/1993 | Pendergrass et al. |
| 5,189,718 A | 2/1993 | Barrett et al. |
| 5,210,810 A | 5/1993 | Darden et al. |
| 5,212,752 A | 5/1993 | Stephenson et al. |
| 5,214,732 A | 5/1993 | Beard et al. |
| 5,224,187 A | 6/1993 | Davisdon |
| 5,226,832 A | 7/1993 | Dejardin et al. |
| 5,231,685 A | 7/1993 | Hanzawa et al. |
| 5,245,683 A | 9/1993 | Belenkiy et al. |
| 5,263,105 A | 11/1993 | Johnson et al. |
| 5,263,239 A | 11/1993 | Ziemek |
| 5,276,750 A | 1/1994 | Manning |
| 5,313,540 A | 5/1994 | Ueda et al. |
| 5,317,663 A | 5/1994 | Beard et al. |
| 5,321,917 A | 6/1994 | Franklin et al. |
| 5,329,603 A | 7/1994 | Watanabe et al. |
| 5,367,594 A | 11/1994 | Essert et al. |
| 5,371,823 A | 12/1994 | Barrett et al. |
| 5,375,183 A | 12/1994 | Edwards et al. |
| 5,381,494 A | 1/1995 | O'donnell et al. |
| 5,390,269 A | 2/1995 | Palecek et al. |
| 5,390,272 A | 2/1995 | Repta et al. |
| 5,394,494 A | 2/1995 | Jennings et al. |
| 5,394,497 A | 2/1995 | Erdman et al. |
| 5,408,570 A | 4/1995 | Cook et al. |
| 5,416,874 A | 5/1995 | Giebel et al. |
| 5,425,121 A | 6/1995 | Cooke et al. |
| 5,452,388 A | 9/1995 | Rittle et al. |
| 5,519,799 A | 5/1996 | Murakami et al. |
| 5,553,186 A | 9/1996 | Allen |
| 5,557,696 A | 9/1996 | Stein |
| 5,569,050 A | 10/1996 | Lloyd |
| 5,588,077 A | 12/1996 | Woodside |
| 5,600,747 A | 2/1997 | Yamakawa et al. |
| 5,603,631 A | 2/1997 | Kawahara et al. |
| 5,608,828 A | 3/1997 | Coutts et al. |
| 5,631,993 A | 5/1997 | Cloud et al. |
| 5,647,045 A | 7/1997 | Robinson et al. |
| 5,673,346 A | 9/1997 | Wano et al. |
| 5,682,451 A | 10/1997 | Lee et al. |
| 5,694,507 A | 12/1997 | Walles |
| 5,717,801 A * | 2/1998 | Smiley ................. G02B 6/3831 |
| | | 385/60 |
| 5,748,821 A | 5/1998 | Schempp et al. |
| 5,761,359 A | 6/1998 | Chudoba et al. |
| 5,781,681 A | 7/1998 | Manning |
| 5,781,686 A | 7/1998 | Robinson et al. |
| 5,782,892 A | 7/1998 | Castle et al. |
| 5,789,701 A | 8/1998 | Wettengel et al. |
| 5,790,740 A | 8/1998 | Cloud et al. |
| 5,791,918 A | 8/1998 | Pierce |
| 5,796,895 A | 8/1998 | Jennings et al. |
| RE35,935 E | 10/1998 | Cabato et al. |
| 5,818,993 A | 10/1998 | Chudoba et al. |
| 5,857,050 A | 1/1999 | Jiang et al. |
| 5,862,290 A | 1/1999 | Burek et al. |
| 5,867,621 A | 2/1999 | Luther et al. |
| 5,876,071 A | 3/1999 | Aldridge |
| 5,883,999 A | 3/1999 | Cloud et al. |
| 5,884,000 A | 3/1999 | Cloud et al. |
| 5,884,001 A | 3/1999 | Cloud et al. |
| 5,884,002 A | 3/1999 | Cloud et al. |
| 5,884,003 A | 3/1999 | Cloud et al. |
| 5,887,099 A | 3/1999 | Csipkes et al. |
| 5,913,001 A | 6/1999 | Nakajima et al. |
| 5,920,669 A | 7/1999 | Knecht et al. |
| 5,923,804 A | 7/1999 | Rosson |
| 5,925,191 A | 7/1999 | Stein et al. |
| 5,926,596 A | 7/1999 | Edwards et al. |
| 5,960,141 A | 9/1999 | Sasaki et al. |
| 5,961,344 A | 10/1999 | Rosales et al. |
| 5,971,626 A | 10/1999 | Knodell et al. |
| 5,993,070 A | 11/1999 | Tamekuni et al. |
| RE36,592 E | 2/2000 | Giebel et al. |
| 6,030,129 A | 2/2000 | Rosson |
| 6,035,084 A | 3/2000 | Haake et al. |
| 6,045,270 A | 4/2000 | Weiss et al. |
| 6,079,881 A | 6/2000 | Roth |
| 6,094,517 A | 7/2000 | Yuuki |

(56)  References Cited

U.S. PATENT DOCUMENTS

| | | | |
|---|---|---|---|
| 6,108,482 A | 8/2000 | Roth | |
| 6,112,006 A | 8/2000 | Foss | |
| 6,149,313 A * | 11/2000 | Giebel | G02B 6/3885 385/59 |
| 6,151,432 A * | 11/2000 | Nakajima | G02B 6/38875 385/60 |
| RE37,028 E | 1/2001 | Cooke et al. | |
| 6,173,097 B1 | 1/2001 | Throckmorton et al. | |
| 6,179,482 B1 | 1/2001 | Takizawa et al. | |
| 6,188,822 B1 | 2/2001 | Mcalpine et al. | |
| 6,193,421 B1 | 2/2001 | Tamekuni et al. | |
| RE37,079 E | 3/2001 | Stephenson et al. | |
| RE37,080 E | 3/2001 | Stephenson et al. | |
| 6,200,040 B1 | 3/2001 | Edwards et al. | |
| 6,206,579 B1 | 3/2001 | Selfridge et al. | |
| 6,206,581 B1 | 3/2001 | Driscoll et al. | |
| 6,220,762 B1 | 4/2001 | Kanai et al. | |
| 6,224,268 B1 | 5/2001 | Manning et al. | |
| 6,224,270 B1 | 5/2001 | Nakajima et al. | |
| 6,229,944 B1 | 5/2001 | Yokokawa et al. | |
| 6,234,683 B1 | 5/2001 | Waldron et al. | |
| 6,234,685 B1 | 5/2001 | Carlisle et al. | |
| 6,249,628 B1 | 6/2001 | Rutterman et al. | |
| 6,256,438 B1 | 7/2001 | Gimblet | |
| 6,261,006 B1 | 7/2001 | Selfridge | |
| 6,264,374 B1 | 7/2001 | Selfridge et al. | |
| 6,269,214 B1 | 7/2001 | Naudin et al. | |
| 6,287,016 B1 | 9/2001 | Weigel | |
| 6,293,710 B1 | 9/2001 | Lampert et al. | |
| 6,298,190 B2 | 10/2001 | Waldron et al. | |
| 6,304,698 B1 | 10/2001 | Morris | |
| 6,305,849 B1 | 10/2001 | Roehrs et al. | |
| 6,321,013 B1 | 11/2001 | Hardwick et al. | |
| 6,340,249 B1 | 1/2002 | Hayes et al. | |
| 6,356,390 B1 | 3/2002 | Hall, Jr. | |
| 6,356,690 B1 | 3/2002 | Mcalpine et al. | |
| 6,357,929 B1 | 3/2002 | Roehrs et al. | |
| 6,371,660 B1 | 4/2002 | Roehrs et al. | |
| 6,375,363 B1 | 4/2002 | Harrison et al. | |
| 6,379,054 B2 | 4/2002 | Throckmorton et al. | |
| 6,386,891 B1 | 5/2002 | Howard et al. | |
| 6,402,388 B1 | 6/2002 | Imazu et al. | |
| 6,404,962 B1 | 6/2002 | Hardwick et al. | |
| 6,409,391 B1 | 6/2002 | Chang | |
| D460,043 S | 7/2002 | Fan Wong | |
| 6,422,764 B1 | 7/2002 | Marrs et al. | |
| 6,427,035 B1 | 7/2002 | Mahony | |
| 6,428,215 B1 | 8/2002 | Nault | |
| 6,439,780 B1 | 8/2002 | Mudd et al. | |
| 6,443,626 B1 | 9/2002 | Foster | |
| 6,466,725 B2 | 10/2002 | Battey et al. | |
| 6,487,344 B1 | 11/2002 | Naudin et al. | |
| 6,496,641 B1 | 12/2002 | Mahony | |
| 6,501,888 B2 | 12/2002 | Gimblet et al. | |
| 6,522,804 B1 | 2/2003 | Mahony | |
| 6,529,663 B1 | 3/2003 | Parris et al. | |
| 6,533,468 B2 | 3/2003 | Nakajima et al. | |
| 6,536,956 B2 | 3/2003 | Luther et al. | |
| 6,539,147 B1 | 3/2003 | Mahony | |
| 6,540,410 B2 | 4/2003 | Childers et al. | |
| 6,542,652 B1 | 4/2003 | Mahony | |
| 6,542,674 B1 | 4/2003 | Gimblet | |
| 6,546,175 B1 | 4/2003 | Wagman et al. | |
| 6,554,489 B2 | 4/2003 | Kent et al. | |
| 6,579,014 B2 | 6/2003 | Melton et al. | |
| 6,599,026 B1 | 7/2003 | Fahrnbauer et al. | |
| 6,599,027 B2 | 7/2003 | Miyake et al. | |
| 6,614,980 B1 | 9/2003 | Mahony | |
| 6,618,526 B2 | 9/2003 | Jackman et al. | |
| 6,619,697 B2 | 9/2003 | Griffioen et al. | |
| 6,621,964 B2 | 9/2003 | Quinn et al. | |
| 6,625,375 B1 | 9/2003 | Mahony | |
| 6,629,782 B2 | 10/2003 | Mcphee et al. | |
| 6,644,862 B1 | 11/2003 | Berto et al. | |
| 6,648,520 B2 | 11/2003 | Mcdonald et al. | |
| 6,668,127 B1 | 12/2003 | Mahony | |
| 6,672,774 B2 | 1/2004 | Theuerkorn et al. | |
| 6,678,442 B2 | 1/2004 | Gall et al. | |
| 6,678,448 B2 | 1/2004 | Moisel et al. | |
| 6,685,361 B1 | 2/2004 | Rubino et al. | |
| 6,695,489 B2 | 2/2004 | Nault | |
| 6,702,475 B1 | 3/2004 | Giobbio et al. | |
| 6,714,708 B2 | 3/2004 | Mcalpine et al. | |
| 6,714,710 B2 | 3/2004 | Gimblet | |
| 6,729,773 B1 | 5/2004 | Finona et al. | |
| 6,738,555 B1 | 5/2004 | Cooke et al. | |
| 6,748,146 B2 | 6/2004 | Parris | |
| 6,748,147 B2 | 6/2004 | Quinn et al. | |
| 6,771,861 B2 | 8/2004 | Wagner et al. | |
| 6,785,450 B2 | 8/2004 | Wagman et al. | |
| 6,789,950 B1 | 9/2004 | Loder et al. | |
| 6,809,265 B1 | 10/2004 | Gladd et al. | |
| 6,841,729 B2 | 1/2005 | Sakabe et al. | |
| 6,848,838 B2 | 2/2005 | Doss et al. | |
| 6,856,748 B1 | 2/2005 | Elkins et al. | |
| 6,877,906 B2 | 4/2005 | Mizukami et al. | |
| 6,880,219 B2 | 4/2005 | Griffioen et al. | |
| 6,899,467 B2 | 5/2005 | Mcdonald et al. | |
| 6,908,233 B2 | 6/2005 | Nakajima et al. | |
| 6,909,821 B2 | 6/2005 | Ravasio et al. | |
| 6,916,120 B2 | 7/2005 | Zimmel et al. | |
| 6,918,704 B2 | 7/2005 | Marrs et al. | |
| 6,933,441 B2 * | 8/2005 | Fuller | H02G 11/02 174/64 |
| 6,944,387 B2 | 9/2005 | Howell et al. | |
| 6,962,445 B2 | 11/2005 | Zimmel et al. | |
| 6,970,629 B2 | 11/2005 | Lail et al. | |
| 6,983,095 B2 | 1/2006 | Reagan et al. | |
| 7,001,081 B2 | 2/2006 | Cox et al. | |
| 7,011,454 B2 | 3/2006 | Caveney et al. | |
| 7,013,074 B2 | 3/2006 | Battey et al. | |
| 7,025,507 B2 | 4/2006 | De Marchi | |
| 7,033,191 B1 | 4/2006 | Cao | |
| 7,044,650 B1 | 5/2006 | Tran et al. | |
| 7,052,185 B2 | 5/2006 | Rubino et al. | |
| 7,079,734 B2 | 7/2006 | Seddon et al. | |
| 7,088,899 B2 | 8/2006 | Reagan et al. | |
| 7,090,406 B2 | 8/2006 | Melton et al. | |
| 7,090,407 B2 | 8/2006 | Melton et al. | |
| 7,090,409 B2 | 8/2006 | Nakajima et al. | |
| 7,103,255 B2 | 9/2006 | Reagan et al. | |
| 7,103,257 B2 | 9/2006 | Donaldson et al. | |
| 7,104,702 B2 | 9/2006 | Barnes et al. | |
| 7,111,990 B2 | 9/2006 | Melton et al. | |
| 7,113,679 B2 | 9/2006 | Melton et al. | |
| 7,118,283 B2 | 10/2006 | Nakajima et al. | |
| 7,118,284 B2 | 10/2006 | Nakajima et al. | |
| 7,120,347 B2 | 10/2006 | Blackwell et al. | |
| 7,137,742 B2 | 11/2006 | Theuerkorn et al. | |
| 7,146,089 B2 | 12/2006 | Reagan et al. | |
| 7,146,090 B2 | 12/2006 | Vo et al. | |
| 7,150,567 B1 | 12/2006 | Luther et al. | |
| 7,165,893 B2 | 1/2007 | Schmitz | |
| 7,171,102 B2 | 1/2007 | Reagan et al. | |
| 7,178,990 B2 | 2/2007 | Caveney et al. | |
| 7,184,634 B2 | 2/2007 | Hurley et al. | |
| 7,195,403 B2 | 3/2007 | Oki et al. | |
| 7,200,317 B2 | 4/2007 | Reagan et al. | |
| 7,201,518 B2 | 4/2007 | Holmquist | |
| 7,204,644 B2 | 4/2007 | Barnes et al. | |
| 7,213,975 B2 | 5/2007 | Khemakhem et al. | |
| 7,213,980 B2 | 5/2007 | Oki et al. | |
| 7,228,047 B1 | 6/2007 | Szilagyi et al. | |
| 7,232,260 B2 | 6/2007 | Takahashi et al. | |
| 7,236,670 B2 | 6/2007 | Lail et al. | |
| 7,241,056 B1 | 7/2007 | Kuffel et al. | |
| 7,260,301 B2 | 8/2007 | Barth et al. | |
| 7,261,472 B2 | 8/2007 | Suzuki et al. | |
| 7,266,265 B2 | 9/2007 | Gall et al. | |
| 7,266,274 B2 | 9/2007 | Elkins et al. | |
| 7,270,487 B2 | 9/2007 | Billman et al. | |
| 7,277,614 B2 | 10/2007 | Cody et al. | |
| 7,279,643 B2 | 10/2007 | Morrow et al. | |
| 7,292,763 B2 | 11/2007 | Smith et al. | |

(56) References Cited

U.S. PATENT DOCUMENTS

| | | | |
|---|---|---|---|
| 7,302,152 B2 | 11/2007 | Luther et al. | |
| 7,318,677 B2 | 1/2008 | Dye | |
| 7,326,091 B2 | 2/2008 | Nania et al. | |
| 7,330,629 B2 | 2/2008 | Cooke et al. | |
| 7,333,708 B2 | 2/2008 | Blackwell et al. | |
| 7,336,873 B2 | 2/2008 | Lail et al. | |
| 7,341,382 B2 | 3/2008 | Dye | |
| 7,346,256 B2 | 3/2008 | Marrs et al. | |
| 7,349,605 B2 | 3/2008 | Noonan et al. | |
| 7,357,579 B2 | 4/2008 | Feldner | |
| 7,357,582 B2 | 4/2008 | Oki et al. | |
| 7,366,416 B2 | 4/2008 | Ramachandran et al. | |
| 7,394,964 B2 | 7/2008 | Tinucci et al. | |
| 7,397,997 B2 | 7/2008 | Ferris et al. | |
| 7,400,815 B2 | 7/2008 | Mertesdorf et al. | |
| D574,775 S | 8/2008 | Amidon | |
| 7,407,332 B2 | 8/2008 | Oki et al. | |
| 7,428,366 B2 | 9/2008 | Mullaney et al. | |
| 7,444,056 B2 | 10/2008 | Allen et al. | |
| 7,454,107 B2 | 11/2008 | Miller et al. | |
| 7,463,803 B2 | 12/2008 | Cody et al. | |
| 7,467,896 B2 | 12/2008 | Melton et al. | |
| 7,469,091 B2 | 12/2008 | Mullaney et al. | |
| 7,477,824 B2 | 1/2009 | Reagan et al. | |
| 7,480,437 B2 | 1/2009 | Ferris et al. | |
| 7,484,898 B2 | 2/2009 | Katagiyama et al. | |
| 7,485,804 B2 | 2/2009 | Dinh et al. | |
| 7,489,849 B2 | 2/2009 | Reagan et al. | |
| 7,492,996 B2 | 2/2009 | Kowalczyk et al. | |
| 7,497,896 B2 | 3/2009 | Bromet et al. | |
| 7,512,304 B2 | 3/2009 | Gronvall et al. | |
| 7,513,695 B1 * | 4/2009 | Lin | G02B 6/3846 |
| | | | 385/83 |
| 7,520,678 B2 | 4/2009 | Khemakhem et al. | |
| 7,539,387 B2 | 5/2009 | Mertesdorf et al. | |
| 7,539,388 B2 | 5/2009 | Mertesdorf et al. | |
| 7,542,645 B1 | 6/2009 | Hua et al. | |
| 7,559,702 B2 | 7/2009 | Fujiwara et al. | |
| 7,565,055 B2 | 7/2009 | Lu et al. | |
| 7,568,845 B2 | 8/2009 | Caveney et al. | |
| 7,572,065 B2 | 8/2009 | Lu et al. | |
| 7,591,595 B2 | 9/2009 | Lu et al. | |
| 7,614,797 B2 | 11/2009 | Lu et al. | |
| 7,621,675 B1 | 11/2009 | Bradley | |
| 7,627,222 B2 | 12/2009 | Reagan et al. | |
| 7,628,545 B2 | 12/2009 | Cody et al. | |
| 7,628,548 B2 | 12/2009 | Benjamin et al. | |
| 7,641,398 B2 | 1/2010 | O'Riorden et al. | |
| 7,646,958 B1 | 1/2010 | Reagan et al. | |
| 7,653,282 B2 | 1/2010 | Blackwell et al. | |
| 7,654,747 B2 | 2/2010 | Theuerkorn et al. | |
| 7,654,748 B2 | 2/2010 | Kuffel et al. | |
| 7,658,549 B2 | 2/2010 | Elkins et al. | |
| 7,661,995 B2 | 2/2010 | Nania et al. | |
| 7,677,812 B2 | 3/2010 | Castagna et al. | |
| 7,677,814 B2 | 3/2010 | Lu et al. | |
| 7,680,388 B2 | 3/2010 | Reagan et al. | |
| 7,695,197 B2 | 4/2010 | Gurreri | |
| 7,708,476 B2 | 5/2010 | Liu | |
| 7,709,733 B1 | 5/2010 | Plankell | |
| 7,712,971 B2 | 5/2010 | Lee et al. | |
| 7,713,679 B2 | 5/2010 | Ishiduka et al. | |
| 7,722,262 B2 | 5/2010 | Caveney et al. | |
| 7,726,998 B2 | 6/2010 | Siebens | |
| 7,738,759 B2 | 6/2010 | Parikh et al. | |
| 7,740,409 B2 | 6/2010 | Bolton et al. | |
| 7,742,117 B2 | 6/2010 | Lee et al. | |
| 7,742,670 B2 | 6/2010 | Benjamin et al. | |
| 7,744,286 B2 | 6/2010 | Lu et al. | |
| 7,744,288 B2 | 6/2010 | Lu et al. | |
| 7,747,117 B2 | 6/2010 | Greenwood et al. | |
| 7,751,666 B2 | 7/2010 | Parsons et al. | |
| 7,753,596 B2 | 7/2010 | Cox | |
| 7,762,726 B2 | 7/2010 | Lu et al. | |
| 7,785,015 B2 | 8/2010 | Melton et al. | |
| 7,785,019 B2 | 8/2010 | Lewallen et al. | |
| RE41,743 E | 9/2010 | Naudin et al. | |
| 7,802,926 B2 | 9/2010 | Leeman et al. | |
| 7,805,044 B2 | 9/2010 | Reagan et al. | |
| 7,806,599 B2 | 10/2010 | Margolin et al. | |
| 7,811,006 B2 | 10/2010 | Milette et al. | |
| 7,820,090 B2 | 10/2010 | Morrow et al. | |
| 7,844,148 B2 | 11/2010 | Jenkins et al. | |
| 7,844,158 B2 | 11/2010 | Gronvall et al. | |
| 7,844,160 B2 | 11/2010 | Reagan et al. | |
| 7,869,681 B2 | 1/2011 | Battey et al. | |
| RE42,094 E | 2/2011 | Barnes et al. | |
| 7,881,576 B2 | 2/2011 | Melton et al. | |
| 7,889,961 B2 | 2/2011 | Cote et al. | |
| 7,891,882 B2 | 2/2011 | Kuffel et al. | |
| 7,903,923 B2 | 3/2011 | Gronvall et al. | |
| 7,903,925 B2 | 3/2011 | Cooke et al. | |
| 7,918,609 B2 | 4/2011 | Melton et al. | |
| 7,933,517 B2 | 4/2011 | Ye et al. | |
| 7,938,670 B2 | 5/2011 | Nania et al. | |
| 7,941,027 B2 | 5/2011 | Mertesdorf et al. | |
| 7,942,590 B2 | 5/2011 | Lu et al. | |
| 7,959,361 B2 | 6/2011 | Lu et al. | |
| 8,002,476 B2 | 8/2011 | Caveney et al. | |
| 8,002,566 B1 | 8/2011 | Baumann et al. | |
| 8,005,335 B2 | 8/2011 | Reagan et al. | |
| 8,023,793 B2 | 9/2011 | Kowalczyk et al. | |
| 8,025,445 B2 | 9/2011 | Rambow et al. | |
| 8,041,178 B2 | 10/2011 | Lu et al. | |
| 8,052,333 B2 | 11/2011 | Kuffel et al. | |
| 8,055,167 B2 | 11/2011 | Park et al. | |
| 8,083,418 B2 | 12/2011 | Fujiwara et al. | |
| 8,111,966 B2 | 2/2012 | Holmberg et al. | |
| 8,137,002 B2 | 3/2012 | Lu et al. | |
| 8,147,147 B2 | 4/2012 | Khemakhem et al. | |
| 8,157,454 B2 | 4/2012 | Ito et al. | |
| 8,164,050 B2 | 4/2012 | Ford et al. | |
| 8,202,008 B2 | 6/2012 | Lu et al. | |
| 8,213,761 B2 | 7/2012 | Gronvall et al. | |
| 8,218,935 B2 | 7/2012 | Reagan et al. | |
| 8,224,145 B2 | 7/2012 | Reagan et al. | |
| 8,229,263 B2 | 7/2012 | Parris et al. | |
| 8,231,282 B2 | 7/2012 | Kuffel et al. | |
| 8,238,706 B2 | 8/2012 | Kachmar | |
| 8,238,709 B2 | 8/2012 | Solheid et al. | |
| 8,249,450 B2 | 8/2012 | Conner | |
| 8,256,971 B2 | 9/2012 | Caveney et al. | |
| 8,267,596 B2 | 9/2012 | Theuerkorn | |
| 8,272,792 B2 | 9/2012 | Coleman et al. | |
| RE43,762 E | 10/2012 | Smith et al. | |
| 8,301,003 B2 | 10/2012 | de los Santos Campos et al. | |
| 8,301,004 B2 | 10/2012 | Cooke et al. | |
| 8,317,411 B2 | 11/2012 | Fujiwara et al. | |
| 8,348,519 B2 | 1/2013 | Kuffel et al. | |
| 8,363,999 B2 | 1/2013 | Mertesdorf et al. | |
| 8,376,629 B2 | 2/2013 | Cline et al. | |
| 8,376,632 B2 | 2/2013 | Blackburn et al. | |
| 8,402,587 B2 | 3/2013 | Sugita et al. | |
| 8,408,811 B2 | 4/2013 | de Jong et al. | |
| 8,408,816 B2 * | 4/2013 | Fujiwara | G02B 6/3831 |
| | | | 385/88 |
| 8,414,196 B2 | 4/2013 | Lu et al. | |
| 8,439,577 B2 | 5/2013 | Jenkins | |
| 8,465,235 B2 | 6/2013 | Jenkins et al. | |
| 8,466,262 B2 | 6/2013 | Siadak et al. | |
| 8,472,773 B2 | 6/2013 | De Jong | |
| 8,480,312 B2 | 7/2013 | Smith et al. | |
| 8,494,329 B2 | 7/2013 | Nhep et al. | |
| 8,496,384 B2 | 7/2013 | Kuffel et al. | |
| 8,506,173 B2 | 8/2013 | Lewallen et al. | |
| 8,520,996 B2 | 8/2013 | Cowen et al. | |
| 8,534,928 B2 | 9/2013 | Cooke et al. | |
| 8,536,516 B2 | 9/2013 | Ford et al. | |
| 8,556,522 B2 | 10/2013 | Cunningham | |
| 8,573,855 B2 | 11/2013 | Nhep | |
| 8,591,124 B2 | 11/2013 | Griffiths et al. | |
| 8,622,627 B2 | 1/2014 | Elkins et al. | |
| 8,622,634 B2 | 1/2014 | Arnold et al. | |
| 8,634,688 B2 | 1/2014 | Bryon et al. | |

(56)　　　　　References Cited

U.S. PATENT DOCUMENTS

| | | | |
|---|---|---|---|
| 8,635,733 B2 | 1/2014 | Bardzilowski | |
| 8,662,760 B2 | 3/2014 | Cline et al. | |
| 8,668,512 B2 | 3/2014 | Chang | |
| 8,678,668 B2 | 3/2014 | Cooke et al. | |
| 8,687,930 B2 | 4/2014 | Mcdowell et al. | |
| 8,702,324 B2 | 4/2014 | Caveney et al. | |
| 8,714,835 B2 | 5/2014 | Kuffel et al. | |
| 8,727,638 B2 | 5/2014 | Lee et al. | |
| 8,737,837 B2 | 5/2014 | Conner et al. | |
| 8,755,654 B1 | 6/2014 | Danley et al. | |
| 8,755,663 B2 | 6/2014 | Makrides-Saravanos et al. | |
| 8,758,046 B2 | 6/2014 | Pezzetti et al. | |
| 8,764,316 B1 | 7/2014 | Barnette et al. | |
| 8,768,133 B2 | 7/2014 | Bryon et al. | |
| 8,770,861 B2 | 7/2014 | Smith et al. | |
| 8,770,862 B2 | 7/2014 | Lu et al. | |
| D711,320 S | 8/2014 | Yang et al. | |
| 8,798,430 B2 | 8/2014 | Bryon et al. | |
| 8,821,036 B2 | 9/2014 | Shigehara | |
| 8,837,894 B2 | 9/2014 | Holmberg et al. | |
| 8,864,390 B2 | 10/2014 | Chen et al. | |
| 8,870,469 B2 | 10/2014 | Kachmar | |
| 8,879,883 B2 | 11/2014 | Parikh et al. | |
| 8,882,364 B2 | 11/2014 | Busse et al. | |
| 8,917,966 B2 | 12/2014 | Thompson et al. | |
| 8,974,124 B2 | 3/2015 | Chang | |
| 8,992,097 B2 | 3/2015 | Koreeda et al. | |
| 8,998,502 B2 | 4/2015 | Benjamin et al. | |
| 8,998,506 B2 | 4/2015 | Pepin et al. | |
| 9,011,858 B2 | 4/2015 | Siadak et al. | |
| 9,039,293 B2 | 5/2015 | Hill et al. | |
| 9,054,804 B2 * | 6/2015 | McColloch | H04B 10/40 |
| 9,075,205 B2 | 7/2015 | Pepe et al. | |
| 9,081,154 B2 | 7/2015 | Zimmel et al. | |
| 9,146,364 B2 | 9/2015 | Chen et al. | |
| D741,803 S | 10/2015 | Davidson, Jr. | |
| 9,151,906 B2 | 10/2015 | Kobayashi et al. | |
| 9,151,909 B2 | 10/2015 | Chen et al. | |
| 9,158,074 B2 | 10/2015 | Anderson et al. | |
| 9,158,075 B2 | 10/2015 | Benjamin et al. | |
| 9,182,567 B2 | 11/2015 | Mullaney | |
| 9,188,759 B2 | 11/2015 | Conner | |
| 9,207,410 B2 | 12/2015 | Lee et al. | |
| 9,207,421 B2 | 12/2015 | Conner | |
| 9,213,150 B2 | 12/2015 | Matsui et al. | |
| 9,223,106 B2 | 12/2015 | Coan et al. | |
| 9,239,441 B2 | 1/2016 | Melton et al. | |
| 9,268,102 B2 | 2/2016 | Daems et al. | |
| 9,274,286 B2 | 3/2016 | Caveney et al. | |
| 9,279,951 B2 | 3/2016 | Mcgranahan et al. | |
| 9,285,550 B2 | 3/2016 | Nhep et al. | |
| 9,297,974 B2 | 3/2016 | Valderrabano et al. | |
| 9,297,976 B2 | 3/2016 | Hill et al. | |
| 9,310,570 B2 | 4/2016 | Busse et al. | |
| 9,316,791 B2 | 4/2016 | Durrant et al. | |
| 9,322,998 B2 | 4/2016 | Miller | |
| 9,360,640 B2 | 6/2016 | Ishigami et al. | |
| 9,383,539 B2 | 7/2016 | Power et al. | |
| 9,400,364 B2 | 7/2016 | Hill et al. | |
| 9,405,068 B2 | 8/2016 | Graham et al. | |
| 9,417,403 B2 | 8/2016 | Mullaney et al. | |
| 9,423,584 B2 | 8/2016 | Coan et al. | |
| 9,429,732 B2 | 8/2016 | Ahmed et al. | |
| 9,435,969 B2 | 9/2016 | Lambourn et al. | |
| 9,442,257 B2 | 9/2016 | Lu | |
| 9,450,393 B2 | 9/2016 | Thompson et al. | |
| 9,459,412 B2 | 10/2016 | Katoh | |
| 9,470,867 B1 * | 10/2016 | James | G02B 6/44785 |
| 9,482,819 B2 | 11/2016 | Li et al. | |
| 9,482,829 B2 | 11/2016 | Lu et al. | |
| 9,513,444 B2 | 12/2016 | Barnette et al. | |
| 9,513,451 B2 | 12/2016 | Corbille et al. | |
| 9,535,229 B2 | 1/2017 | Ott et al. | |
| 9,541,711 B2 | 1/2017 | Raven et al. | |
| 9,551,842 B2 | 1/2017 | Theuerkorn | |
| 9,557,504 B2 | 1/2017 | Holmberg et al. | |
| 9,581,775 B2 | 2/2017 | Kondo et al. | |
| 9,588,304 B2 | 3/2017 | Durrant et al. | |
| D783,618 S | 4/2017 | Wu et al. | |
| 9,612,407 B2 | 4/2017 | Kobayashi et al. | |
| 9,618,704 B2 | 4/2017 | Dean et al. | |
| 9,618,718 B2 | 4/2017 | Islam | |
| 9,624,296 B2 | 4/2017 | Siadak et al. | |
| 9,625,660 B2 | 4/2017 | Daems et al. | |
| 9,638,871 B2 | 5/2017 | Bund et al. | |
| 9,645,331 B1 | 5/2017 | Kim | |
| 9,645,334 B2 | 5/2017 | Ishii et al. | |
| 9,651,741 B2 | 5/2017 | Isenhour et al. | |
| 9,660,397 B2 * | 5/2017 | Islam | G02B 6/44 |
| 9,664,862 B2 | 5/2017 | Lu et al. | |
| 9,678,285 B2 | 6/2017 | Hill et al. | |
| 9,678,293 B2 | 6/2017 | Coan et al. | |
| 9,684,136 B2 | 6/2017 | Cline et al. | |
| 9,684,138 B2 | 6/2017 | Lu | |
| 9,696,500 B2 | 7/2017 | Barnette et al. | |
| 9,711,868 B2 | 7/2017 | Scheucher | |
| 9,720,193 B2 | 8/2017 | Nishimura | |
| 9,733,436 B2 | 8/2017 | Van Baelen et al. | |
| 9,739,951 B2 | 8/2017 | Busse et al. | |
| 9,762,322 B1 | 9/2017 | Amundson | |
| 9,766,416 B1 | 9/2017 | Kim | |
| 9,772,457 B2 | 9/2017 | Hill et al. | |
| 9,804,343 B2 | 10/2017 | Hill et al. | |
| 9,810,855 B2 | 11/2017 | Cox et al. | |
| 9,810,856 B2 | 11/2017 | Graham et al. | |
| 9,829,658 B2 | 11/2017 | Nishimura | |
| 9,829,668 B2 | 11/2017 | Claessens et al. | |
| 9,851,522 B2 | 12/2017 | Reagan et al. | |
| 9,857,540 B2 | 1/2018 | Ahmed et al. | |
| 9,864,151 B2 | 1/2018 | Lu | |
| 9,878,038 B2 | 1/2018 | Siadak et al. | |
| D810,029 S | 2/2018 | Robert et al. | |
| 9,885,841 B2 | 2/2018 | Pepe et al. | |
| 9,891,391 B2 | 2/2018 | Watanabe | |
| 9,905,933 B2 | 2/2018 | Scheucher | |
| 9,910,224 B2 | 3/2018 | Liu et al. | |
| 9,910,236 B2 | 3/2018 | Cooke et al. | |
| 9,921,375 B2 | 3/2018 | Compton et al. | |
| 9,927,580 B2 | 3/2018 | Bretz et al. | |
| 9,933,582 B1 | 4/2018 | Lin | |
| 9,939,591 B2 | 4/2018 | Mullaney et al. | |
| 9,964,713 B2 | 5/2018 | Barnette et al. | |
| 9,964,715 B2 | 5/2018 | Lu | |
| 9,977,194 B2 | 5/2018 | Waldron et al. | |
| 9,977,198 B2 | 5/2018 | Bund et al. | |
| 9,983,374 B2 | 5/2018 | Li et al. | |
| 9,989,711 B2 | 6/2018 | Ott et al. | |
| 10,007,068 B2 | 6/2018 | Hill et al. | |
| 10,031,302 B2 | 7/2018 | Ji et al. | |
| 10,036,859 B2 | 7/2018 | Daems et al. | |
| 10,038,946 B2 | 7/2018 | Smolorz | |
| 10,042,136 B2 | 8/2018 | Reagan et al. | |
| 10,061,090 B2 | 8/2018 | Coenegracht | |
| 10,061,091 B2 | 8/2018 | Kempeneers et al. | |
| 10,073,224 B2 | 9/2018 | Tong et al. | |
| 10,094,986 B2 | 10/2018 | Barnette et al. | |
| 10,101,538 B2 | 10/2018 | Lu et al. | |
| 10,107,968 B2 | 10/2018 | Tong et al. | |
| 10,109,927 B2 | 10/2018 | Scheucher | |
| 10,114,176 B2 | 10/2018 | Gimblet et al. | |
| 10,126,508 B2 | 11/2018 | Compton et al. | |
| 10,180,541 B2 | 1/2019 | Coenegracht et al. | |
| 10,209,454 B2 | 2/2019 | Isenhour et al. | |
| 10,215,930 B2 | 2/2019 | Mullaney et al. | |
| 10,235,184 B2 | 3/2019 | Walker | |
| 10,261,268 B2 | 4/2019 | Theuerkorn | |
| 10,268,011 B2 | 4/2019 | Courchaine et al. | |
| 10,288,820 B2 | 5/2019 | Coenegracht | |
| 10,288,821 B2 | 5/2019 | Isenhour | |
| 10,317,628 B2 | 6/2019 | Van Baelen et al. | |
| 10,324,263 B2 | 6/2019 | Bund et al. | |
| 10,338,323 B2 | 7/2019 | Lu et al. | |
| 10,353,154 B2 | 7/2019 | Ott et al. | |
| 10,353,156 B2 | 7/2019 | Hill et al. | |

(56)  References Cited

U.S. PATENT DOCUMENTS

| | | | |
|---|---|---|---|
| 10,359,577 | B2 | 7/2019 | Dannoux et al. |
| 10,371,914 | B2 | 8/2019 | Coan et al. |
| 10,379,298 | B2 | 8/2019 | Dannoux et al. |
| 10,386,584 | B2 | 8/2019 | Rosson |
| 10,401,575 | B2 | 9/2019 | Daily et al. |
| 10,401,578 | B2 | 9/2019 | Coenegracht |
| 10,401,584 | B2 | 9/2019 | Coan et al. |
| 10,409,007 | B2 | 9/2019 | Kadar-Kallen et al. |
| 10,422,962 | B2 | 9/2019 | Coenegracht |
| 10,422,970 | B2 | 9/2019 | Holmberg et al. |
| 10,429,593 | B2 | 10/2019 | Baca et al. |
| 10,429,594 | B2 | 10/2019 | Pannoux et al. |
| 10,434,173 | B2 | 10/2019 | Siadak et al. |
| 10,439,295 | B2 | 10/2019 | Scheucher |
| 10,444,442 | B2 | 10/2019 | Takano et al. |
| 10,451,811 | B2 | 10/2019 | Coenegracht et al. |
| 10,451,817 | B2 | 10/2019 | Lu |
| 10,451,830 | B2 | 10/2019 | Szumacher et al. |
| 10,488,597 | B2 | 11/2019 | Parikh et al. |
| 10,495,822 | B2 | 12/2019 | Nhep |
| 10,502,916 | B2 | 12/2019 | Coan et al. |
| 10,520,683 | B2 | 12/2019 | Nhep |
| 10,527,805 | B2 * | 1/2020 | Mizuno ................. G02B 6/4246 |
| 10,539,745 | B2 | 1/2020 | Kamada et al. |
| 10,545,298 | B2 | 1/2020 | Bauco et al. |
| 10,578,821 | B2 | 3/2020 | Ott et al. |
| 10,585,246 | B2 | 3/2020 | Bretz et al. |
| 10,591,678 | B2 | 3/2020 | Mullaney et al. |
| 10,605,998 | B2 | 3/2020 | Rosson |
| 10,606,006 | B2 | 3/2020 | Hill et al. |
| D880,423 | S | 4/2020 | Obata et al. |
| 10,613,278 | B2 | 4/2020 | Kempeneers et al. |
| 10,620,388 | B2 | 4/2020 | Isenhour et al. |
| 10,656,347 | B2 * | 5/2020 | Kato ...................... G02B 6/443 |
| 10,677,998 | B2 | 6/2020 | Van Baelen et al. |
| 10,680,343 | B2 | 6/2020 | Scheucher |
| 10,712,516 | B2 | 7/2020 | Courchaine et al. |
| 10,739,534 | B2 | 8/2020 | Murray et al. |
| 10,746,939 | B2 | 8/2020 | Lu et al. |
| 10,761,274 | B2 | 9/2020 | Pepe et al. |
| 10,782,487 | B2 | 9/2020 | Lu |
| 10,802,236 | B2 | 10/2020 | Kowalczyk et al. |
| 10,830,967 | B2 | 11/2020 | Pimentel et al. |
| 10,830,975 | B2 | 11/2020 | Vaughn et al. |
| 10,852,498 | B2 | 12/2020 | Hill et al. |
| 10,852,499 | B2 | 12/2020 | Cooke et al. |
| 10,859,771 | B2 | 12/2020 | Nhep |
| 10,859,781 | B2 | 12/2020 | Hill et al. |
| 10,921,530 | B2 | 2/2021 | Wong et al. |
| 10,921,531 | B2 | 2/2021 | Wong et al. |
| 10,962,731 | B2 | 3/2021 | Coenegracht |
| 10,976,500 | B2 | 4/2021 | Ott et al. |
| 11,061,191 | B2 | 7/2021 | Van Baelen et al. |
| 11,073,664 | B2 | 7/2021 | Chang et al. |
| 11,105,986 | B2 | 8/2021 | Coenegracht et al. |
| 11,112,567 | B2 | 9/2021 | Higley et al. |
| 11,161,603 | B2 | 11/2021 | Vallart et al. |
| 11,287,576 | B2 * | 3/2022 | Amano ................. G02B 6/262 |
| 11,290,188 | B2 | 3/2022 | Watte et al. |
| 11,467,344 | B2 * | 10/2022 | Lv ......................... G02F 1/0136 |
| 2001/0002220 | A1 | 5/2001 | Throckmorton et al. |
| 2001/0012428 | A1 * | 8/2001 | Nakajima ............ G02B 6/3831 |
| | | | 385/78 |
| 2001/0019654 | A1 | 9/2001 | Waldron et al. |
| 2001/0036342 | A1 | 11/2001 | Knecht et al. |
| 2001/0036345 | A1 | 11/2001 | Gimblet et al. |
| 2002/0012502 | A1 | 1/2002 | Farrar et al. |
| 2002/0062978 | A1 | 5/2002 | Sakabe et al. |
| 2002/0064364 | A1 | 5/2002 | Battey et al. |
| 2002/0076165 | A1 | 6/2002 | Childers et al. |
| 2002/0079697 | A1 | 6/2002 | Griffioen et al. |
| 2002/0081077 | A1 | 6/2002 | Nault |
| 2002/0122634 | A1 | 9/2002 | Miyake et al. |
| 2002/0122653 | A1 | 9/2002 | Donaldson et al. |
| 2002/0131721 | A1 | 9/2002 | Gaio et al. |
| 2002/0159745 | A1 | 10/2002 | Howell et al. |
| 2002/0172477 | A1 | 11/2002 | Quinn et al. |
| 2002/0181893 | A1 | 12/2002 | White et al. |
| 2003/0016440 | A1 | 1/2003 | Zeidan et al. |
| 2003/0031447 | A1 | 2/2003 | Nault |
| 2003/0059181 | A1 | 3/2003 | Jackman et al. |
| 2003/0063866 | A1 | 4/2003 | Melton et al. |
| 2003/0063867 | A1 | 4/2003 | Mcdonald et al. |
| 2003/0063868 | A1 | 4/2003 | Fentress |
| 2003/0063897 | A1 | 4/2003 | Heo |
| 2003/0080555 | A1 | 5/2003 | Griffioen et al. |
| 2003/0086664 | A1 | 5/2003 | Moisel et al. |
| 2003/0094298 | A1 | 5/2003 | Morrow et al. |
| 2003/0099448 | A1 | 5/2003 | Gimblet |
| 2003/0103733 | A1 | 6/2003 | Fleenor et al. |
| 2003/0123813 | A1 | 7/2003 | Ravasio et al. |
| 2003/0128936 | A1 | 7/2003 | Fahrnbauer et al. |
| 2003/0165311 | A1 | 9/2003 | Wagman et al. |
| 2003/0201117 | A1 | 10/2003 | Sakabe et al. |
| 2003/0206705 | A1 | 11/2003 | Mcalpine et al. |
| 2003/0210875 | A1 | 11/2003 | Wagner et al. |
| 2004/0047566 | A1 | 3/2004 | Mcdonald et al. |
| 2004/0052474 | A1 | 3/2004 | Lampert et al. |
| 2004/0057676 | A1 | 3/2004 | Doss et al. |
| 2004/0057681 | A1 | 3/2004 | Quinn et al. |
| 2004/0072454 | A1 | 4/2004 | Nakajima et al. |
| 2004/0076377 | A1 | 4/2004 | Mizukami et al. |
| 2004/0076386 | A1 | 4/2004 | Nechitailo |
| 2004/0086238 | A1 | 5/2004 | Finona et al. |
| 2004/0096162 | A1 | 5/2004 | Kocher et al. |
| 2004/0120662 | A1 | 6/2004 | Lail et al. |
| 2004/0120663 | A1 | 6/2004 | Lail et al. |
| 2004/0157449 | A1 | 8/2004 | Hidaka et al. |
| 2004/0157499 | A1 | 8/2004 | Nania et al. |
| 2004/0206542 | A1 | 10/2004 | Gladd et al. |
| 2004/0223699 | A1 | 11/2004 | Melton et al. |
| 2004/0223720 | A1 | 11/2004 | Melton et al. |
| 2004/0228589 | A1 | 11/2004 | Melton et al. |
| 2004/0240808 | A1 | 12/2004 | Rhoney et al. |
| 2004/0247251 | A1 | 12/2004 | Rubino et al. |
| 2004/0252954 | A1 | 12/2004 | Ginocchio et al. |
| 2004/0262023 | A1 | 12/2004 | Morrow et al. |
| 2005/0019031 | A1 | 1/2005 | Ye et al. |
| 2005/0036744 | A1 | 2/2005 | Caveney et al. |
| 2005/0036786 | A1 | 2/2005 | Ramachandran et al. |
| 2005/0053342 | A1 | 3/2005 | Melton et al. |
| 2005/0054237 | A1 | 3/2005 | Gladd et al. |
| 2005/0084215 | A1 | 4/2005 | Grzegorzewska et al. |
| 2005/0103515 | A1 * | 5/2005 | Fuller ................... H02G 11/02 |
| | | | 174/50 |
| 2005/0105873 | A1 | 5/2005 | Reagan et al. |
| 2005/0123422 | A1 | 6/2005 | Lilie |
| 2005/0129379 | A1 | 6/2005 | Reagan et al. |
| 2005/0163448 | A1 | 7/2005 | Blackwell et al. |
| 2005/0175307 | A1 | 8/2005 | Battey et al. |
| 2005/0180697 | A1 | 8/2005 | De Marchi |
| 2005/0213890 | A1 | 9/2005 | Barnes et al. |
| 2005/0213892 | A1 | 9/2005 | Barnes et al. |
| 2005/0213897 | A1 | 9/2005 | Palmer et al. |
| 2005/0213899 | A1 | 9/2005 | Hurley et al. |
| 2005/0213902 | A1 | 9/2005 | Parsons |
| 2005/0213921 | A1 | 9/2005 | Mertesdorf et al. |
| 2005/0226568 | A1 | 10/2005 | Nakajima et al. |
| 2005/0232550 | A1 | 10/2005 | Nakajima et al. |
| 2005/0232552 | A1 | 10/2005 | Takahashi et al. |
| 2005/0232567 | A1 | 10/2005 | Reagan et al. |
| 2005/0244108 | A1 | 11/2005 | Billman et al. |
| 2005/0271344 | A1 | 12/2005 | Grubish et al. |
| 2005/0281510 | A1 | 12/2005 | Vo et al. |
| 2005/0281514 | A1 | 12/2005 | Oki et al. |
| 2005/0286837 | A1 | 12/2005 | Oki et al. |
| 2005/0286838 | A1 | 12/2005 | Oki et al. |
| 2006/0002668 | A1 | 1/2006 | Lail et al. |
| 2006/0008232 | A1 | 1/2006 | Reagan et al. |
| 2006/0008233 | A1 | 1/2006 | Reagan et al. |
| 2006/0008234 | A1 | 1/2006 | Reagan et al. |
| 2006/0045428 | A1 | 3/2006 | Theuerkorn et al. |
| 2006/0045430 | A1 | 3/2006 | Theuerkorn et al. |
| 2006/0056769 | A1 | 3/2006 | Khemakhem et al. |

(56)     References Cited

U.S. PATENT DOCUMENTS

| 2006/0056770 A1 | 3/2006 | Schmitz |
| 2006/0088247 A1 | 4/2006 | Tran et al. |
| 2006/0093278 A1 | 5/2006 | Elkins et al. |
| 2006/0093303 A1 | 5/2006 | Reagan et al. |
| 2006/0093304 A1 | 5/2006 | Battey et al. |
| 2006/0098932 A1 | 5/2006 | Battey et al. |
| 2006/0120672 A1 | 6/2006 | Cody et al. |
| 2006/0127016 A1 | 6/2006 | Baird et al. |
| 2006/0133748 A1 | 6/2006 | Seddon et al. |
| 2006/0133758 A1 | 6/2006 | Mullaney et al. |
| 2006/0133759 A1 | 6/2006 | Mullaney et al. |
| 2006/0147172 A1 | 7/2006 | Luther et al. |
| 2006/0153503 A1 | 7/2006 | Suzuki et al. |
| 2006/0153517 A1 | 7/2006 | Reagan et al. |
| 2006/0165352 A1 | 7/2006 | Caveney et al. |
| 2006/0171638 A1 | 8/2006 | Dye |
| 2006/0171640 A1 | 8/2006 | Dye |
| 2006/0210750 A1 | 9/2006 | Morrow et al. |
| 2006/0233506 A1 | 10/2006 | Noonan et al. |
| 2006/0257092 A1 | 11/2006 | Lu et al. |
| 2006/0269204 A1 | 11/2006 | Barth et al. |
| 2006/0269208 A1 | 11/2006 | Allen et al. |
| 2006/0280420 A1 | 12/2006 | Blackwell et al. |
| 2006/0283619 A1 | 12/2006 | Kowalczyk et al. |
| 2006/0291787 A1 | 12/2006 | Seddon |
| 2007/0025665 A1 | 2/2007 | Dean et al. |
| 2007/0031100 A1 | 2/2007 | Garcia et al. |
| 2007/0031103 A1 | 2/2007 | Tinucci et al. |
| 2007/0036483 A1 | 2/2007 | Shin et al. |
| 2007/0041732 A1 | 2/2007 | Oki et al. |
| 2007/0047897 A1 | 3/2007 | Cooke et al. |
| 2007/0077010 A1 | 4/2007 | Melton et al. |
| 2007/0098343 A1 | 5/2007 | Miller et al. |
| 2007/0110374 A1 | 5/2007 | Oki et al. |
| 2007/0116413 A1 | 5/2007 | Cox |
| 2007/0127872 A1 | 6/2007 | Caveney et al. |
| 2007/0140642 A1 | 6/2007 | Mertesdorf et al. |
| 2007/0160327 A1 | 7/2007 | Lewallen et al. |
| 2007/0189674 A1 | 8/2007 | Scheibenreif et al. |
| 2007/0237484 A1 | 10/2007 | Reagan et al. |
| 2007/0263961 A1 | 11/2007 | Khemakhem et al. |
| 2007/0286554 A1 | 12/2007 | Kuffel et al. |
| 2008/0019641 A1 | 1/2008 | Elkins et al. |
| 2008/0020532 A1 | 1/2008 | Monfray et al. |
| 2008/0025670 A1 | 1/2008 | Castagna et al. |
| 2008/0044137 A1 | 2/2008 | Luther et al. |
| 2008/0044145 A1 | 2/2008 | Jenkins et al. |
| 2008/0069511 A1 | 3/2008 | Blackwell et al. |
| 2008/0080817 A1 | 4/2008 | Melton et al. |
| 2008/0112681 A1 | 5/2008 | Battey et al. |
| 2008/0131068 A1 | 6/2008 | Mertesdorf et al. |
| 2008/0138016 A1 | 6/2008 | Katagiyama et al. |
| 2008/0138025 A1 | 6/2008 | Reagan et al. |
| 2008/0142228 A1 | 6/2008 | Harvey et al. |
| 2008/0166906 A1 | 7/2008 | Nania et al. |
| 2008/0175541 A1 | 7/2008 | Lu et al. |
| 2008/0175542 A1 | 7/2008 | Lu et al. |
| 2008/0175544 A1 | 7/2008 | Fujiwara et al. |
| 2008/0175546 A1 | 7/2008 | Lu et al. |
| 2008/0175548 A1 | 7/2008 | Knecht et al. |
| 2008/0226252 A1 | 9/2008 | Mertesdorf et al. |
| 2008/0232743 A1 | 9/2008 | Gronvall et al. |
| 2008/0240658 A1 | 10/2008 | Leeman et al. |
| 2008/0260344 A1 | 10/2008 | Smith et al. |
| 2008/0260345 A1 | 10/2008 | Mertesdorf et al. |
| 2008/0264664 A1 | 10/2008 | Dinh et al. |
| 2008/0273837 A1 | 11/2008 | Margolin et al. |
| 2008/0310796 A1 | 12/2008 | Lu |
| 2008/0317415 A1 | 12/2008 | Hendrickson et al. |
| 2009/0003772 A1 | 1/2009 | Lu et al. |
| 2009/0003777 A1 | 1/2009 | Feldner |
| 2009/0034923 A1 | 2/2009 | Miller et al. |
| 2009/0041411 A1 | 2/2009 | Melton et al. |
| 2009/0041412 A1 | 2/2009 | Danley et al. |
| 2009/0060421 A1 | 3/2009 | Parikh et al. |
| 2009/0060423 A1 | 3/2009 | Melton et al. |
| 2009/0067791 A1 | 3/2009 | Greenwood et al. |
| 2009/0067849 A1 | 3/2009 | Oki et al. |
| 2009/0074363 A1 | 3/2009 | Parsons et al. |
| 2009/0074369 A1 | 3/2009 | Bolton et al. |
| 2009/0092360 A1* | 4/2009 | Lin ..................... G02B 6/3846 |
| | | 385/81 |
| 2009/0123115 A1 | 5/2009 | Gronvall et al. |
| 2009/0129729 A1 | 5/2009 | Caveney et al. |
| 2009/0136184 A1 | 5/2009 | Abernathy et al. |
| 2009/0148101 A1 | 6/2009 | Lu et al. |
| 2009/0148102 A1 | 6/2009 | Lu et al. |
| 2009/0148103 A1 | 6/2009 | Lu et al. |
| 2009/0148104 A1 | 6/2009 | Lu et al. |
| 2009/0148118 A1 | 6/2009 | Gronvall et al. |
| 2009/0148120 A1 | 6/2009 | Reagan et al. |
| 2009/0156041 A1 | 6/2009 | Radle |
| 2009/0162016 A1 | 6/2009 | Lu et al. |
| 2009/0185835 A1 | 7/2009 | Park et al. |
| 2009/0190895 A1 | 7/2009 | Reagan et al. |
| 2009/0238531 A1 | 9/2009 | Holmberg et al. |
| 2009/0245737 A1 | 10/2009 | Fujiwara et al. |
| 2009/0245743 A1 | 10/2009 | Cote et al. |
| 2009/0263097 A1 | 10/2009 | Solheid et al. |
| 2009/0297112 A1 | 12/2009 | Mertesdorf et al. |
| 2009/0317039 A1 | 12/2009 | Blazer et al. |
| 2009/0317045 A1 | 12/2009 | Reagan et al. |
| 2010/0008909 A1 | 1/2010 | Siadak et al. |
| 2010/0014813 A1 | 1/2010 | Ito et al. |
| 2010/0014824 A1 | 1/2010 | Lu et al. |
| 2010/0014867 A1 | 1/2010 | Ramanitra et al. |
| 2010/0015834 A1 | 1/2010 | Siebens |
| 2010/0021254 A1 | 1/2010 | Jenkins et al. |
| 2010/0034502 A1 | 2/2010 | Lu et al. |
| 2010/0040331 A1 | 2/2010 | Khemakhem et al. |
| 2010/0040338 A1 | 2/2010 | Sek |
| 2010/0054680 A1 | 3/2010 | Lochkovic et al. |
| 2010/0061685 A1 | 3/2010 | Kowalczyk et al. |
| 2010/0074578 A1 | 3/2010 | Imaizumi et al. |
| 2010/0080516 A1 | 4/2010 | Coleman et al. |
| 2010/0086260 A1 | 4/2010 | Parikh et al. |
| 2010/0086267 A1 | 4/2010 | Cooke et al. |
| 2010/0092129 A1 | 4/2010 | Conner |
| 2010/0092133 A1 | 4/2010 | Conner |
| 2010/0092136 A1 | 4/2010 | Nhep |
| 2010/0092146 A1 | 4/2010 | Conner et al. |
| 2010/0092169 A1 | 4/2010 | Conner et al. |
| 2010/0092171 A1 | 4/2010 | Conner |
| 2010/0129034 A1 | 5/2010 | Kuffel et al. |
| 2010/0144183 A1 | 6/2010 | Nania et al. |
| 2010/0172616 A1 | 7/2010 | Lu et al. |
| 2010/0197222 A1 | 8/2010 | Scheucher |
| 2010/0215321 A1 | 8/2010 | Jenkins |
| 2010/0220962 A1 | 9/2010 | Caveney et al. |
| 2010/0226615 A1 | 9/2010 | Reagan et al. |
| 2010/0232753 A1 | 9/2010 | Parris et al. |
| 2010/0247053 A1 | 9/2010 | Cowen et al. |
| 2010/0266242 A1* | 10/2010 | Lu ..................... G02B 6/3894 |
| | | 385/53 |
| 2010/0266244 A1 | 10/2010 | Lu et al. |
| 2010/0266245 A1 | 10/2010 | Sabo |
| 2010/0272399 A1 | 10/2010 | Griffiths et al. |
| 2010/0284662 A1 | 11/2010 | Reagan et al. |
| 2010/0290741 A1 | 11/2010 | Lu et al. |
| 2010/0303416 A1 | 12/2010 | Danley et al. |
| 2010/0303426 A1 | 12/2010 | Davis |
| 2010/0303427 A1 | 12/2010 | Rambow et al. |
| 2010/0310213 A1 | 12/2010 | Lewallen et al. |
| 2010/0322563 A1 | 12/2010 | Melton et al. |
| 2010/0329625 A1 | 12/2010 | Reagan et al. |
| 2011/0019964 A1 | 1/2011 | Nhep et al. |
| 2011/0033157 A1 | 2/2011 | Drouard |
| 2011/0044588 A1 | 2/2011 | Larson et al. |
| 2011/0047731 A1 | 3/2011 | Sugita et al. |
| 2011/0067452 A1 | 3/2011 | Gronvall et al. |
| 2011/0069932 A1 | 3/2011 | Overton et al. |
| 2011/0108719 A1 | 5/2011 | Ford et al. |
| 2011/0116749 A1 | 5/2011 | Kuffel et al. |
| 2011/0123157 A1 | 5/2011 | Belsan et al. |

(56)             References Cited

U.S. PATENT DOCUMENTS

| | | |
|---|---|---|
| 2011/0123166 A1 | 5/2011 | Reagan et al. |
| 2011/0129185 A1 | 6/2011 | Lewallen et al. |
| 2011/0129186 A1 | 6/2011 | Lewallen et al. |
| 2011/0164854 A1 | 7/2011 | Desard et al. |
| 2011/0222826 A1 | 9/2011 | Blackburn et al. |
| 2011/0229098 A1 | 9/2011 | Abernathy et al. |
| 2011/0262099 A1 | 10/2011 | Castonguay et al. |
| 2011/0262100 A1 | 10/2011 | Reagan et al. |
| 2011/0299814 A1 | 12/2011 | Nakagawa |
| 2011/0305421 A1 | 12/2011 | Caveney et al. |
| 2012/0002925 A1 | 1/2012 | Nakagawa |
| 2012/0008909 A1 | 1/2012 | Mertesdorf et al. |
| 2012/0045179 A1 | 2/2012 | Theuerkorn |
| 2012/0057830 A1 | 3/2012 | Taira et al. |
| 2012/0063724 A1 | 3/2012 | Kuffel et al. |
| 2012/0063729 A1 | 3/2012 | Fujiwara et al. |
| 2012/0106912 A1 | 5/2012 | Mcgranahan et al. |
| 2012/0106913 A1 | 5/2012 | Makrides-Saravanos et al. |
| 2012/0134629 A1 | 5/2012 | Lu et al. |
| 2012/0183268 A1 | 7/2012 | de Montmorillon et al. |
| 2012/0213478 A1 | 8/2012 | Chen et al. |
| 2012/0251060 A1 | 10/2012 | Hurley |
| 2012/0251063 A1 | 10/2012 | Reagan et al. |
| 2012/0252244 A1 | 10/2012 | Elkins et al. |
| 2012/0257858 A1 | 10/2012 | Nhep |
| 2012/0275749 A1 | 11/2012 | Kuffel et al. |
| 2012/0321256 A1 | 12/2012 | Caveney et al. |
| 2013/0004122 A1 | 1/2013 | Kingsbury |
| 2013/0020480 A1 | 1/2013 | Ford et al. |
| 2013/0022317 A1 | 1/2013 | Norris et al. |
| 2013/0034333 A1 | 2/2013 | Holmberg et al. |
| 2013/0051734 A1 | 2/2013 | Shen et al. |
| 2013/0064506 A1 | 3/2013 | Eberle et al. |
| 2013/0094821 A1 | 4/2013 | Logan |
| 2013/0109213 A1 | 5/2013 | Chang |
| 2013/0114930 A1 | 5/2013 | Smith et al. |
| 2013/0136402 A1 | 5/2013 | Kuffel et al. |
| 2013/0170834 A1 | 7/2013 | Cho et al. |
| 2013/0209099 A1 | 8/2013 | Reagan et al. |
| 2013/0236139 A1 | 9/2013 | Chen et al. |
| 2013/0266562 A1 | 10/2013 | Siadak et al. |
| 2013/0315538 A1 | 11/2013 | Kuffel et al. |
| 2014/0016902 A1 | 1/2014 | Pepe et al. |
| 2014/0029897 A1 | 1/2014 | Shimazu et al. |
| 2014/0044397 A1 | 2/2014 | Hikosaka et al. |
| 2014/0050446 A1 | 2/2014 | Chang |
| 2014/0056561 A1 | 2/2014 | Lu et al. |
| 2014/0079356 A1 | 3/2014 | Pepin et al. |
| 2014/0133804 A1 | 5/2014 | Lu et al. |
| 2014/0133806 A1 | 5/2014 | Hill et al. |
| 2014/0133807 A1 | 5/2014 | Katoh |
| 2014/0133808 A1 | 5/2014 | Hill et al. |
| 2014/0153876 A1 | 6/2014 | Dendas et al. |
| 2014/0153878 A1 | 6/2014 | Mullaney |
| 2014/0161397 A1 | 6/2014 | Gallegos et al. |
| 2014/0205257 A1 | 7/2014 | Durrant et al. |
| 2014/0219609 A1 | 8/2014 | Nielson et al. |
| 2014/0219622 A1 | 8/2014 | Coan et al. |
| 2014/0233896 A1 | 8/2014 | Ishigami et al. |
| 2014/0241670 A1 | 8/2014 | Barnette et al. |
| 2014/0241671 A1 | 8/2014 | Koreeda et al. |
| 2014/0241689 A1 | 8/2014 | Bradley et al. |
| 2014/0254987 A1 | 9/2014 | Caveney et al. |
| 2014/0294395 A1 | 10/2014 | Waldron et al. |
| 2014/0314379 A1 | 10/2014 | Lu et al. |
| 2014/0328559 A1 | 11/2014 | Kobayashi et al. |
| 2014/0341511 A1 | 11/2014 | Daems et al. |
| 2014/0348467 A1 | 11/2014 | Cote et al. |
| 2014/0355936 A1 | 12/2014 | Bund et al. |
| 2015/0003787 A1 | 1/2015 | Chen et al. |
| 2015/0003788 A1 | 1/2015 | Chen et al. |
| 2015/0036982 A1 | 2/2015 | Nhep et al. |
| 2015/0110451 A1 | 4/2015 | Blazer et al. |
| 2015/0144883 A1 | 5/2015 | Sendelweck |
| 2015/0153532 A1 | 6/2015 | Holmberg et al. |
| 2015/0168657 A1 | 6/2015 | Islam |
| 2015/0183869 A1 | 7/2015 | Siadak et al. |
| 2015/0185423 A1 | 7/2015 | Matsui et al. |
| 2015/0253527 A1 | 9/2015 | Hill et al. |
| 2015/0253528 A1 | 9/2015 | Corbille et al. |
| 2015/0268423 A1 | 9/2015 | Burkholder et al. |
| 2015/0268434 A1 | 9/2015 | Barnette et al. |
| 2015/0270626 A1 | 9/2015 | Bishop |
| 2015/0286011 A1 | 10/2015 | Nhep |
| 2015/0293310 A1 | 10/2015 | Kanno |
| 2015/0309274 A1 | 10/2015 | Hurley et al. |
| 2015/0316727 A1 | 11/2015 | Kondo et al. |
| 2015/0346435 A1 | 12/2015 | Kato |
| 2015/0346436 A1 | 12/2015 | Pepe et al. |
| 2016/0015885 A1 | 1/2016 | Pananen et al. |
| 2016/0018605 A1 | 1/2016 | Ott et al. |
| 2016/0041346 A1 | 2/2016 | Barnette et al. |
| 2016/0062053 A1 | 3/2016 | Mullaney |
| 2016/0085032 A1 | 3/2016 | Lu et al. |
| 2016/0109671 A1 | 4/2016 | Coan et al. |
| 2016/0116686 A1 | 4/2016 | Durrant et al. |
| 2016/0126667 A1 | 5/2016 | Droesbeke et al. |
| 2016/0131851 A1 | 5/2016 | Theuerkorn |
| 2016/0131857 A1 | 5/2016 | Pimentel et al. |
| 2016/0139346 A1 | 5/2016 | Bund et al. |
| 2016/0154184 A1 | 6/2016 | Bund et al. |
| 2016/0154186 A1 | 6/2016 | Gimblet et al. |
| 2016/0161682 A1 | 6/2016 | Nishimura |
| 2016/0161688 A1 | 6/2016 | Nishimura |
| 2016/0161689 A1 | 6/2016 | Nishimura |
| 2016/0187590 A1 | 6/2016 | Lu |
| 2016/0202431 A1 | 7/2016 | Hill et al. |
| 2016/0209599 A1 | 7/2016 | Van Baelen et al. |
| 2016/0209602 A1 | 7/2016 | Theuerkorn |
| 2016/0209605 A1 | 7/2016 | Lu et al. |
| 2016/0216468 A1 | 7/2016 | Gimblet et al. |
| 2016/0238810 A1 | 8/2016 | Hubbard et al. |
| 2016/0246019 A1 | 8/2016 | Ishii et al. |
| 2016/0249019 A1 | 8/2016 | Westwick et al. |
| 2016/0259133 A1 | 9/2016 | Kobayashi et al. |
| 2016/0259134 A1 | 9/2016 | Daems et al. |
| 2016/0306122 A1 | 10/2016 | Tong et al. |
| 2016/0327754 A1 | 11/2016 | Hill et al. |
| 2016/0349458 A1 | 12/2016 | Murray et al. |
| 2016/0356963 A1 | 12/2016 | Liu et al. |
| 2017/0018875 A1 | 1/2017 | Bauer et al. |
| 2017/0023758 A1 | 1/2017 | Reagan et al. |
| 2017/0038538 A1 | 2/2017 | Isenhour et al. |
| 2017/0045699 A1 | 2/2017 | Coan et al. |
| 2017/0052325 A1 | 2/2017 | Mullaney et al. |
| 2017/0059784 A1 | 3/2017 | Gniadek et al. |
| 2017/0123163 A1 | 5/2017 | Lu et al. |
| 2017/0123165 A1 | 5/2017 | Barnette et al. |
| 2017/0131509 A1 | 5/2017 | Xiao et al. |
| 2017/0139158 A1 | 5/2017 | Coenegracht |
| 2017/0160492 A1 | 6/2017 | Lin et al. |
| 2017/0168248 A1 | 6/2017 | Hayauchi et al. |
| 2017/0168256 A1 | 6/2017 | Reagan et al. |
| 2017/0170596 A1 | 6/2017 | Goossens et al. |
| 2017/0176252 A1 | 6/2017 | Marple et al. |
| 2017/0176690 A1 | 6/2017 | Bretz et al. |
| 2017/0182160 A1 | 6/2017 | Siadak et al. |
| 2017/0212313 A1 | 7/2017 | Elenabaas et al. |
| 2017/0219782 A1 | 8/2017 | Nishimura |
| 2017/0235067 A1 | 8/2017 | Holmberg et al. |
| 2017/0238822 A1 | 8/2017 | Young et al. |
| 2017/0254961 A1 | 9/2017 | Kamada et al. |
| 2017/0254962 A1 | 9/2017 | Mueller-Schlomka et al. |
| 2017/0261696 A1 | 9/2017 | Compton et al. |
| 2017/0261698 A1 | 9/2017 | Compton et al. |
| 2017/0261699 A1 | 9/2017 | Compton et al. |
| 2017/0285275 A1 | 10/2017 | Hill et al. |
| 2017/0285279 A1 | 10/2017 | Daems et al. |
| 2017/0288315 A1 | 10/2017 | Scheucher |
| 2017/0293091 A1 | 10/2017 | Lu et al. |
| 2017/0336587 A1 | 11/2017 | Coan et al. |
| 2017/0343741 A1 | 11/2017 | Coenegracht et al. |
| 2017/0343745 A1 | 11/2017 | Rosson |
| 2017/0351037 A1 | 12/2017 | Watanabe et al. |

(56) References Cited

U.S. PATENT DOCUMENTS

| | | |
|---|---|---|
| 2018/0003902 A1 | 1/2018 | Rosson et al. |
| 2018/0031774 A1 | 2/2018 | Van Baelen et al. |
| 2018/0079569 A1 | 3/2018 | Simpson |
| 2018/0081127 A1 | 3/2018 | Coenegracht |
| 2018/0143386 A1 | 5/2018 | Coan et al. |
| 2018/0151960 A1 | 5/2018 | Scheucher |
| 2018/0180831 A1 | 6/2018 | Blazer et al. |
| 2018/0224610 A1 | 8/2018 | Pimentel et al. |
| 2018/0231726 A1* | 8/2018 | Mizuno ................ G02B 6/4246 |
| 2018/0239094 A1 | 8/2018 | Barnette et al. |
| 2018/0246283 A1 | 8/2018 | Pepe et al. |
| 2018/0259721 A1 | 9/2018 | Bund et al. |
| 2018/0267243 A1 | 9/2018 | Nhep et al. |
| 2018/0267265 A1 | 9/2018 | Zhang et al. |
| 2018/0321448 A1 | 11/2018 | Wu et al. |
| 2018/0329149 A1 | 11/2018 | Mullaney et al. |
| 2018/0348447 A1 | 12/2018 | Nhep et al. |
| 2018/0372962 A1 | 12/2018 | Isenhour et al. |
| 2019/0004251 A1 | 1/2019 | Dannoux et al. |
| 2019/0004252 A1 | 1/2019 | Rosson |
| 2019/0004255 A1 | 1/2019 | Dannoux et al. |
| 2019/0004256 A1 | 1/2019 | Rosson |
| 2019/0004258 A1 | 1/2019 | Dannoux et al. |
| 2019/0011641 A1 | 1/2019 | Isenhour et al. |
| 2019/0014987 A1 | 1/2019 | Sasaki et al. |
| 2019/0018210 A1 | 1/2019 | Coan et al. |
| 2019/0033531 A1 | 1/2019 | Taira et al. |
| 2019/0033532 A1 | 1/2019 | Gimblet et al. |
| 2019/0038743 A1 | 2/2019 | Siadak et al. |
| 2019/0041584 A1 | 2/2019 | Coenegracht et al. |
| 2019/0041585 A1 | 2/2019 | Bretz et al. |
| 2019/0041595 A1 | 2/2019 | Reagan et al. |
| 2019/0058259 A1 | 2/2019 | Scheucher |
| 2019/0107677 A1 | 4/2019 | Coenegracht et al. |
| 2019/0147202 A1 | 5/2019 | Harney |
| 2019/0162910 A1 | 5/2019 | Gurreri |
| 2019/0162914 A1 | 5/2019 | Baca et al. |
| 2019/0170961 A1 | 6/2019 | Coenegracht et al. |
| 2019/0187396 A1 | 6/2019 | Finnegan et al. |
| 2019/0235177 A1 | 8/2019 | Lu et al. |
| 2019/0250338 A1 | 8/2019 | Mullaney et al. |
| 2019/0258010 A1 | 8/2019 | Anderson et al. |
| 2019/0271817 A1 | 9/2019 | Coenegracht |
| 2019/0324217 A1 | 10/2019 | Lu et al. |
| 2019/0339460 A1 | 11/2019 | Dannoux et al. |
| 2019/0339461 A1 | 11/2019 | Dannoux et al. |
| 2019/0339475 A1 | 11/2019 | Takano et al. |
| 2019/0361177 A1 | 11/2019 | Aoshima et al. |
| 2019/0369336 A1 | 12/2019 | Van Baelen et al. |
| 2019/0369345 A1 | 12/2019 | Reagan et al. |
| 2019/0374637 A1 | 12/2019 | Siadak et al. |
| 2020/0003963 A1 | 1/2020 | Iizumi et al. |
| 2020/0012051 A1 | 1/2020 | Coenegracht et al. |
| 2020/0036101 A1 | 1/2020 | Scheucher |
| 2020/0049922 A1 | 2/2020 | Rosson |
| 2020/0057205 A1 | 2/2020 | Dannoux et al. |
| 2020/0057222 A1 | 2/2020 | Dannoux et al. |
| 2020/0057223 A1 | 2/2020 | Dannoux et al. |
| 2020/0057224 A1 | 2/2020 | Dannoux et al. |
| 2020/0057723 A1 | 2/2020 | Chirca et al. |
| 2020/0096705 A1 | 3/2020 | Rosson |
| 2020/0096709 A1 | 3/2020 | Rosson |
| 2020/0096710 A1 | 3/2020 | Rosson |
| 2020/0103599 A1 | 4/2020 | Rosson |
| 2020/0103608 A1 | 4/2020 | Hill et al. |
| 2020/0110229 A1 | 4/2020 | Dannoux et al. |
| 2020/0110234 A1 | 4/2020 | Holmberg et al. |
| 2020/0116949 A1 | 4/2020 | Rosson |
| 2020/0116952 A1 | 4/2020 | Rosson |
| 2020/0116953 A1 | 4/2020 | Rosson |
| 2020/0116954 A1 | 4/2020 | Rosson |
| 2020/0116955 A1 | 4/2020 | Ho et al. |
| 2020/0116958 A1 | 4/2020 | Dannoux et al. |
| 2020/0116962 A1 | 4/2020 | Dannoux et al. |
| 2020/0124805 A1 | 4/2020 | Rosson et al. |
| 2020/0124812 A1 | 4/2020 | Dannoux et al. |
| 2020/0132939 A1 | 4/2020 | Coenegracht et al. |
| 2020/0132941 A1 | 4/2020 | Otsuka et al. |
| 2020/0150356 A1 | 5/2020 | Lu |
| 2020/0174201 A1* | 6/2020 | Cote ................... G02B 6/3885 |
| 2020/0183097 A1 | 6/2020 | Chang et al. |
| 2020/0192042 A1 | 6/2020 | Coan et al. |
| 2020/0209492 A1 | 7/2020 | Rosson |
| 2020/0218017 A1 | 7/2020 | Coenegracht |
| 2020/0225422 A1 | 7/2020 | Van Baelen et al. |
| 2020/0225424 A1 | 7/2020 | Coenegracht |
| 2020/0241211 A1 | 7/2020 | Shonkwiler et al. |
| 2020/0348476 A1 | 11/2020 | Hill et al. |
| 2020/0371306 A1 | 11/2020 | Mosier et al. |
| 2020/0393629 A1 | 12/2020 | Hill et al. |
| 2021/0018688 A1* | 1/2021 | Lv ........................ G02B 27/283 |
| 2021/0109288 A1* | 4/2021 | Amano ................... G02B 6/30 |
| 2021/0132302 A1 | 5/2021 | Wong et al. |
| 2021/0149124 A1 | 5/2021 | Higley et al. |
| 2023/0077583 A1* | 3/2023 | Isenhour ............. G02B 6/3873 |
| | | 385/78 |

FOREIGN PATENT DOCUMENTS

| | | |
|---|---|---|
| CN | 1071012 A | 4/1993 |
| CN | 1213783 A | 4/1999 |
| CN | 1231430 A | 10/1999 |
| CN | 1114839 C | 7/2003 |
| CN | 1646962 A | 7/2005 |
| CN | 1833188 A | 9/2006 |
| CN | 1922523 A | 2/2007 |
| CN | 1985205 A | 6/2007 |
| CN | 101084461 A | 12/2007 |
| CN | 101111790 A | 1/2008 |
| CN | 101195453 A | 6/2008 |
| CN | 201404194 Y | 2/2010 |
| CN | 201408274 Y | 2/2010 |
| CN | 201522561 U | 7/2010 |
| CN | 101806939 A | 8/2010 |
| CN | 101846773 A | 9/2010 |
| CN | 101866034 A | 10/2010 |
| CN | 101939680 A | 1/2011 |
| CN | 201704194 U | 1/2011 |
| CN | 102141655 A | 8/2011 |
| CN | 102346281 A | 2/2012 |
| CN | 202282523 U | 6/2012 |
| CN | 203224645 U | 10/2013 |
| CN | 203396982 U | 1/2014 |
| CN | 103713362 A | 4/2014 |
| CN | 103782209 A | 5/2014 |
| CN | 104007514 A | 8/2014 |
| CN | 104064903 A | 9/2014 |
| CN | 104280830 A | 1/2015 |
| CN | 104603656 A | 5/2015 |
| CN | 104704411 A | 6/2015 |
| CN | 105467529 A | 4/2016 |
| CN | 105492946 A | 4/2016 |
| CN | 105683795 A | 6/2016 |
| CN | 106716205 A | 5/2017 |
| CN | 106873086 A | 6/2017 |
| CN | 110608208 A | 12/2019 |
| CN | 110954996 A | 4/2020 |
| DE | 3537684 A1 | 4/1987 |
| DE | 3737842 C1 | 9/1988 |
| DE | 19805554 A1 | 8/1998 |
| EP | 0012566 A1 | 6/1980 |
| EP | 0026553 A1 | 4/1981 |
| EP | 0122566 A2 | 10/1984 |
| EP | 0130513 A2 | 1/1985 |
| EP | 0244791 A2 | 11/1987 |
| EP | 0462362 A2 | 12/1991 |
| EP | 0468671 A1 | 1/1992 |
| EP | 0469671 A1 | 2/1992 |
| EP | 0547778 A1 | 6/1993 |
| EP | 0547788 A1 | 6/1993 |
| EP | 0762171 A1 | 3/1997 |
| EP | 0782025 A1 | 7/1997 |
| EP | 0855610 A2 | 7/1998 |
| EP | 0856751 A1 | 8/1998 |

(56) References Cited

FOREIGN PATENT DOCUMENTS

| | | | |
|---|---|---|---|
| EP | 0856761 | A1 | 8/1998 |
| EP | 0940700 | A2 | 9/1999 |
| EP | 0949522 | A2 | 10/1999 |
| EP | 0957381 | A1 | 11/1999 |
| EP | 0978746 | A1 | 2/2000 |
| EP | 0997757 | A2 | 5/2000 |
| EP | 1065542 | A1 | 1/2001 |
| EP | 1122566 | A2 | 8/2001 |
| EP | 1243957 | A2 | 9/2002 |
| EP | 1258758 | A2 | 11/2002 |
| EP | 1391762 | A1 | 2/2004 |
| EP | 1431786 | A2 | 6/2004 |
| EP | 1438622 | A2 | 7/2004 |
| EP | 1678537 | A1 | 7/2006 |
| EP | 1759231 | A1 | 3/2007 |
| EP | 1810062 | A1 | 7/2007 |
| EP | 2069845 | A2 | 6/2009 |
| EP | 2149063 | A1 | 2/2010 |
| EP | 2150847 | A1 | 2/2010 |
| EP | 2193395 | A1 | 6/2010 |
| EP | 2255233 | A1 | 12/2010 |
| EP | 2333597 | A2 | 6/2011 |
| EP | 2362253 | A1 | 8/2011 |
| EP | 2401641 | A1 | 1/2012 |
| EP | 2609458 | A1 | 7/2013 |
| EP | 2622395 | A1 | 8/2013 |
| EP | 2734879 | A1 | 5/2014 |
| EP | 2815259 | A1 | 12/2014 |
| EP | 2817667 | A1 | 12/2014 |
| EP | 2992372 | A1 | 3/2016 |
| EP | 3022596 | A1 | 5/2016 |
| EP | 3064973 | A2 | 9/2016 |
| EP | 3101740 | A1 | 12/2016 |
| EP | 3207223 | A1 | 8/2017 |
| EP | 3234672 | A1 | 10/2017 |
| EP | 3245545 | A1 | 11/2017 |
| EP | 3265859 | A1 | 1/2018 |
| EP | 3336992 | A1 | 6/2018 |
| EP | 3362830 | A1 | 8/2018 |
| EP | 3427096 | A1 | 1/2019 |
| EP | 3443395 | A1 | 2/2019 |
| EP | 3535614 | A1 | 9/2019 |
| EP | 3537197 | A1 | 9/2019 |
| EP | 3646074 | A1 | 5/2020 |
| EP | 3646079 | A1 | 5/2020 |
| EP | 3403125 | B1 | 7/2021 |
| ES | 1184287 | U | 5/2017 |
| FR | 2485754 | A1 | 12/1981 |
| GB | 2022284 | A | 12/1979 |
| GB | 2154333 | A | 9/1985 |
| GB | 2169094 | A | 7/1986 |
| JP | 52-030447 | A | 3/1977 |
| JP | 58-142308 | A | 8/1983 |
| JP | 61-145509 | A | 7/1986 |
| JP | 62-054204 | A | 3/1987 |
| JP | 63-020111 | A | 1/1988 |
| JP | 63-078908 | A | 4/1988 |
| JP | 63-089421 | A | 4/1988 |
| JP | 03-063615 | A | 3/1991 |
| JP | 03-207223 | A | 9/1991 |
| JP | 05-106765 | A | 4/1993 |
| JP | 05-142439 | A | 6/1993 |
| JP | 05-297246 | A | 11/1993 |
| JP | 06-320111 | A | 11/1994 |
| JP | 07-318758 | A | 12/1995 |
| JP | 08-050211 | A | 2/1996 |
| JP | 08-054522 | A | 2/1996 |
| JP | 08-062432 | A | 3/1996 |
| JP | 08-292331 | A | 11/1996 |
| JP | 09-049942 | A | 2/1997 |
| JP | 09-135526 | A | 5/1997 |
| JP | 09-159867 | A | 6/1997 |
| JP | 09-203831 | A | 8/1997 |
| JP | 09-325223 | A | 12/1997 |
| JP | 09-325249 | A | 12/1997 |
| JP | 10-170781 | A | 6/1998 |
| JP | 10-332953 | A | 12/1998 |
| JP | 10-339826 | A | 12/1998 |
| JP | 11-064682 | A | 3/1999 |
| JP | 11-119064 | A | 4/1999 |
| JP | 11-248979 | A | 9/1999 |
| JP | 11-271582 | A | 10/1999 |
| JP | 11-281861 | A | 10/1999 |
| JP | 11-326693 | A | 11/1999 |
| JP | 11-337768 | A | 12/1999 |
| JP | 11-352368 | A | 12/1999 |
| JP | 2000-002828 | A | 1/2000 |
| JP | 2001-116968 | A | 4/2001 |
| JP | 2001-290051 | A | 10/2001 |
| JP | 2002-520987 | A | 7/2002 |
| JP | 3296698 | B2 | 7/2002 |
| JP | 2002-250987 | A | 9/2002 |
| JP | 2003-009331 | A | 1/2003 |
| JP | 2003-070143 | A | 3/2003 |
| JP | 2003-121699 | A | 4/2003 |
| JP | 2003-177279 | A | 6/2003 |
| JP | 2003-302561 | A | 10/2003 |
| JP | 2004-361521 | A | 12/2004 |
| JP | 2005-024789 | A | 1/2005 |
| JP | 2005-031544 | A | 2/2005 |
| JP | 2005-077591 | A | 3/2005 |
| JP | 2005-114860 | A | 4/2005 |
| JP | 2005-520987 | A | 7/2005 |
| JP | 2006-023502 | A | 1/2006 |
| JP | 2006-146084 | A | 6/2006 |
| JP | 2006-259631 | A | 9/2006 |
| JP | 2006-337637 | A | 12/2006 |
| JP | 2007-078740 | A | 3/2007 |
| JP | 2007-121859 | A | 5/2007 |
| JP | 2008-191422 | A | 8/2008 |
| JP | 2008-250360 | A | 10/2008 |
| JP | 2009-265208 | A | 11/2009 |
| JP | 2010-152084 | A | 7/2010 |
| JP | 2010-191420 | A | 9/2010 |
| JP | 2011-018003 | A | 1/2011 |
| JP | 2011-033698 | A | 2/2011 |
| JP | 2013-041089 | A | 2/2013 |
| JP | 2013-156580 | A | 8/2013 |
| JP | 2014-085474 | A | 5/2014 |
| JP | 2014-095834 | A | 5/2014 |
| JP | 2014-134746 | A | 7/2014 |
| JP | 5537852 | B2 | 7/2014 |
| JP | 5538328 | B2 | 7/2014 |
| JP | 2014-157214 | A | 8/2014 |
| JP | 2014-219441 | A | 11/2014 |
| JP | 2015-125217 | A | 7/2015 |
| JP | 2016-109816 | A | 6/2016 |
| JP | 2016-109817 | A | 6/2016 |
| JP | 2016-109819 | A | 6/2016 |
| JP | 2016-156916 | A | 9/2016 |
| JP | 3207223 | U | 11/2016 |
| JP | 3207233 | U | 11/2016 |
| KR | 10-2013-0081087 | A | 7/2013 |
| RU | 2402794 | C1 | 10/2010 |
| TW | 222688 | B | 4/1994 |
| WO | 94/25885 | A1 | 11/1994 |
| WO | 98/36304 | A1 | 8/1998 |
| WO | 01/27660 | A2 | 4/2001 |
| WO | 01/92927 | A2 | 12/2001 |
| WO | 01/92937 | A1 | 12/2001 |
| WO | 02/25340 | A1 | 3/2002 |
| WO | 03/36358 | A2 | 5/2003 |
| WO | 2004/061509 | A1 | 7/2004 |
| WO | 2005/045494 | A1 | 5/2005 |
| WO | 2005/066674 | A2 | 7/2005 |
| WO | 2006/009597 | A1 | 1/2006 |
| WO | 2006/052420 | A1 | 5/2006 |
| WO | 2006/113726 | A1 | 10/2006 |
| WO | 2006/123777 | A1 | 11/2006 |
| WO | 2008/027201 | A2 | 3/2008 |
| WO | 2008/029072 | A1 | 3/2008 |
| WO | 2008/150408 | A1 | 12/2008 |
| WO | 2008/150423 | A1 | 12/2008 |
| WO | 2009/042066 | A1 | 4/2009 |

(56)                References Cited

FOREIGN PATENT DOCUMENTS

| | | | |
|---|---|---|---|
| WO | 2009/113819 | A1 | 9/2009 |
| WO | 2009/117060 | A1 | 9/2009 |
| WO | 2009/126411 | A1 | 10/2009 |
| WO | 2009/148797 | A1 | 12/2009 |
| WO | 2009/154990 | A2 | 12/2009 |
| WO | 2010/092009 | A1 | 8/2010 |
| WO | 2010/099141 | A1 | 9/2010 |
| WO | 2011/044090 | A2 | 4/2011 |
| WO | 2011/047111 | A1 | 4/2011 |
| WO | 2012/027313 | A1 | 3/2012 |
| WO | 2012/037727 | A1 | 3/2012 |
| WO | 2012/044741 | A1 | 4/2012 |
| WO | 2012/074688 | A2 | 6/2012 |
| WO | 2012/163052 | A1 | 12/2012 |
| WO | 2013/016042 | A1 | 1/2013 |
| WO | 2013/083729 | A2 | 6/2013 |
| WO | 2013/122752 | A1 | 8/2013 |
| WO | 2013/126488 | A1 | 8/2013 |
| WO | 2013/177016 | A1 | 11/2013 |
| WO | 2014/151259 | A1 | 9/2014 |
| WO | 2014/167447 | A1 | 10/2014 |
| WO | 2014/179411 | A1 | 11/2014 |
| WO | 2014/197894 | A1 | 12/2014 |
| WO | 2015/009435 | A1 | 1/2015 |
| WO | 2015/144883 | A1 | 10/2015 |
| WO | 2015/047508 | A1 | 12/2015 |
| WO | 2015/197588 | A1 | 12/2015 |
| WO | 2016/059320 | A1 | 4/2016 |
| WO | 2016/073862 | A2 | 5/2016 |
| WO | 2016/095213 | A1 | 6/2016 |
| WO | 2016/100078 | A1 | 6/2016 |
| WO | 2016/115288 | A1 | 7/2016 |
| WO | 2016/156610 | A1 | 10/2016 |
| WO | 2016/168389 | A1 | 10/2016 |
| WO | 2017/063107 | A1 | 4/2017 |
| WO | 2017/146722 | A1 | 8/2017 |
| WO | 2017/155754 | A1 | 9/2017 |
| WO | 2017/178920 | A1 | 10/2017 |
| WO | 2018/083561 | A1 | 5/2018 |
| WO | 2018/175123 | A1 | 9/2018 |
| WO | 2018/204864 | A1 | 11/2018 |
| WO | 2019/005190 | A2 | 1/2019 |
| WO | 2019/005191 | A1 | 1/2019 |
| WO | 2019/005192 | A1 | 1/2019 |
| WO | 2019/005193 | A1 | 1/2019 |
| WO | 2019/005194 | A1 | 1/2019 |
| WO | 2019/005195 | A1 | 1/2019 |
| WO | 2019/005196 | A1 | 1/2019 |
| WO | 2019/005197 | A1 | 1/2019 |
| WO | 2019/005198 | A1 | 1/2019 |
| WO | 2019/005199 | A1 | 1/2019 |
| WO | 2019/005200 | A1 | 1/2019 |
| WO | 2019/005201 | A1 | 1/2019 |
| WO | 2019/005202 | A1 | 1/2019 |
| WO | 2019/005203 | A1 | 1/2019 |
| WO | 2019/005204 | A1 | 1/2019 |
| WO | 2019/006176 | A1 | 1/2019 |
| WO | 2019/036339 | A1 | 2/2019 |
| WO | 2019/126333 | A1 | 6/2019 |
| WO | 2019/195652 | A1 | 10/2019 |
| WO | 2020/101850 | A1 | 5/2020 |

OTHER PUBLICATIONS

Translations (2, one annotated, one not) of Chinese patent publication No. 110 954 996 of Yu et al. published Mar. 20, 2004 (Yu, in corresponding PCT international application PCT/US2021/032904) (Year: 2021).*

Brown, "What is Transmission Welding?" Laser Plasti Welding website, 6 pgs, Retrieved on Dec. 17, 2018 from: http://www.laserplasticwelding.com/what-is-transmission-welding.

Clearfield, "Fieldshield Optical Fiber Protection System: Installation Manual." for part No. 016164. Last Updated Dec. 2014. 37 pgs.

Clearfield, "FieldShield SC and LC Pushable Connectors," Last Updated Jun. 1, 2018, 2 pgs.

Clearfield, "FieldShield SmarTerminal: Hardened Pushable Connectors" Last Updated Jun. 29, 2018, 2 pgs.

CoolShirt fittings, https://www.amazon.com/Cool-Shirt-5014-0001-Release-Connectors/dp/B01LXBXYJ9, Sep. 23, 2016 (Year: 2016).

Corning Cable Systems, "SST Figure-8 Drop Cables 1-12 Fibers", Preliminary Product Specifications, 11 pgs. (2002).

Corning Cable Systems, "SST-Drop (armor) Cables 1-12 Fibers", Product Specifications, 2 pgs. (2002).

Corning Cable Systems, "SST-Drop (Dielectric) Cables 1-12 Fibers", Product Specifications, 2 pgs. (2002).

Digital Optical Audio Cable Toslink Cable. Date: Jun. 27, 2019 [online], [Site visited Mar. 2, 2021], Available from Internet URL: https://www.amazon.com/dp/B07TJMP4TP/ (Year: 2019).

Faulkner et al. "Optical networks for local lopp applications," J. Lightwave Technol.0733-8724 7(11), 17411751 (1989).

Fiber Systems International: Fiber Optic Solutions, data, "TFOCA-11 4-Channel Fiber Optic Connector" sheet. 2003, 2 pgs.

Gold Plated Toslink. Date: Feb. 5, 2015. [online], [Site visited Mar. 2, 2021], Available from Internet URL: https://www.amazon.com/dp/B00T8HWV62/ (Year: 2015).

Infolite—Design and Data Specifications, 1 pg. Retrieved Feb. 21, 2019.

Liu et al., "Variable optical power splitters create new apps", Retrieved from: https://www.lightwaveonline.com/fttx/pon-systems/article/16648432/variable-optical-power-splitters-create-new-apps, 2005, 14 pages.

Infolite—Design and Data Specifications, 1 pg. Retrieved Feb. 21, 2019, Duplicated.

Nawata, "Multimode and Single-Mode Fiber Connectors Technology"; IEEE Journal of Quantum Electronics, vol. QE-16, No. 6 Published Jun. 1980.

Ramanitra et al. "Optical access network using a self-latching variable splitter remotely powered through an optical fiber link," Optical Engineering 46(4) p. 45007-1-9, Apr. 2007.

Ratnam et al. "Burst switching using variable optical splitter based switches with wavelength conversion," ICIIS 2017—Poeceedings Jan. 2018, pp. 1-6.

Schneier, Bruce; "Applied Cryptography: Protocols, Algorithms, and Source Code in C," Book. 1995 SEC. 10.3, 12.2, 165 Pgs.

Stratos: Lightwave., "Innovation Brought to Light", Hybrid HMA Series, Hybrid Multi Application, 2 pgs. Jul. 16, 2002.

UPC Optic Fiber Quick Connector. Date: May 13, 2016 [online], [Site visited Mar. 2, 2021], Available from Internet URL: https://www.amazon.com/dp/B01FLUV5DE/ (Year: 2016).

Wang et al. "Opto-VLSI-based dynamic optical splitter," Electron. Lett.0013-5194 10.1049/el:20046715 40(22), 14451446 (2004).

Xiao et al. "1 xN wavelength selective adaptive optical power splitter for wavelength-division-multiplexed passive optical networks," Optics & Laser Technology 68, pp. 160-164, May 2015.

* cited by examiner

FIBER OPTIC CONNECTORS HAVING ONE OR MORE SECURING BUTTONS WITH SPECIFIC SHAPES

CROSS REFERENCE TO RELATED APPLICATIONS

This application is a continuation of International Patent Application Serial No. PCT/US2021/032904, filed on May 18, 2021, which claims the benefit of priority of U.S. Provisional Application Ser. No. 63/082,036 filed on Sep. 23, 2020, and U.S. Provisional Application Ser. No. 63/029, 991 filed on May 26, 2020, the content of which is relied upon and incorporated herein by reference in its entirety.

FIELD

The disclosure is directed to fiber optic connectors and cable assemblies comprising a retention body with a portion that fits within a connector housing and is secured to the connector housing using one or more securing buttons along with methods for making fiber optic cable assemblies by terminating the fiber optic cable with the fiber optic connector.

BACKGROUND

Optical fiber is increasingly being used for a variety of applications, including but not limited to broadband voice, video, and data transmission. As bandwidth demands increase optical fiber is migrating deeper into communication networks such as in fiber to the premises applications such as FTTx, 5G and the like. As optical fiber extends deeper into communication networks there exist a need for building more complex and flexible fiber optic networks using fiber optic connectors in a quick and easy manner.

Fiber optic connectors were developed for making plug and play optical connections at links or devices in the communication network such as terminals, cabinets, patch panels, and like. The fiber optic connectors allow the distribution of optical signals within an optical network and provide the flexibility of locating the devices in convenient locations for efficient network design and deployment and also deferring connectivity and the associated expense until needed in the communication network. Certain network operators have a preference for the type of fiber optical cables they deploy in their communication network. Consequently, the fiber optic connectors that terminate many different types of cables advantageously provide manufacturing synergies.

Consequently, there exists an unresolved need for fiber optic connector designs that provide quick and easy manufacturing in a flexible manner.

SUMMARY

The disclosure is directed to fiber optic connectors (hereinafter "connectors") and fiber optic cable assemblies (hereinafter "cable assemblies") comprising a retention body and a connector housing where the retention body may be secured to connector housing using one or more securing buttons. Specifically, the one or more securing buttons are sized to fit into respective connector housing apertures and retention body securing portions when aligned, thereby securing the retention body to the connector housing. Methods of making cable assemblies are also disclosed.

One aspect of the disclosure is directed to a fiber optic connector comprising a retention body, a connector housing and one or more securing buttons. The retention body comprises a rear end and a front end with a passageway from the rear end to the front end, and at least one retention body securing portion in the retention body. The connector housing comprises a rear end and a front end with a longitudinal passageway extending from the rear end to the front end, and at least one connector housing aperture in the connector housing. One or more securing buttons are sized to fit into the at least one connector housing aperture and the at least one retention body securing portion for securing a portion of the retention body within the connector housing when assembled.

Another aspect of the disclosure is directed to a fiber optic connector comprising a retention body, a connector housing and one or more securing buttons. The retention body comprises a rear end and a front end with a passageway from the rear end to the front end, and at least one retention body securing portion in the retention body. The connector housing comprises a rear end and a front end with a longitudinal passageway extending from the rear end to the front end, and at least one connector housing aperture in the connector housing. One or more securing buttons are sized to fit into the at least one connector housing aperture and the at least one retention body securing portion for securing a portion of the retention body within the connector housing when assembled. Where the at least one retention body securing portion in the retention body may be aligned with the at least one connector housing aperture when a portion of the retention body is inserted into an opening at the rear end of the connector housing so that the one or more securing buttons may be inserted into the at least one retention body securing portion and the at least one connector housing aperture.

Yet another aspect of the disclosure is directed to a fiber optic connector comprising a retention body, a connector housing and one or more securing buttons. The retention body comprises a rear end and a front end with a passageway from the rear end to the front end, and at least one retention body securing portion in the retention body. The connector housing comprises a rear end and a front end with a longitudinal passageway extending from the rear end to the front end, and at least one connector housing aperture in the connector housing. One or more securing buttons are sized to fit into the at least one connector housing aperture and the at least one retention body securing portion for securing a portion of the retention body within the connector housing when assembled. Where the one or more securing buttons comprise a larger portion and a smaller portion with the larger portion sized for the at least one connector housing aperture and the smaller portion sized for the at least one retention body securing portion.

A further aspect of the disclosure is directed to a fiber optic cable assembly comprising a fiber optic cable having an optical fiber and a fiber optic connector. The fiber optic connector comprises a retention body, a connector housing and one or more securing buttons. The retention body comprises a rear end and a front end with a passageway from the rear end to the front end, and at least one retention body securing portion in the retention body. The connector housing comprises a rear end and a front end with a longitudinal passageway extending from the rear end to the front end, and at least one connector housing aperture in the connector housing. One or more securing buttons are sized to fit into the at least one connector housing aperture and the at least one retention body securing portion for securing a portion of the retention body within the connector housing.

The disclosure is also directed to methods of making a fiber optic cable assembly. The method comprises inserting a fiber optic cable having an optical fiber into a passageway of a retention body comprising at least one retention body securing portion in the retention body and securing the fiber optic cable to the retention body. The method also comprises inserting a portion of the retention body into a connector housing comprising a longitudinal passageway extending from a rear end to a front end, and at least one connector housing aperture so that the at least one connector housing aperture is aligned with the at least one retention body securing portion of the retention body, and then inserting one or more securing buttons into the at least one connector housing aperture and the at least one retention body securing portion for securing a portion of the retention body within the connector housing.

The fiber connector concepts disclosed may be varied for use with any suitable components or cables desired for termination. For instance, any suitable connector housing may benefit from the concepts disclosed by providing flexibility and adaptability for manufacturing.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Figures 1, 2:
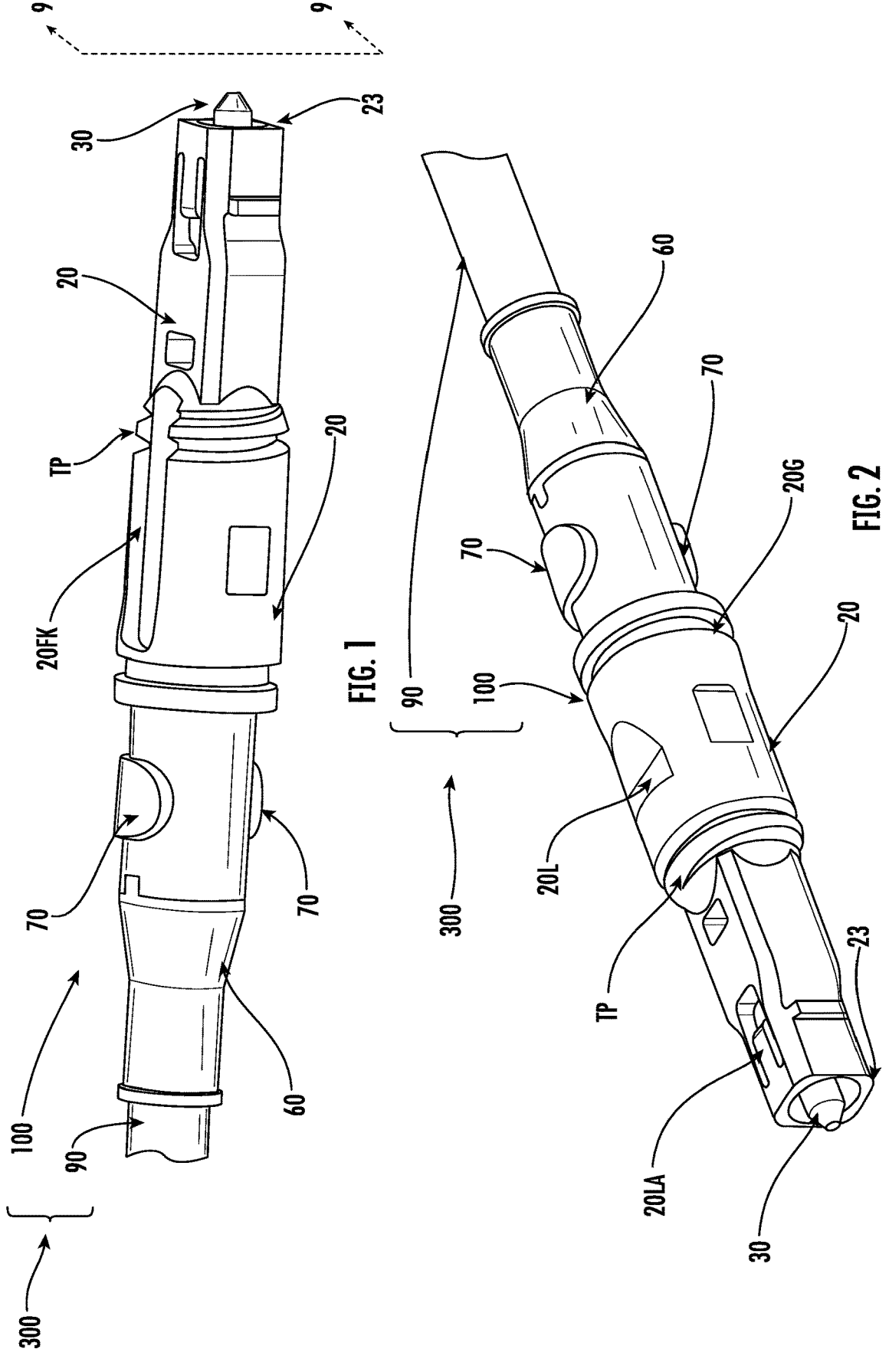
FIGS. 1 and 2 are top and bottom perspective views of an explanatory fiber optic cable assembly having a fiber optic connector that terminates a fiber optic cable according to the present application.

Reference will now be made in detail to the embodiments of the disclosure, examples of which are illustrated in the accompanying drawings. Whenever possible, like reference numbers will be used to refer to like components or parts.

The concepts disclosed are related to fiber optic connectors, cable assemblies and methods of making comprising a retention body used for securing a fiber optic cable along with a connector housing secured to the retention body using one or more securing buttons. During assembly, a portion of the retention body is inserted into the connector housing for aligning at least one retention body securing portion with at least one connector housing aperture before the one or more securing buttons are inserted, thereby allowing a compact fiber optic connector design with quick, easy and repeatable assembly to the connector housing. Moreover, the concepts may be used with single-fiber or multi-fiber connectors and cable assemblies.

Cable assemblies may be formed by securing the fiber optic cable to the retention body in any suitable fashion such as using an adhesive and/or a crimp as desired. Consequently, the fiber optic connector design is highly-adaptable to a wide variety of fiber optic cables of various shapes and/or construction for different customer requirements or preferences. For instance, the connector may be terminated to cables comprising a round cross-section or a non-round cross-section as desired. Likewise, the connector may be terminated to cables having rigid strength members such as GRPs or yarn-like strength members such as aramid. In other embodiments, the fiber optic connectors and cable assemblies disclosed may have a conventional connector construction or a connector construction with push-to-lock retention feature in the connector housing as further disclosed.

The concepts disclosed advantageously provide flexibility for the cable type used with the fiber optic connector. The concepts may be used with any suitable cables and may be especially advantageous with compact cable form-factors along with enabling terminals with relatively high-density arrays of optical connections with an organized layout. The connector concepts are scalable to any suitable count of optical fibers on a ferrule in a variety of arrangements or constructions for building fiber optic networks.

The concepts disclosed herein are suitable for fiber optic networks such as for Fiber-to-the-location (FTTx), densification, 5G applications, and are equally applicable to other optical applications as well including indoor, industrial, wireless, or other desired application. Additionally, the concepts disclosed may be used with other devices having any suitable footprint or construction. Various designs, constructions, or features for fiber optic connectors and cable assemblies are disclosed in more detail as discussed herein and may be modified or varied as desired.

FIGS. 1-9 depict a first explanatory connector 100 and FIGS. 10-18 disclose methods of making cable assemblies 300 according to the concepts disclosed. FIGS. 19-24 depict another explanatory connector 100 and cable assembly 300, and FIGS. 25-32 show other concepts of the disclosure. Explanatory cable assemblies 300 comprise a fiber optic cable 90 terminated to connector 100 such as shown in FIGS. 1-3 and 19.

Figure 3:
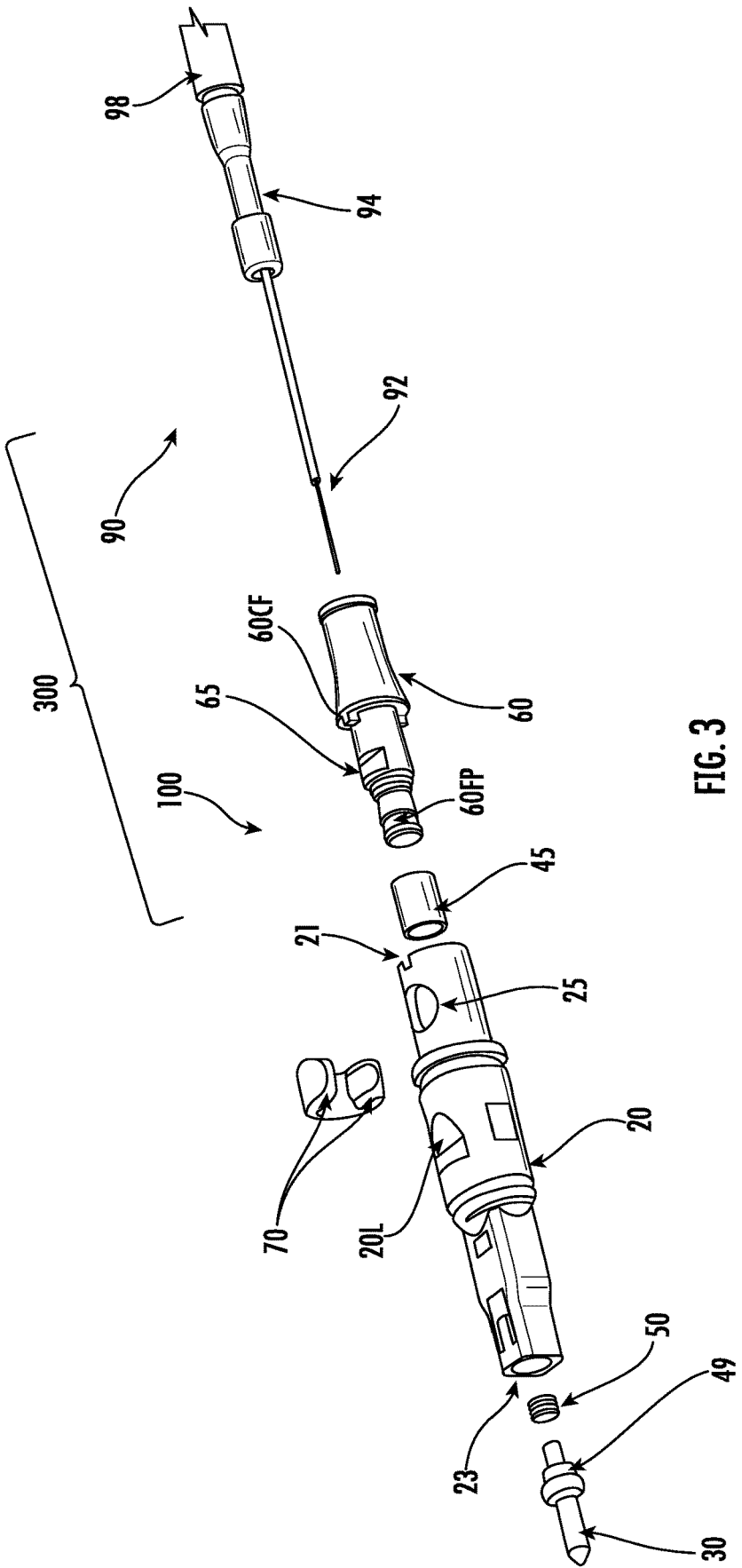
FIG. 3 is a partially exploded view of the fiber optic cable assembly of FIG. 1.
Figure 4:
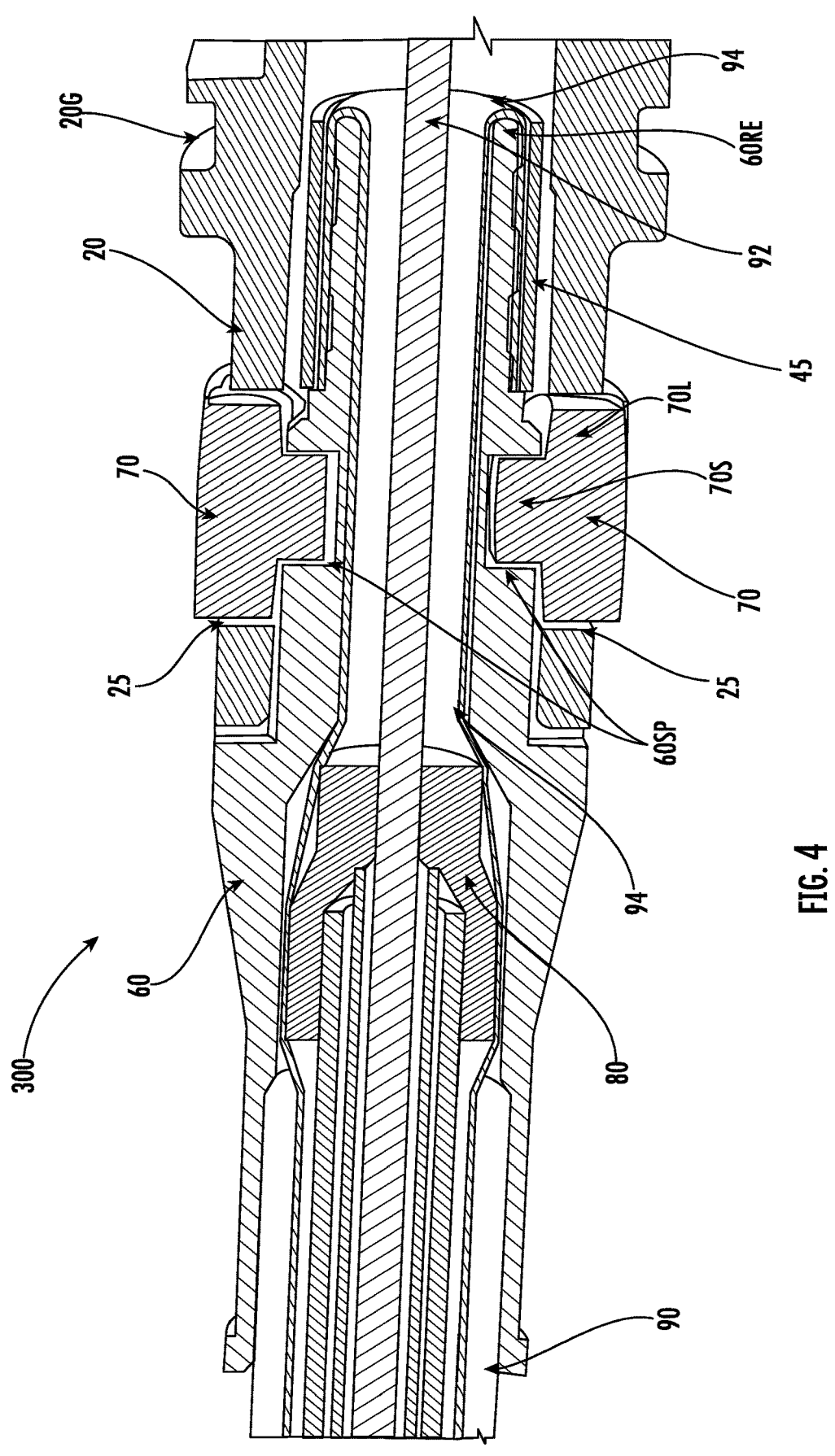
FIG. 4 is a partial cross-sectional view of the fiber optic cable assembly of FIG. 1 taken in a vertical plane 9-9.

The first explanatory connector 100 is depicted in top and bottom assembled perspective views in FIGS. 1 and 2 as a portion of cable assembly 300. Connectors 100 disclosed herein comprise one or more securing buttons 70 that cooperate with connector housing 20 and retention body 60. Illustratively, FIG. 3 is a partially exploded view of connector 100 of cable assembly 300, and FIG. 4 is a partial cross-sectional view of cable assembly 300 taken in a vertical plane showing fiber optic connector 100 comprising one or more securing buttons 70 (FIG. 5) cooperating with the connector housing 20 (FIG. 8) and retention body 60 (FIGS. 6 and 7) for securing a portion of the retention body 60 within the connector housing 20 when assembled.

As depicted, connector 100 uses a retention body 60 comprising a rear end 61 and a front end 63 with a passageway 62 from the rear end 61 to the front end 63. Retention body 60 also comprises at least one retention body securing portion 60SP. Connector 100 also has a connector housing 20 comprising a rear end 21 and a front end 23 with a longitudinal passageway 22 extending from the rear end 21 to the front end 23, and at least one connector housing aperture 25 in the connector housing 20. When aligned, the at least one retention body securing portion 60SP of retention body 60 and at least one connector housing aperture 25 in the connector housing 20 allow the insertion of securing button 70. This assembly of inserting one or more securing buttons 70 when parts are aligned secures a portion of the retention body 60 inside connector housing 20 of connector 100.

One or more securing buttons 70 are sized to cooperate with both the at least one connector housing aperture 25 and the at least one retention body securing portion 60SP for securing a portion of the retention body 60 within the connector housing 20 when assembled. To assemble connector 100, the at least one retention body securing portion 60SP is aligned with the at least one connector housing aperture 25 when a portion of the retention body 60 is inserted into an opening at the rear end 21 of the connector housing 20 so that the one or more securing buttons 70 may be inserted into the at least one retention body securing portion and the at least one connector housing aperture 25. As best shown in FIG. 4, the one or more securing buttons 70 depicted in FIG. 5 secure a portion of the retention body 60 within the connector housing 20 when assembled.

Retention body 60 may be secured to cable 90 in a number of suitable manners for enabling the termination of a variety of cable types or constructions. For instance, a crimp may be used for securing retention body 60 to cable 90. The crimp may be a dedicated component like a crimp band to secure one or more strength members or the retention body 60 may be crimped (i.e., deformed) to the cable 90 if the retention body 60 was formed from a suitable material. Cable 90 may also be attached to retention body 60 using an adhesive or the like. The adhesive or the like can be inserted into an aperture in the retention body 60 for securing the cable 90 to the retention body 60. Retention bodies 60 may be also be designed with features allowing multiple ways for securing cable 90 to retention body 60 for accommodating several cable types or constructions.

Figure 6:
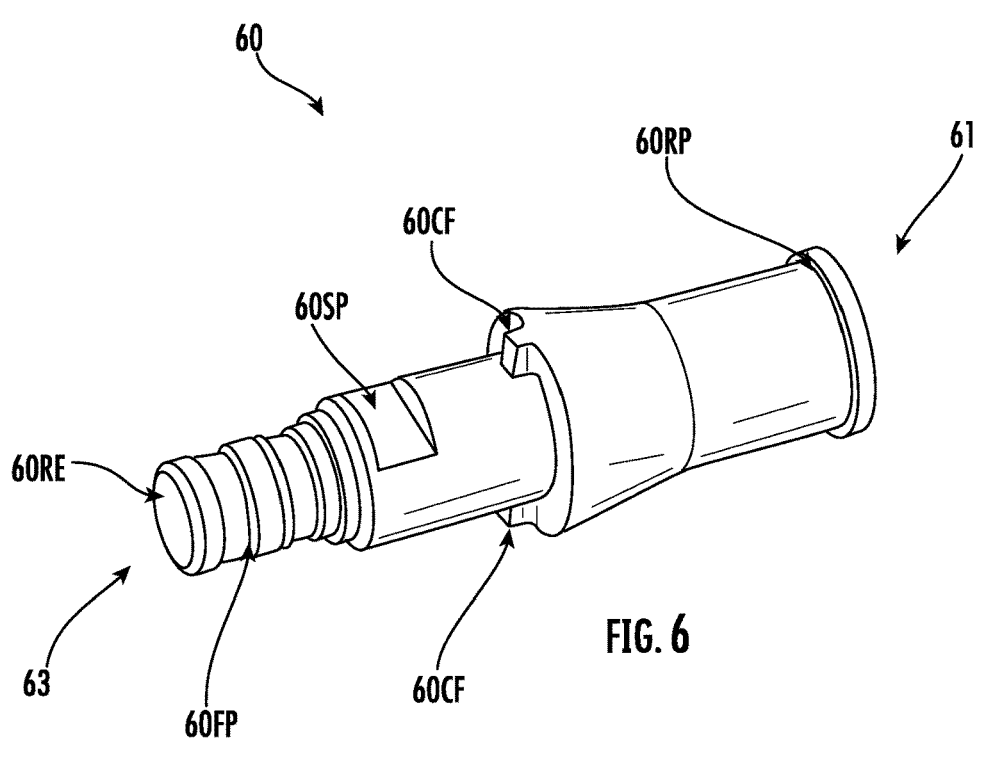
FIGS. 6 and 7 are perspective views of the retention body of the explanatory fiber optic connector of FIG. 1.
Figure 7:
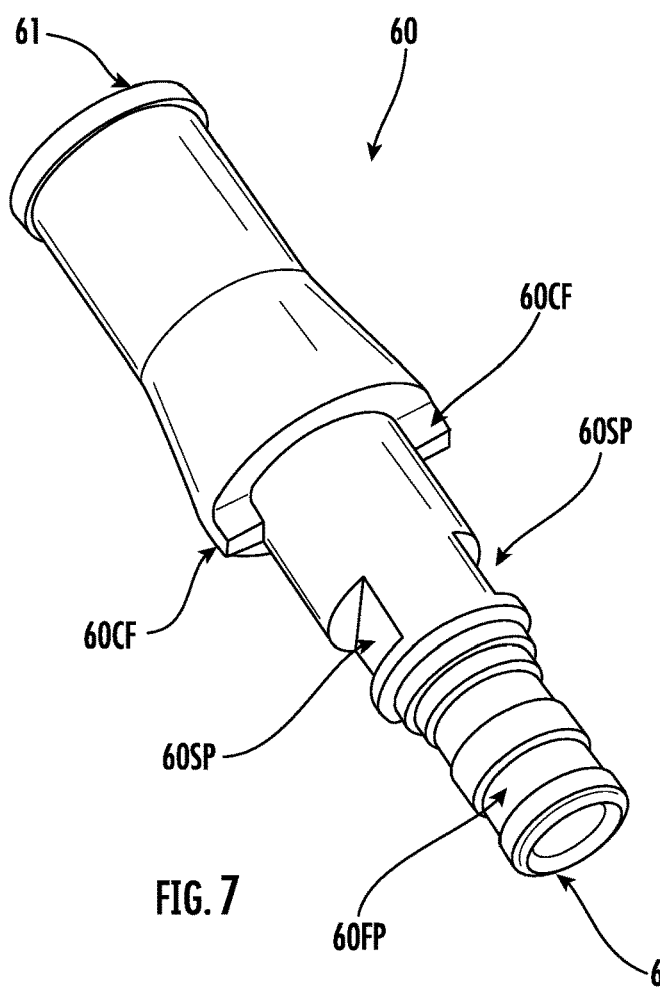
Figure 8:
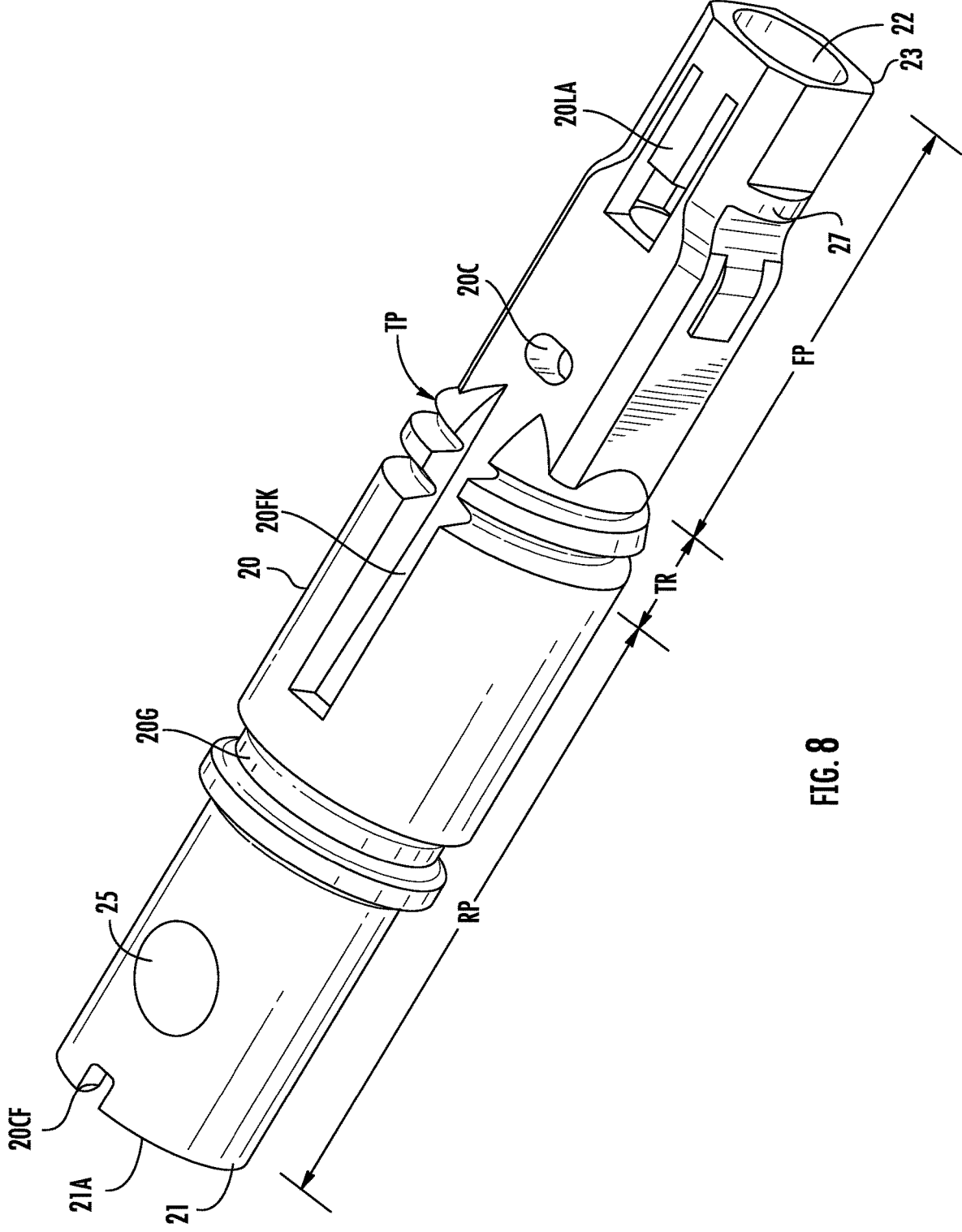
FIG. 8 is a perspective view of the connector housing of the explanatory fiber optic connector of FIG. 1.

FIGS. 6 and 7 depict perspective views of an explanatory retention body 60 and FIG. 8 shows an explanatory connector housing 20 for connector 100. Connector 100 or cable assembly 300 may also include other features or components that are not shown for the sake of simplicity. For instance, connector 100 may also include one or more O-rings for sealing, one or more heat shrinks for securing or sealing components, boot supports, boots, or the like.

The connector concepts presented allow flexibility for connector termination and the assembly process. Connectors 100 may include a retention body 60 with one or more retention body securing portions 60SP with the geometry configured as desired. For instance, retention body securing portion 60SP need not extend through a wall of the retention body 60, but the retention body securing portion 60SP may extend through the wall of the retention body if desired. Further, the number or spacing of securing buttons 70 may be varied if desired.

As depicted in FIGS. 6 and 7, connector 100 may comprise retention body 60 with a first retention body securing portion 60SP and a second retention body securing portion 60SP disposed on opposing portions of retention body 60. Likewise, the explanatory connector housing 20 may comprise a first connector housing aperture 25 and a second connector housing aperture 25 disposed on opposing portions of connector housing 20 that may be aligned with the first and second retention body securing portions 60SP.

As shown in FIG. 4, the securing buttons 70 are disposed about 180 degrees apart like the connector housing apertures 25 and securing portions 60SP, but other spacings or counts for the one or more securing buttons 70 are possible. When inserted, securing buttons 70 cooperate with both the connector housing 20 and retention body 60. One way of cooperating is by the securing buttons 70 having a snap-feature or detent that cooperates with the connector housing or retention body for a friction-fit. Another way of cooperating is when the securing button 70 is sized for an interference fit with the at least one connector housing aperture 25 or the at least one retention body securing portions 60SP. In one embodiment, the geometry for retention body securing portion 60SP does not extend thru the sidewall of the retention body 60. This geometry for the securing portion 60SP provides a continuous wall for passageway 62 to inhibit snagging during insertion of optical fibers 92 or strength members 94 from the rear portion 60RP through the passageway 62 to the front portion 60FP of retention body 60.

As depicted, the two securing portions 60SP are slots formed in retention body 60 that do not extend through the sidewall of retention body 60, but other suitable geometries are possible for retention body securing portions 60SP. For instance, the retention body securing portions 60SP may be apertures or even have other suitable geometry for the securing portion.

If an aperture is used as the retention body securing portion 60SP, then it is possible to use an adhesive such as epoxy, glue, resin, radiation-curable, polymer (cured using an ultrasonic or induction welding process) or other such materials for securing cable 90 within the retention body 60 if desired, by placing the adhesive or the like inside the passageway 62 and curing for securing cable 90. Still other geometry is possible for use as retention body securing portions 60SP besides the aperture. By way of explanation, retention body securing portions 60SP on retention body 60 may be a slot, a groove, a pocket, or the like. The retention body 60 may be secured to cable 90 or a portion of cable 90 in any suitable fashion. For instance, retention body 60 may be terminated or secured to strength members 94 of cable 90 using adhesive, crimp, or other desired processes. Other variations of the cable assembly concepts include terminating or securing the retention body 60 to a portion of the cable jacket 98 of cable 90 using adhesive, crimp, or other desired processes.

As shown in FIGS. 6 and 7, retention body 60 may have other geometry as desired or not. For instance, the retention body 60 may comprise a front portion forward of the at least one retention body securing portion 60SP and a medial portion with a medial cross-section that is greater than a cross-section of the forward portion 60FP, and the retention body securing portion 60SP is disposed in the medial portion 60M.

In further variations, the forward portion 60FP of the retention body 60 may have a plurality of ridges (not numbered) for securing one or more strength members such as tensile yarns 94 of cable 90 to retention body 60. Tensile yarns lack significant anti-buckling strength and are typically are aramids, fiberglass, and the like. As best depicted in FIG. 4, tensile yarns 94 of cable 90 may pass through the passageway 62 of retention body 60 and exit to the front end 63 of retention body 60. Thereafter, the one or more strength members 94 may be folded over a front portion 60FP of the retention body 60. Then crimp band 45 may be positioned over the front portion 60FP to sandwich the one or more strength members 94 between the deformed crimp band 45 and the front portion 60FP. Thus, one or more strength members 94 are secured to the retention body 60 with crimp band 45. Additionally, the front portion 60FP may have a rounded or radiused end 60RE for inhibiting a sharp edge at the front portion 60FP from damaging the one or more strength members 94 as they are folder over the front portion 60FP of the retention body 60.

Retention body 60 may be formed from any suitable materials such as a polymer, metal, composite, etc. The material of the retention body may depend on the method used for securing the cable 90 to the retention body 60. For instance, if retention body 60 was intended to receive an adhesive for securing the cable 90, then the retention body 60 would be made from a suitable material to cooperate with the adhesive. In other embodiments, retention body may be formed from materials with other desired properties such as if the retention body 60 was intended for use with a crimp band 45 for securing the cable 90 to the retention body 60. For instance, a material for retention body 60 may be selected so that it has a higher modulus of elasticity compared with the crimp band (e.g., aluminum, brass or the like) for proper attachment of the crimp band (45). However, the material for the retention body 60 could also be selected so that it is also deformable such as to the cable 90 if desired. One such material for retention body 60 having a higher modulus of elasticity than a brass crimp band 45 could be an aluminum such as AL 6082, but other suitable materials are possible according to the concepts disclosed. If retention body 60 is metal or the like, then a rear portion of the retention body 60 could also be crimped to the cable 90 for additional strain-relief if desired.

Figure 5:
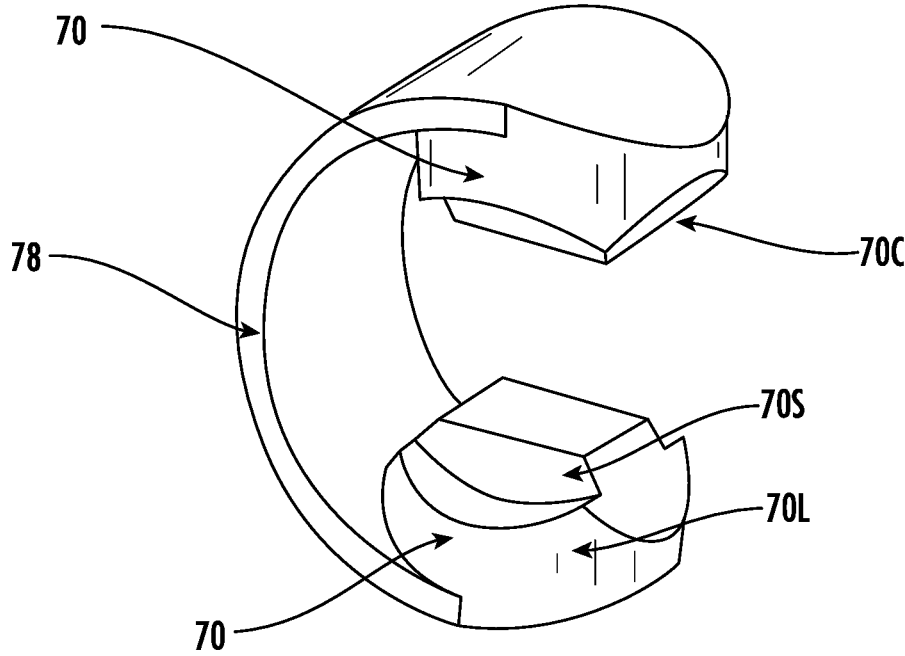
FIG. 5 is a perspective view of securing buttons of explanatory fiber optic connector of FIG. 1.

FIG. 5 is an isolated perspective view of one or more securing buttons 70 used with connector 100. Securing buttons 70 may have any suitable geometry or features for cooperating with the retention body 60 and connector housing 20 and several explanatory examples are discussed herein.

As shown by FIG. 5, a first securing button 70 is connected to a second securing button 70, thereby allowing installation of both securing buttons in a single component operation and making the part easier to handle. As depicted, the first securing button 70 is attached to the second securing button 70 by a connecting arm 78. Connector housing may be shaped to accommodate the connector arm 78 if desired or not. The securing buttons 70 may comprise any suitable shape to cooperate with the connector housing aperture 25 and the retention body securing portion 60SP for securing a portion of the retention body 60 within the connector housing 20 when assembled.

By way of explanation, one or more securing buttons 70 may comprise any suitable shapes or features for cooperation with the retention body 60 and connector housing 20. As depicted for this embodiment, securing button 70 may also comprise a larger portion 70L and a smaller portion 70S. For instance, the larger portion 70L may be sized for the at least one connector housing aperture 25 and the smaller portion 70S may be sized for the at least one retention body securing portion 60SP as shown. As best depicted in FIG. 4, the smaller portion 70S of securing button 70 is shaped to cooperate with retention body securing portion 60SP and the larger portion 70L of securing button 70 is shaped and sized to cooperate with the connector housing aperture 25. Securing button 70 may also comprise one or more chamfers 70C to help aid alignment and insertion of the securing buttons 70 into position during assembly. Securing buttons 70 may be formed from any suitable material as desired. Further, the securing buttons 70 may be flush or protrude from the retention body 60 when installed. Securing buttons 70 can have other features and other embodiments of securing buttons 70 are disclosed.

In this embodiment, the smaller portion 70S of securing button 70 has a rectangular shape, and the larger portion 70L of securing button 70 has a round shape with one or more chambers 70C. The rectangular shape of the smaller portion 70S cooperates with the slot-shaped retention body securing portion 60SP of retention body 60.

Other features for connector 100 are possible for quick alignment of the components for assembly. As depicted in FIG. 4. the at least one retention body securing portion 60SP in the retention body 60 is aligned with the at least one connector housing aperture 25 when a portion of the at least one retention body 60 is inserted into an opening at the rear end 21 of the connector housing 20 so that the one or more securing buttons 70 may be inserted into the at least one retention body securing portion 60SP and the at least one connector housing aperture 25. Features may be formed into components for aligning the components so that the one or more securing buttons may be inserted.

By way of explanation, connector 100 may also include an interface between the connector housing 20 and retention body 60 with one or more clocking features to guide rotational alignment of parts for assembly and insertion of the one or more securing buttons 70. FIGS. 7 and 8 show clocking features 60CF of retention body 60 that cooperate with clocking features 20CF on connector body 20. As shown, the clocking features may be one or more protrusions and complimentary slots. Further, the clocking features may be configured to allow assembly only in a single orientation if desired.

FIG. 8 is a top perspective view of the connector housing 20 of explanatory connector 100 comprising a rear end 21 and a front end 23 with a longitudinal passageway 22 extending from the rear end 21 to the front end 23 with at least one connector housing aperture 25. Connector housing aperture 25 is used for securing the retention body 60 to the connector housing 20 using one or more securing buttons 70.

Connector housing 20 may have other geometry or features or not as desired. Connector housing 20 may have any suitable outer profile using the concepts disclosed. The explanatory connector housing 20 depicted in FIG. 8 comprises a connector housing with a specific outer profile using primitive geometry with the desired features formed in the primitive geometry (e.g., the round and non-round primitive portions). Examples of explanatory features in the connector housing 20 include locking features for securing the connector 100 in a port, features for keying connector 100, features for securing a dust cap or converting the connector footprint, or other suitable features.

Figure 9:
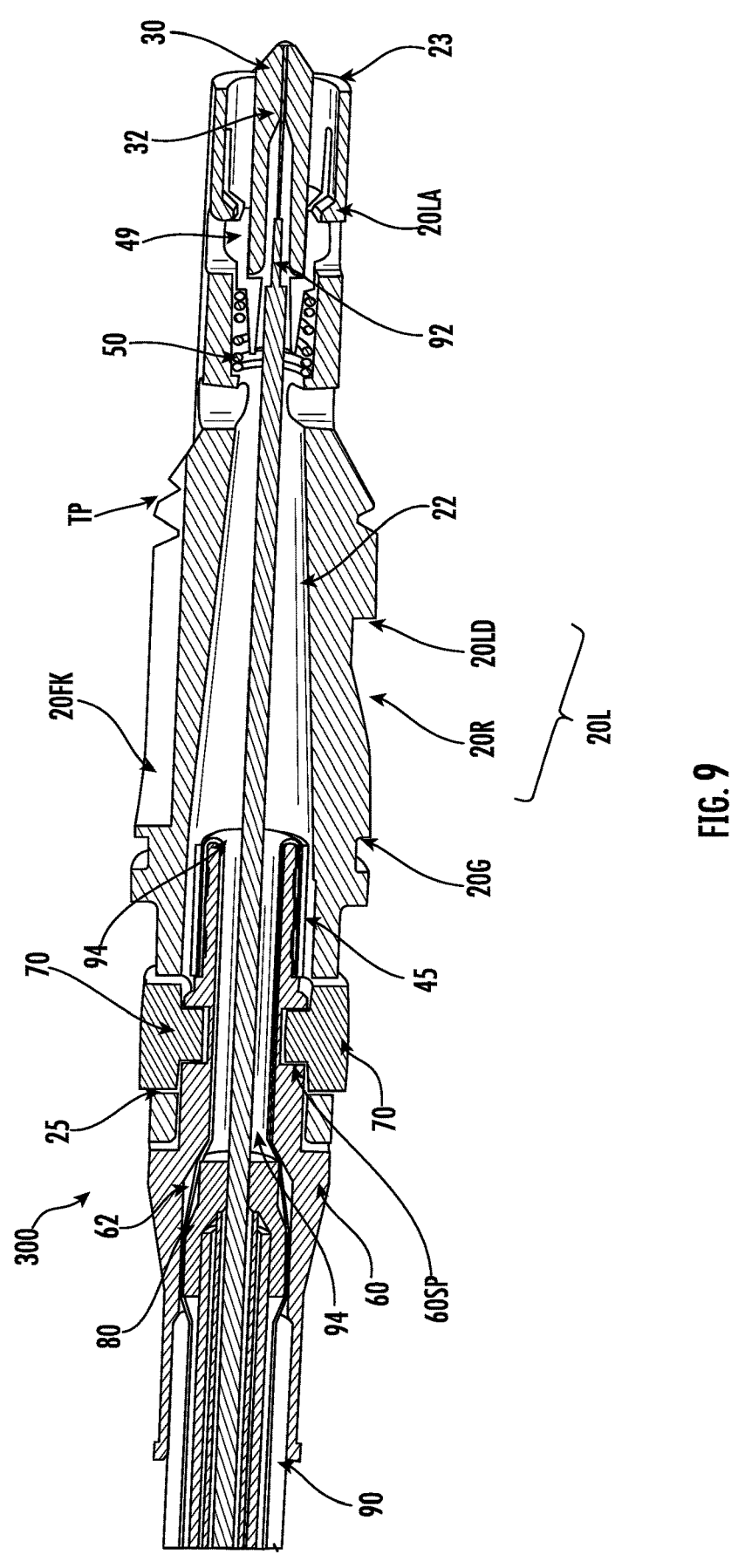
FIG. 9 is a longitudinal cross-sectional view of the fiber optic cable assembly of FIG. 1 taken respectively along plane 9-9.

With reference to FIG. 8, the primitive geometry for connector housing 20 shown may comprise a part of a rear portion (RP) comprises a round cross-section (RCS), and a part of the front portion (FP) of the connector housing 20 comprise a non-round cross-section (NRCS). A transition region (TR) may be disposed between the rear portion (RP) and the front portion (FP). The transition region (TR) may comprise an asymmetric portion if desired. As an example, the transition region (TR) may comprise a threaded portion (TP) as shown, but other geometry for the transition region (TR) is possible as well. The connector housing aperture 25 may have any suitable location on the connector housing 20, and as shown the connector housing aperture 25 is disposed in the rear portion (RP) of the connector housing 20. FIG. 9 shows connector housing 20 in cross-section with the explanatory features formed on primitive geometry of the connector housing 20.

In one advantageous connector housing design, a locking feature 20L is integrally-formed in the material of the connector housing 20 such as a negative cutout from the primitive round geometry at a rear portion (RP) of the connector housing 20 as shown. The negative cutout from the primitive round geometry for locking feature 20L allows a relatively small connector footprint while retaining the connector 100 in a complimentary device or port. For instance, the locking feature 20L may cooperate with a translating securing member of the device or port that engages the negative cutout for securing connector 100. Other embodiments of connector housing 20 may omit the locking feature 20L or use a conventional connector attachment such as a coupling nut, bayonet, etc.

The locking feature 20L may have any suitable geometry. The locking feature 20L cooperates with a suitable device or optical port to secure the connector 100 for optical connection. In this explanatory example, locking feature 20L of connector housing 20 may be configured as a ramp (20R) with a ledge (20LD) as the retaining feature for connector 100. The ramp 20R and ledge 20LD may have geometry that allows a push and lock feature for securing the connector 100 to a suitable optical port or other device. The locking feature 20L may also comprise a flat portion disposed between the ramp 20R and ledge (20LD) if desired. Of course, other locking features or configurations are possible for connector housing 20 using the concepts disclosed herein.

Connector housing 20 may include still other features if desired. For instance, connector housing may further comprise a suitable keying portion. By way of example, connector housing 20 comprises a female key (20FK). Female key 20FK may extend into a portion of the transition region (TR) if desired. One arrangement may have the locking feature 20L integrally formed in the rear portion (RP) of connector housing 20 with the female key 20FK that extends into a portion of the transition region (TR), and the locking feature 20L is disposed about 180 degrees apart from the female key 20FK.

In this configuration, connector housing 20 also comprises a transition region (TR) disposed between the rear portion (RP) and the front portion (FP). Transition region (TR) of connector housing 20 comprises a threaded portion (TP). Threaded portion (TP) may secure a dust cap and/or be used for adding a convertor to connector 100.

Still other features are possible with connector housings 20 for connectors 100 depending on the ferrule used. Ferrules for connectors 100 comprise one or more fiber bores 32 for receiving one or more optical fibers. Additionally, the ferrule of the connector could use a ferrule holder or not. Connector housings may load the ferrule from the rear or the front as desired. By way of explanation, connector housing 20 further comprises one or more latch arms 20LA for securing ferrule holder 49. Latch arms 20LA may be disposed in a front portion (FP) of connector housing 20 as depicted. Moreover, the front opening of passageway 22 of connector housing 20 is sized for allowing the insertion of ferrule holder 49 from the front end 23 such as shown in the cross-section of FIG. 8. Latch arms 20LA are connected at the front end and cantilevered at the rear end so they can be deflected when ferrule holder 49 is inserted and then the latch arms 20LA spring back to retain the ferrule holder 49 once it is fully-inserted as shown in FIG. 9.

FIG. 9 shows a cross-section of the ferrule holder 49 and ferrule 30 disposed in housing 20 and retained by latch arms 20LA. As depicted, latch arms 20LA have ramp portions for aiding portions of ferrule holder 49 to deflect the latch arms 20LA outward as the ferrule holder 49 is inserted into housing 20 and then the latch arms 20 LA spring back over ferrule holder 49 for retaining the same. Ferrule holder 49 and ferrule 30 may be biased to a forward position using resilient member 50 if desired. The use of other ferrules or ferrule assemblies are possible and may have other ways of being assembled in connector 100.

Cable assemblies 300 may include other connector structures or components. For instance, connector 100 may comprise one or more O-rings that may be disposed on groove 20G of connector housing 20. Likewise, the cable assembly may comprise one or more heat shrinks for assembling the connector 100 to cable 90. Dust caps for connector 100 and other components may be used as well. Further variations of connectors are also discussed below.

Figures 10, 11, 12:
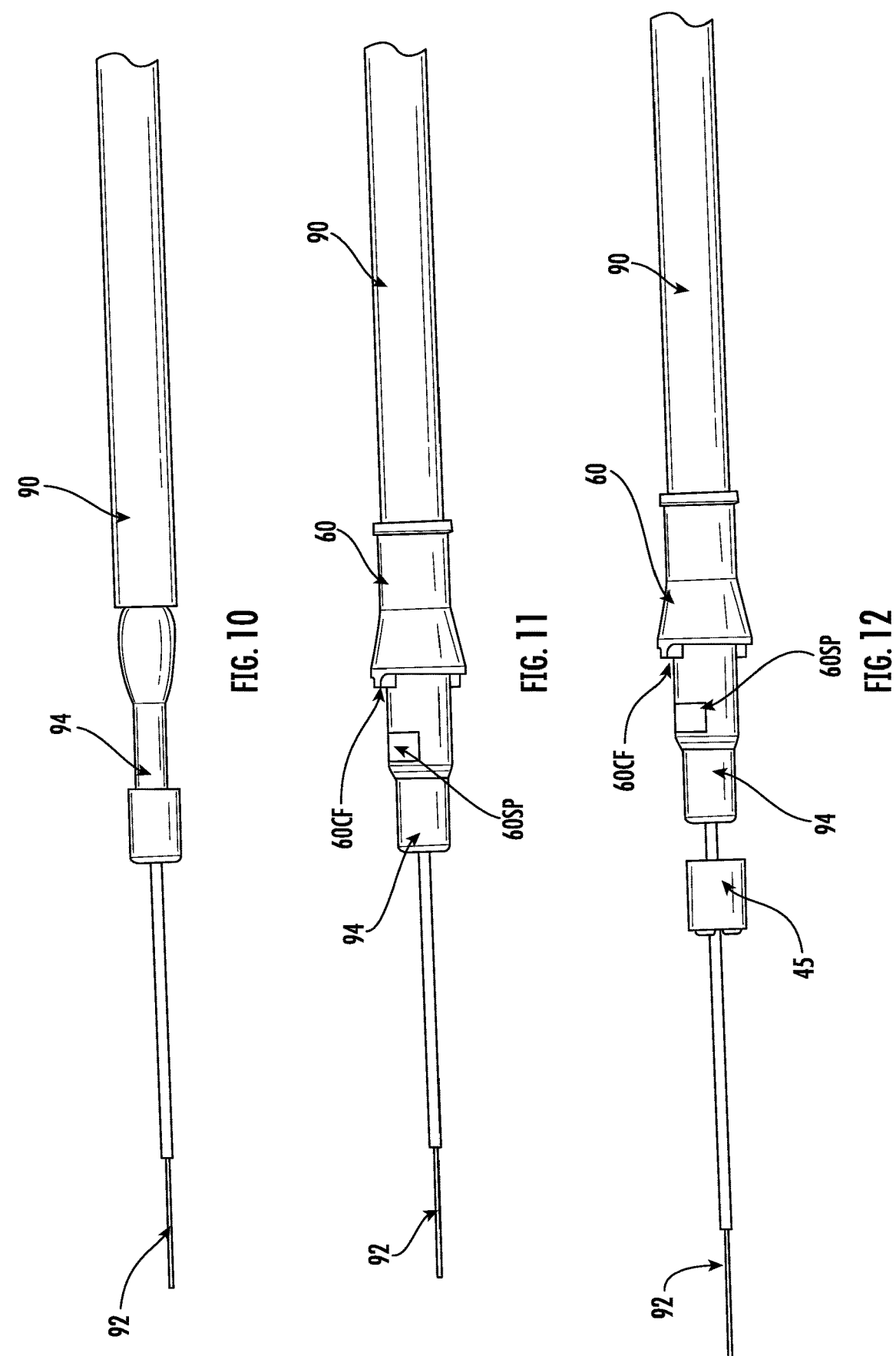
FIGS. 10-18 shows various explanatory methods for making the fiber optic cable assemblies disclosed herein.

FIGS. 10-18 show explanatory methods of making cable assemblies 300 by terminating cable 92 with connector 100. FIG. 10 depicts cable 90 having an optical fiber 92. Cable 90 may be prepared in any suitable manner for insertion into passageway 62 of retention body 60 having at least one retention body securing portion 60SP as depicted in FIG. 11. Preparation of cable 90 typically comprises exposing the optical fiber 92 and prepping any other cable components as desired for termination such as strength members 94 or cable jacket 98. As best shown in FIG. 10, cable 90 is prepared so that strength members 94 extend beyond cable jacket 98. Strength members 94 may be any suitable type such as rigid glass-reinforced plastic (GRPs) or flexible yarns such as aramid or fiberglass. Cable construction may influence how the cable 90 is secured to the retention body 60, and may be accomplished in a variety of manners using the concepts disclosed herein.

FIGS. 11 and 12 show the cable 90 inserted into passageway 62 of retention body 60. Cable 90 may be secured to retention body 60 in any suitable fashion. For instance, a crimp may be used for securing a portion of cable 90 to retention body 60. In other methods, a portion of cable 90 is secured to the retention body 60 using an adhesive or the like. Still other variations are possible for securing cable 90 to retention body 60.

Figure 13:
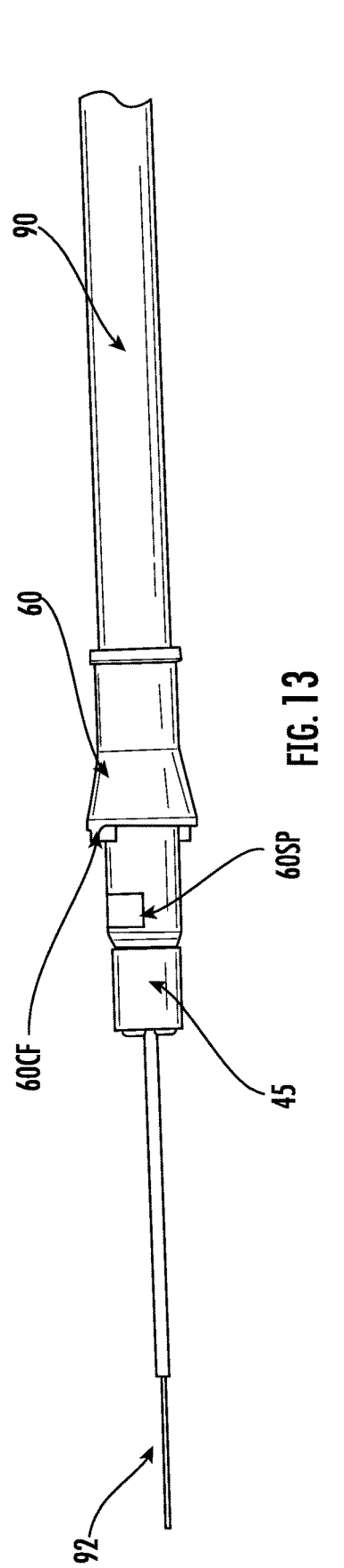
Figures 17, 18:
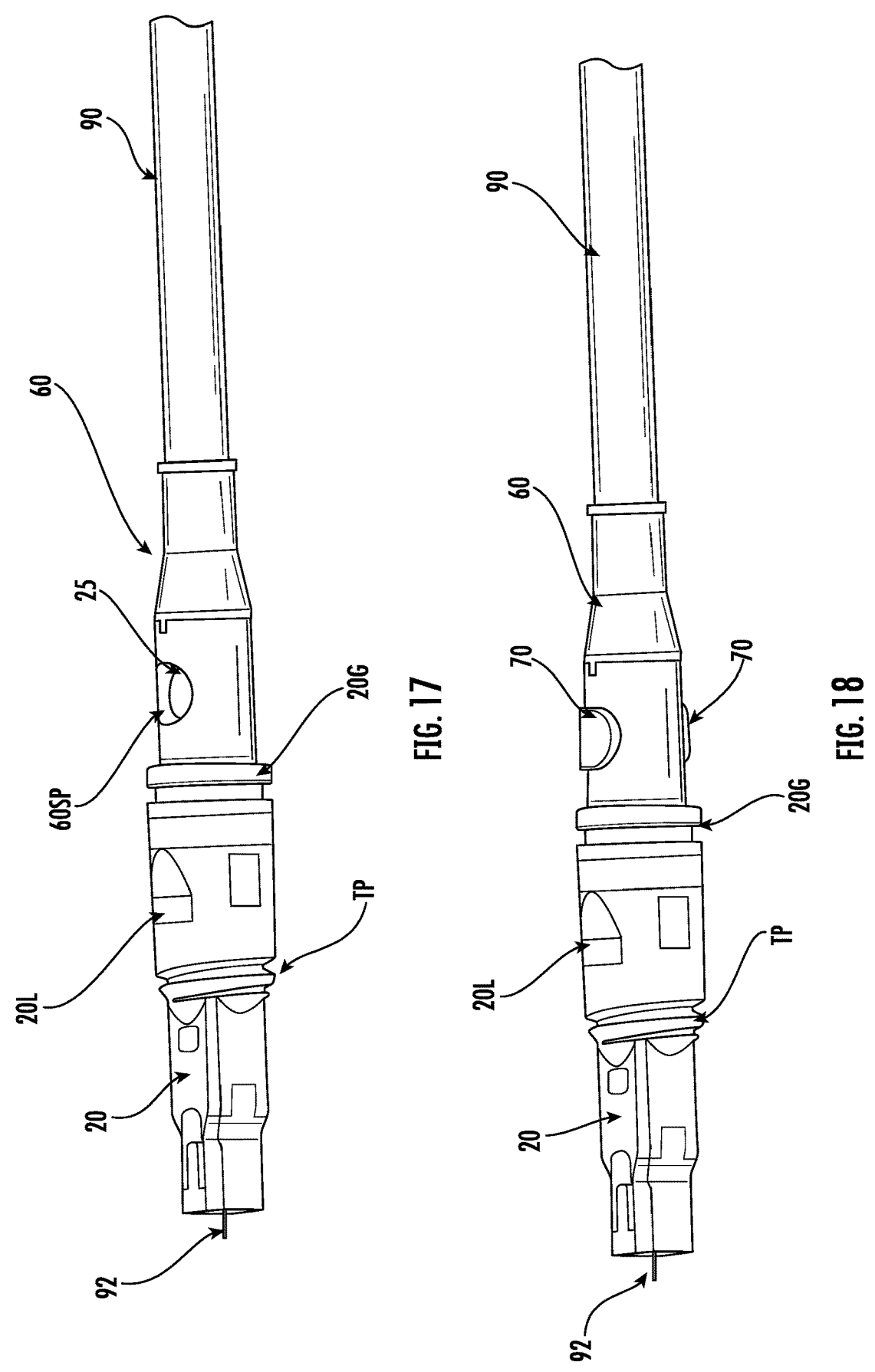

FIG. 12 shows one explanatory cable 90 being secured to retention body 60 using a crimp band 45 that is slid over a portion of the retention body 60. In this termination, the strength members 94 are flexible yarns such as aramid that are routed through the passageway 62 of retention body 60 past the front end 63 and then folded rearward over the front portion 60FP of retention body 60 as shown. Thereafter, crimp band 45 is slid over strength members 94 and the front portion 60FP of retention body 60 as represented by the arrow in FIG. 12, and then crimped to secure the cable 90 to the retention body 60. FIG. 13 depicts the ends of the strength members 94 sandwiched between the front portion 60FP and the deformed crimp band 45. Other methods of securing cable 90 to retention body may be used in addition to crimp band 45 or independently of crimping. Illustratively, FIGS. 17 and 18 show a method of using an adhesive or the like for securing cable 90 to retention body 60.

Figure 14:
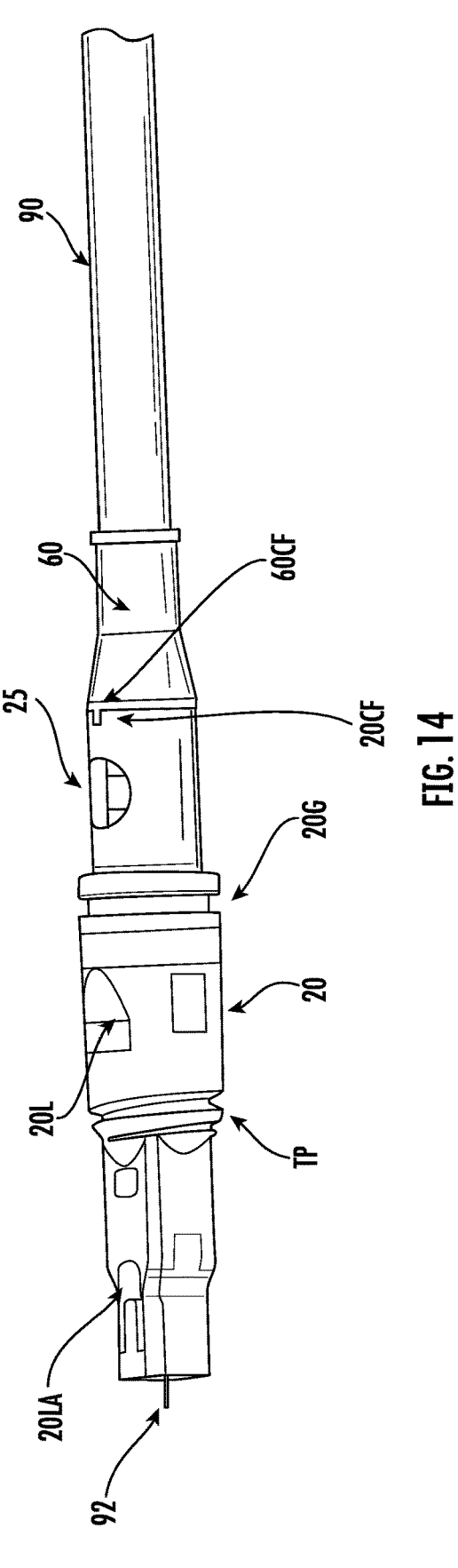

FIG. 14 depicts the inserting a portion of the retention body 60 into connector housing 20 that comprises a longitudinal passageway 22 extending from the rear end 21 to the front end 23. The connector housing 20 comprises at least one connector housing aperture 25 that may be aligned with the at least one retention body securing portion 60SP of retention body 60 as shown. When assembled, the rotational alignment interface between the connector housing 20 and retention body 60 comprises one or more clocking features 20CF,60CF that cooperate when aligned to aid assembly. By way of example, retention body 60 may include a protrusion or recess as a clocking feature that fits with a complimentary recess or protrusion on connector housing 20 to align connector housing apertures 25 with retention body securing portions 60SP as shown in FIG. 14.

Figure 15:
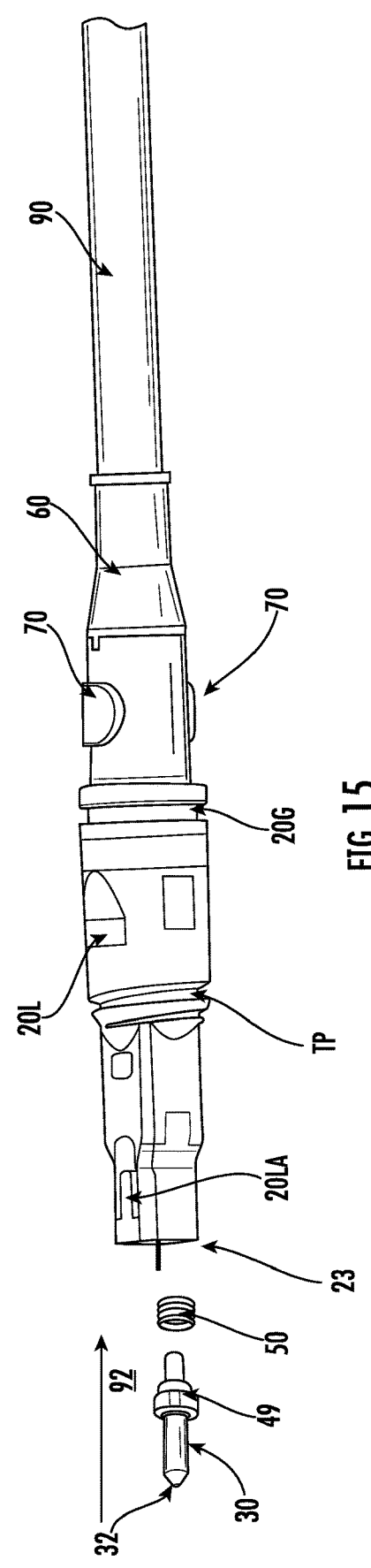

Once the components and geometry are aligned and assembled, then the one or more securing buttons 70 may be installed for securing the connector housing 20 with the retention body 60. FIG. 15 depicts the one or more securing buttons 70 inserted into the at least one connector housing aperture 25 and the at least one retention body securing portion 60SP for securing a portion of the retention body 60 within the connector housing 20.

FIG. 15 also depicts the ferrule 30 before being installed onto one or more optical fibers. The concepts disclosed may be used with any suitable connector having a ferrule comprising one or more fiber bores. For instance, connectors for cable assemblies disclosed may comprise single-fiber counts or multi-fiber counts.

Other components are possible for with ferrule 30 for connector 100. For instance, ferrule holder 49 and resilient member 50 may also be used. From the front end 23, resilient member 50 is placed about optical fiber 92 and then the ferrule holder 49 and ferrule 30 are threaded onto optical fiber 92 for assembly as known. Optical fiber 92 may be clamped in a suitable manner through bores (not numbered) disposed on opposite sides of connector housing 20 when ferrule holder 49 is being inserted into housing 20. Clamping optical fiber 92 inhibits the optical fiber 92 from pushing rearward or buckling as ferrule 30 and ferrule holder 49 are inserted. Ferrule holder 49 is aligned to a suitable rotational position and pushed rearward into housing 20 until retained by latch arms 20LA. Optical fiber 92 is secured to ferrule 30 in a suitable fashion such as adhesive like a UV or heat curable material, but other processes are possible. Thereafter, the end face of ferrule 30 is polished.

Figure 16:
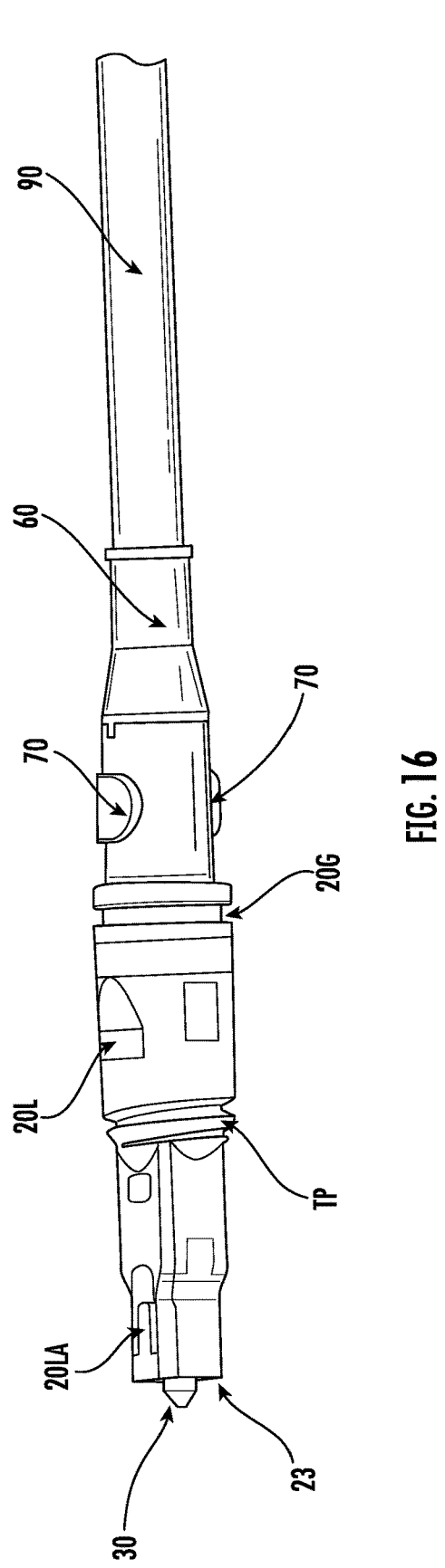

Additionally, ferrule holder 49 may be configured for tuning ferrule 30 relative to housing 20. Additionally, a portion of the passageway 22 is sized to cooperate with a flange of the ferrule holder to allow different rotational positions. Consequently, after measurement of the end face profile of the ferrule 30 or measurement of the insertion loss, the ferrule 30 may be tuned if desired for improving performance such as to a Grade B standard. By way of explanation, the latch arms 20LA may be deflected outward to release the ferrule holder 49 and then the ferrule holder 49 is rotated to the desired position and inserted back into the housing 20 until it is retained by latch arms 20LA. Other embodiments of ferrule holder 49 may have other suitable numbers of rotational positions as desired. FIG. 16 is a perspective view of the ferrule 30 attached to optical fiber 92 for cable assembly 300.

FIGS. 17 and 18 show an explanatory method of using an adhesive or the like for securing cable 90 to retention body 60. The retention body 60 depict has retention body securing portion 60SP configured as an aperture for use with connector housing 20. Using the aperture for the retention body securing portion 60SP allows the placement of adhesive or the like into the retention body as represented by the arrow. However, the use of adhesive is possible without the aperture for the retention body securing portion 60SP.

Using an adhesive or the like for securing the retention body 60 to cable 90 allows for the use of many different types or constructions of cables with the retention body 60. By way of explanation, the cable 90 is prepared and adhesive may be inserted into a passageway 62 of retention body 60. The adhesive may be inserted through the retention body securing portion 60SP configured as an aperture or it could be placed from the passageway 62. Any suitable adhesive or other like material could be used such as a heat curable, UV curable, or other curing and the adhesive or material may be placed before, during or after the cable 90 is placed into the retention body 60 as desired. In other variations, the outer jacket or strength members could be shaved to fit inside the passageway 62 of retention body 60 to fit an oversized cable or shaping the cable to the passageway 62. Moreover, shaving the cable 90 may improve the adhesion to the cable 90. FIG. 18 depicts the one or more securing buttons 70 inserted for securing a portion of the retention body 60 within the connector housing 20.

Other constructions or methods of assembly are possible with the connector and cable assembly concepts disclosed. By way of explanation, the retention body 60 may secured to cable 90 in other ways such as being crimped directly to the cable 90.

Figure 20:
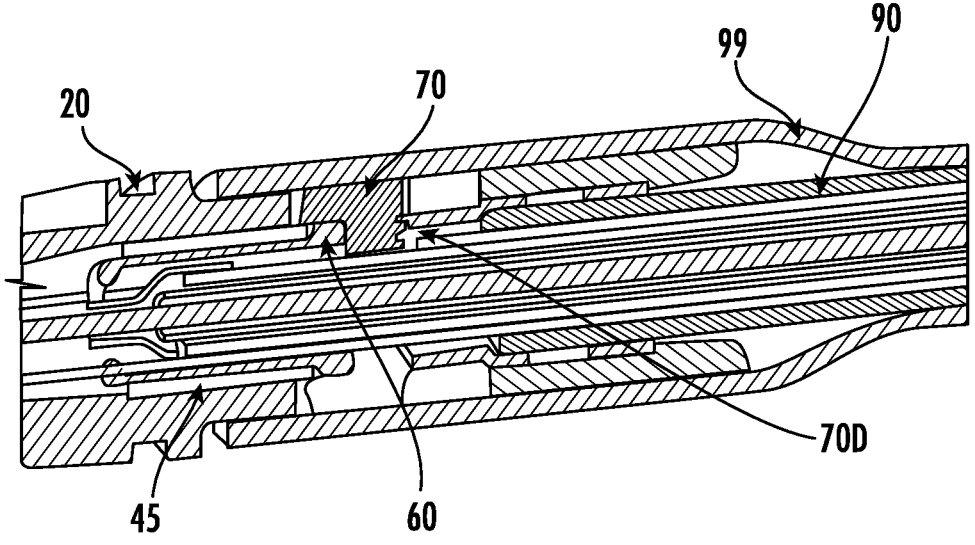
Figures 21, 22, 23, 24:
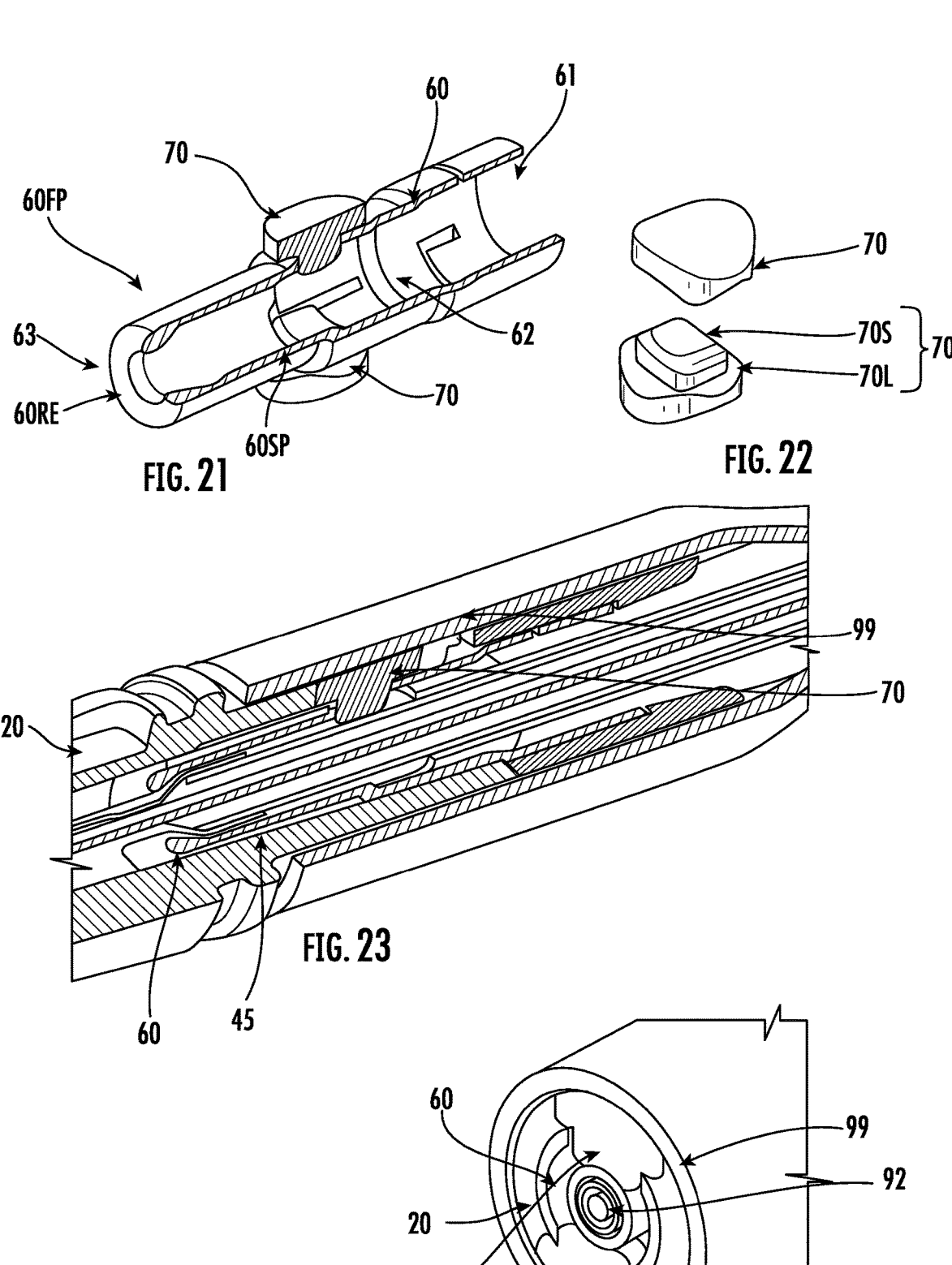
FIGS. 21-24 are various views showing details for another fiber optic connector similar to the fiber optic connector of FIGS. 19 and 20.

After inserting the one or more securing buttons 70, one or more heat shrinks 99 may be installed over the one or more securing buttons such as shown in FIG. 20. Likewise, one or more heat shrinks may be used about a portion of the optical fiber or other places in the cable connector 100 or cable assembly 300. Any suitable size or type of heat shrink such as an adhesive lined heat shrink may be used for sealing or securing components as desired.

Figure 19:
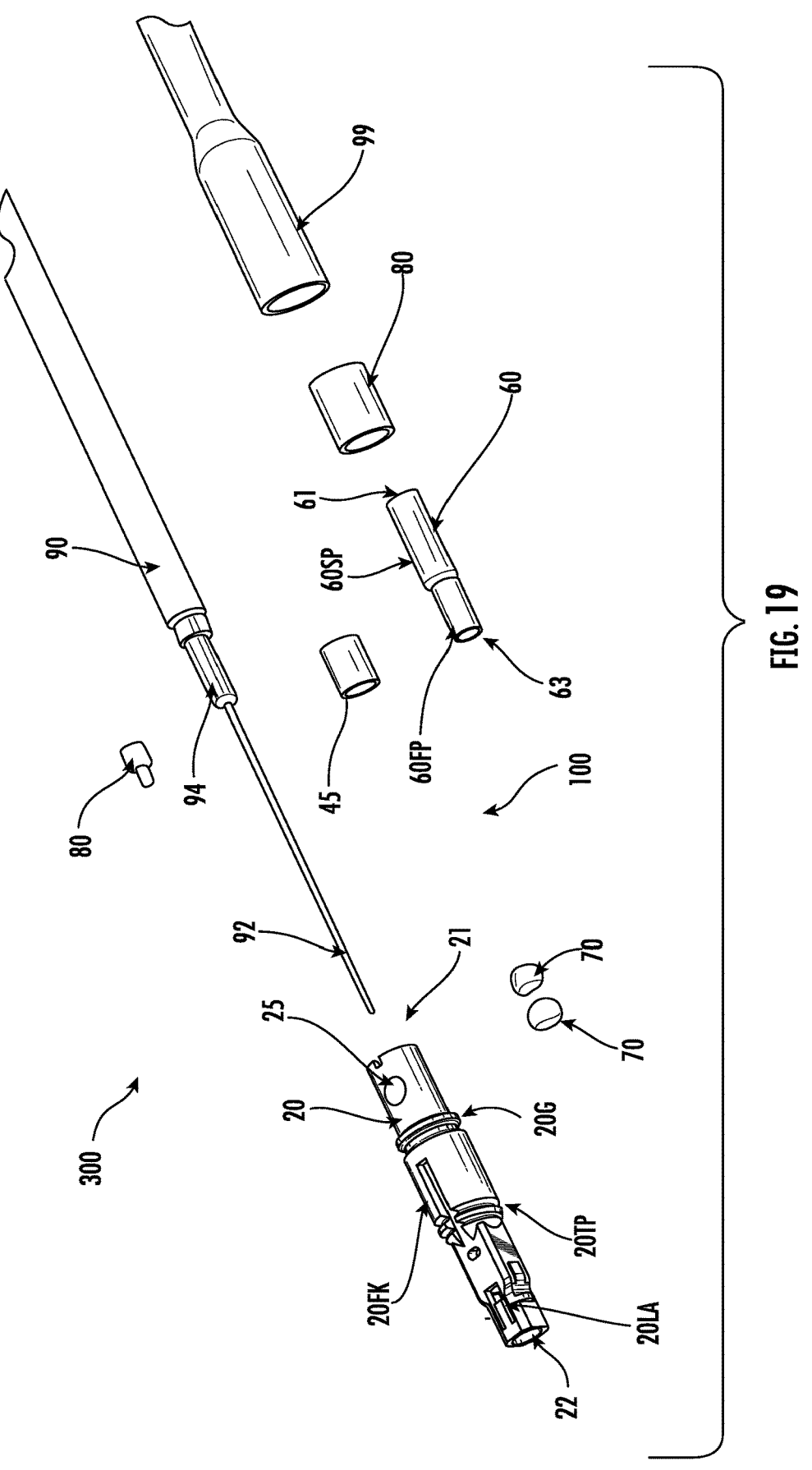
FIGS. 19 and 20 are an exploded view and a partial cross-sectional view of another explanatory fiber optic connector having a retention body with the securing portion configured as an aperture according to the concepts disclosed.

FIGS. 19 and 20 are an exploded view and a partial cross-sectional view of another explanatory connector 100 having retention body 60 with the retention body securing portion 60SP configured as an aperture for use with connector housing 20 as disclosed herein. Connector 100 of FIGS. 19 and 20 has a similar construction and operation as disclosed herein and is shown as cable assembly 300. Using an aperture for retention body securing portion 60SP allows securing of the retention body 60 to cable 90 using an adhesive, epoxy, glue or the like. Additionally, the other securing concepts disclosed can also be used for securing the retention body 60 to cable 90 as well when retention body securing portion 60SP is configured as an aperture. As depicted in FIG. 20, one or more securing buttons 70 may extend thru the wall of retention body 60 when retention body securing portion 60SP is the aperture. Further, the one or more securing buttons 70 may be sized so that the optical fiber 92 may still pass through the passageway 62 of retention body 60 freely.

In this embodiment, one or more securing buttons 70 snap-fit into retention body 60 as shown. Securing buttons 70 may have a symmetric shape or asymmetric shape as desired. Further, securing buttons 70 may have one or more detents 70D on securing buttons 70 for securing the retention body 60 and connector housing 20 for creating an interference fit when assembled. As in FIG. 20, the strength members 94 of cable 90 may be secured to the retention body 60 such as by using a crimp band 45 if desired or not. Other geometry or versions of the securing button 70 may be sized for other interference fits with the connector housing aperture 25 or retention body securing portion 65 as desired.

Connector 100 and cable assembly 300 of FIGS. 19 and 20 have other differences in construction or components as well. For instance, heat shrink 99 can inhibit securing buttons 70 from coming out of the retention body 60 or connector housing 20 along with sealing the connector housing 20 to cable 90. Also, a boot may be used if desired, and a support 80 may also be used for supporting a heat shrink or boot. The use of other heat shrinks is also possible. By way of explanation, the cable assembly 300 may use an appropriately sized heat shrink placed over a portion of the optical fiber 92 and a portion of cable 90 for protecting or inhibiting movement of the optical fiber 92 relative to the end of cable 90.

FIGS. 21-24 are various views showing details of another connector 100 and cable assembly 300. As depicted, securing buttons 70 may have larger portion 70L and smaller portion 70S sized and shaped for the respective retention body 60 and connector housing 20. In this variation, securing buttons 70 comprise a rectangular smaller portion 70S and a round larger portion 70L that cooperate with retention body 60 and connector housing 20. Again, securing buttons 70 extend through a wall in retention body 60, but allow optical fiber 92 to pass toward the ferrule 30.

Figures 25, 26, 27, 28:
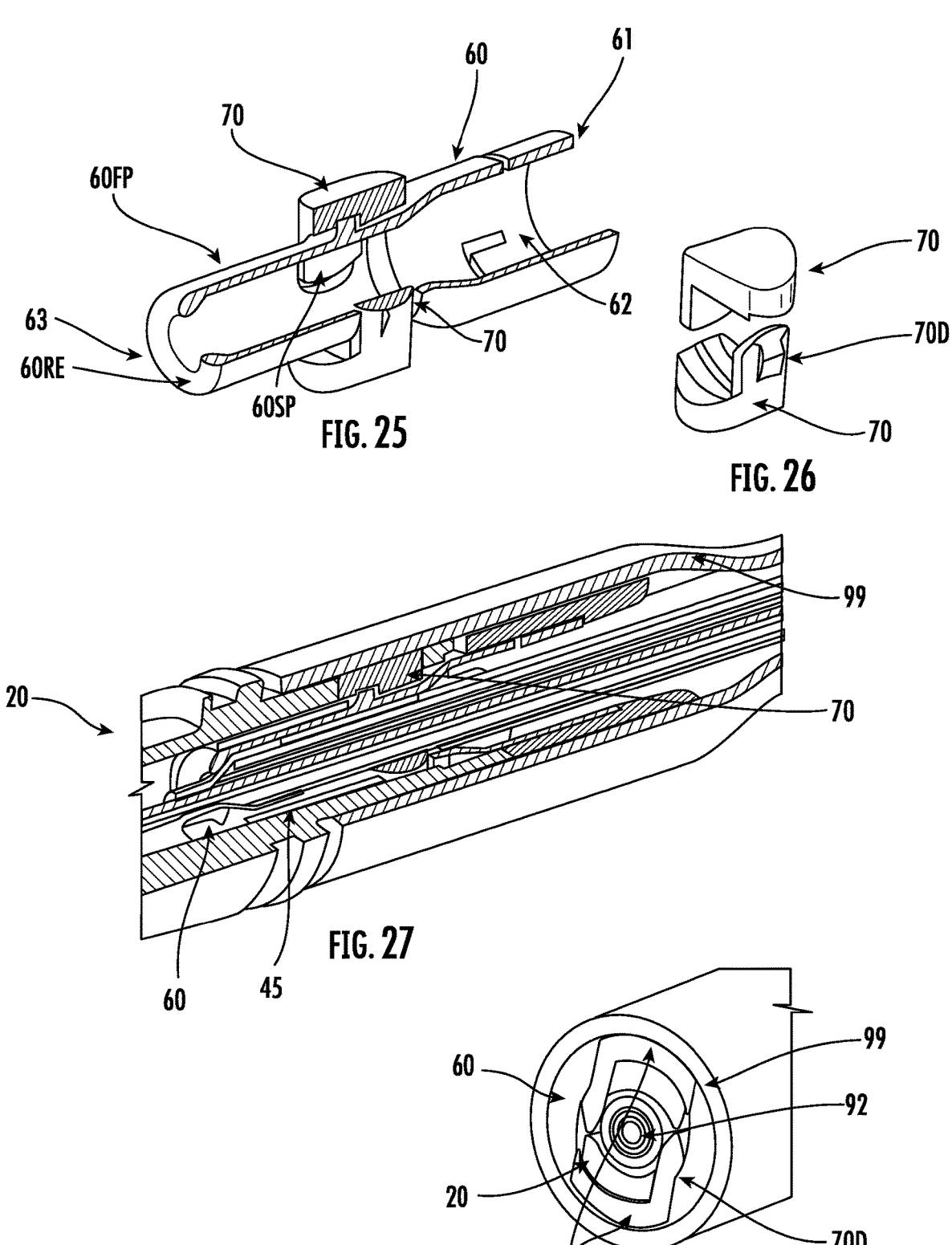
FIGS. 25-28 are various views showing details of another securing button concept disclosed for explanatory fiber optic connectors.
Figures 29, 30, 31, 32:
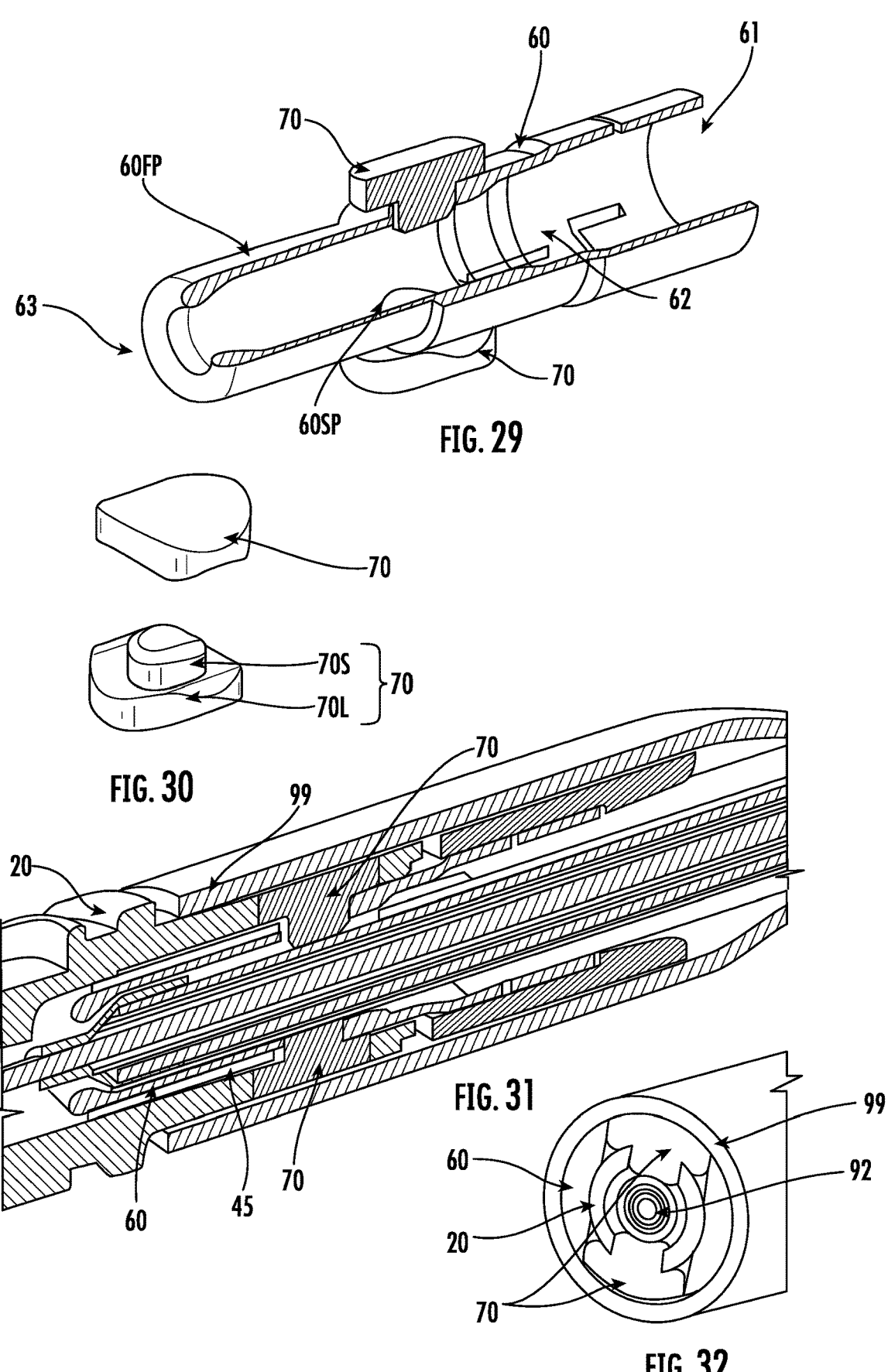
FIGS. 29-32 are various views showing details of another securing button concept disclosed for explanatory fiber optic connectors.

FIGS. 25-28 are various views showing details of another securing button concept disclosed for explanatory connectors 100. In this embodiment, a portion of the securing button 70 interacts with the connector housing 20 to snap into position. FIG. 26 depicts securing button 70 with one or more detents 70D. The geometry of detents 70D may be tailored for the features desired. As depicted, detents 70D are disposed on an outer facing portion of securing button 70 so they can interact with the sidewall shape of connector housing 20 as best shown in FIG. 28. Further, securing buttons 70 may be used with adhesive or the like if desired.

FIGS. 29-32 are various views of yet another securing button concept disclosed for explanatory connectors 100. As depicted, securing buttons 70 may have larger portion 70L and smaller portion 70S sized and shaped for the respective retention body 60 and connector housing 20. In this variation, securing buttons 70 comprise a round smaller portion 70S and a round larger portion 70L that cooperate with retention body 60 and connector housing 20. Again, securing buttons 70 extend through a wall in retention body 60, but allow optical fiber 92 to pass toward the ferrule 30. Still other variations are possible with the concepts disclosed.

Figure 33:
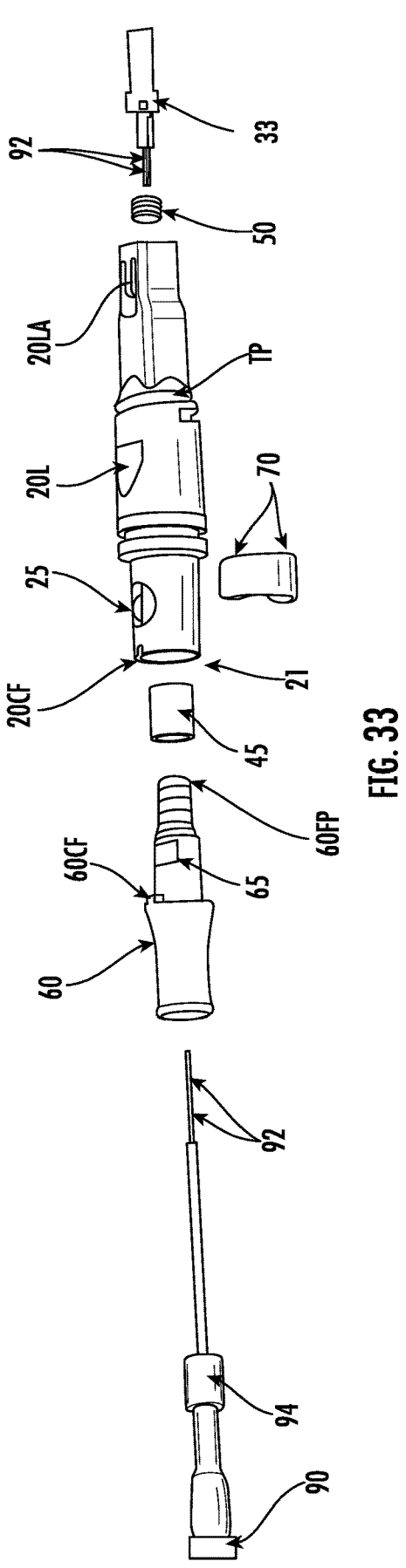
FIG. 33 depicts a fiber optic connector that comprises a multi-fiber ferrule using the securing button concepts disclosed herein.
Figure 34:
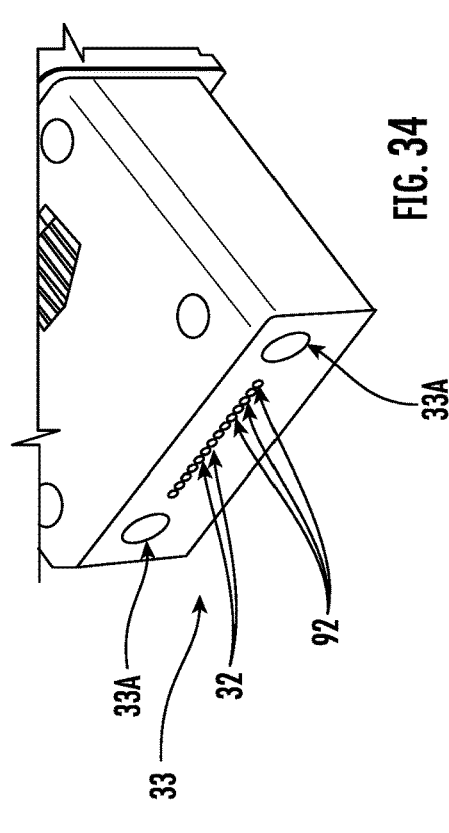
FIG. 34 depicts an enlarged view of the multi-fiber ferrule of the connector of FIG. 33.

For instance, the concepts for connectors disclosed herein may also be used with multifiber connectors and cable assemblies as depicted in FIGS. 33 and 343. By way of example, FIG. 33 is a perspective view of a cable assembly 300 comprising a connector 100 having a multi-fiber ferrule 33 that has a plurality of fiber bores 32 for supporting a plurality of optical fibers for mating. Multifiber connector 100 has a construction that is similar to single-fiber connector 100, but is adapted to support multifiber ferrule 33. The connector housing used for a multifiber connector may have any suitable shape or construction as desired. Ferrule 33 may support any suitable fiber count in one or more rows of optical fibers or any other arrangement as desired. FIG. 34 depicts an enlarged view of the multi-fiber ferrule 33 of connector 100. Ferrule 33 may comprise a plurality of fiber bores 32 for receiving a plurality of optical fibers 92 of cable 90. Ferrule 33 may also have one or more guide pin bores 33A for aligning the ferrule with a mating ferrule or device as known in the art.

This connector housing 20 is similar to other connector housings disclosed herein comprising at least one connector housing apertures 25 for receiving a portion of one or more securing buttons 70. The connector housing 20 also comprises rear end (21) and a front end (23) with a longitudinal passageway (22) extending from the rear end (21) to the front end (23). Multi-fiber ferrule 33 may be a MT, MTP or other suitable multi-fiber ferrule for use with the securing button concepts disclosed herein. The concepts disclosed may also be used with connectors comprising multi-ferrule designs for making multi-fiber connectors.

The concepts disclosed also enable small connector footprints. By way of example, connector 100 may have a diameter of 12 millimeters or smaller, but other sizes are possible. The small connector footprint allows relatively smaller terminals using ports with the locking features for securing connector 100. Of course the concepts disclosed may be used with any suitable connector having a threaded, bayonet, push-pull or other suitable mating structure.

Explanatory connectors 100 avoid bulky mating structures such as a coupling nut or bayonet used with conventional connectors. In other words, conventional connectors have threaded, bayonet, or push-pull connections that require finger access for connection and disconnecting. By eliminating the structures such as threaded coupling nuts or bayonets (which is a separate component that must rotate about the connector) the spacing between conventional connectors disposed in a terminal may be greatly reduced. Also eliminating the dedicated coupling nut from the conventional connectors also allows the footprint of the connectors to be smaller, and arrays of connectors to likewise be more compact.

Although the disclosure has been illustrated and described herein with reference to explanatory embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. A fiber optic connector comprising:

a retention body comprising a rear end and a front end with a passageway from the rear end to the front end, and at least one retention body securing portion formed in the retention body;

a connector housing comprising a rear end and a front end with a longitudinal passageway extending from the rear end to the front end, and at least one connector housing aperture in the connector housing; and one or more securing buttons, wherein the one or more securing buttons are sized to fit into the at least one connector housing aperture and the at least one retention body securing portion for securing a portion of the retention body within the connector housing when assembled, wherein the one or more securing buttons comprises a larger portion and a smaller portion with the larger portion comprising a round shape and sized for the at least one connector housing aperture and the smaller portion comprises a rectangular shape and sized for the at least one retention body securing portion, and a snap-feature that cooperates with the retention body or the connector housing.

2. The fiber optic connector of claim 1, wherein the at least one retention body securing portion in the retention body may be aligned with the at least one connector housing aperture when a portion of the retention body is inserted into an opening at the rear end of the connector housing so that the one or more securing buttons may be inserted into the at least one retention body securing portion and the at least one connector housing aperture.

3. A fiber optic connector comprising:

a retention body comprising a rear end and a front end with a passageway from the rear end to the front end, and at least one retention body securing portion formed in the retention body, wherein the at least one retention body securing portion does not extend through a side-wall of the retention body;

a connector housing comprising a rear end and a front end with a longitudinal passageway extending from the rear end to the front end, and at least one connector housing aperture in the connector housing; and one or more securing buttons, wherein the one or more securing buttons are sized to fit into the at least one connector housing aperture and the at least one retention body securing portion for securing a portion of the retention body within the connector housing when assembled, wherein the at least one retention body securing portion in the retention body may be aligned with the at least one connector housing aperture when a portion of the retention body is inserted into an opening at the rear end of the connector housing so that the one or more securing buttons may be inserted into the at least one retention body securing portion and the at least one connector housing aperture, and the one or more securing buttons comprises a larger portion and a smaller portion with the larger portion sized for the at least one connector housing aperture and the smaller portion comprising a rectangular shape sized for the at least one retention body securing portion.

4. The fiber optic connector of claim 3, wherein the at least one retention body securing portion comprises a first retention body securing portion and a second retention body securing portion disposed on opposing portions of the retention body, and the at least one connector housing aperture comprises a first connector housing aperture and a second connector housing aperture disposed on opposing portions of the connector housing.

5. The fiber optic connector of claim 4, wherein the first retention body securing portion and the second retention body securing portion are disposed about 180 degrees apart.

6. The fiber optic connector of claim 5, wherein the first connector housing aperture and the second connector housing aperture are disposed about 180 degrees apart.

7. A fiber optic connector comprising:

a retention body comprising a rear end and a front end with a passageway from the rear end to the front end, and at least one retention body securing portion in the retention body, wherein the at least one retention body securing portion comprises a slot that does not extend through the sidewall of the retention body;

a connector housing comprising a rear end and a front end with a longitudinal passageway extending from the rear end to the front end, and at least one connector housing aperture in the connector housing; and one or more securing buttons, wherein the one or more securing buttons are sized to fit into the at least one connector housing aperture and the at least one retention body securing portion for securing a portion of the retention body within the connector housing when assembled, wherein the one or more securing buttons comprises a larger portion and a smaller portion with the larger portion sized for the at least one connector housing aperture and the smaller portion comprising a rectangular shape sized for the at least one retention body securing portion.

8. The fiber optic connector of claim 7, wherein the at least one retention body securing portion may be aligned with the at least one connector housing aperture when a portion of the at least one retention body is inserted into an opening at the rear end of the connector housing so that the one or more securing buttons may be inserted into the at least one retention body securing portion and at least one connector housing aperture.

9. The fiber optic connector of claim 3, wherein the one or more securing buttons comprises a snap-feature.

10. The fiber optic connector of claim 3, wherein the retention body comprises a front portion forward of the at least one retention body securing portion and a medial portion with a medial cross-section that is greater than a cross-section of the forward portion, wherein the at least one retention body securing portion is disposed in the medial portion.

11. The fiber optic connector of claim 3, wherein the one or more securing buttons comprises a first securing button connected to a second securing button.

12. The fiber optic connector of claim 3, further comprising a crimp band.

13. The fiber optic connector of claim 3, wherein a part of a rear portion of the connector housing comprises a round cross-section and a part of a front portion of the connector housing comprises a non-round cross-section with a transition region disposed between the rear portion and the front portion, wherein the transition region comprises an asymmetric portion.

14. The fiber optic connector of claim 13, wherein the connector housing comprises a locking feature integrally formed in the rear portion of the connector housing for retaining the fiber optic connector in a complementary device for securing the optical mating of the fiber optic connector.

15. The fiber optic connector of claim 14, wherein the locking feature comprises a ramp with a ledge.

16. The fiber optic connector of claim 13, the connector housing further comprising a female key that extends into a portion of the transition region for keying the fiber optic connector with a complementary device for optical mating of the fiber optic connector.

17. The fiber optic connector of claim 13, the connector housing further comprising a locking feature integrally formed in the rear portion of the connector housing, and a female key that extends into a portion of the transition region, wherein the locking feature is disposed about 180 degrees apart from the female key.

18. The fiber optic connector of claim 3, further comprising a ferrule having one or more fiber bores.

19. The fiber optic connector of claim 18, further comprising a ferrule holder.

20. The fiber optic connector of claim 19, wherein the connector housing further comprises one or more latch arms for securing the ferrule holder.

21. The fiber optic connector of claim 19, further comprising a resilient member for biasing the ferrule holder to a forward position.

22. The fiber optic connector of claim 3, wherein the at least one retention body securing portion comprises a groove, a pocket, or an aperture for cooperating with the one or more securing buttons.

23. The fiber optic connector of claim 3, wherein the at least one retention body securing portion comprises a slot.

24. The fiber optic connector of claim 3, wherein the one or more securing buttons are sized for an interference fit with the at least one connector housing aperture or the at least one retention body securing portion.

25. The fiber optic connector of claim 3, wherein an interface between the connector housing and the retention body comprises one or more clocking features for rotational alignment.

26. The fiber optic connector of claim 3, wherein the at least one connector housing aperture is disposed in a rear portion of the connector housing.

27. The fiber optic connector of claim 3, wherein the fiber optic connector is a portion of a cable assembly comprising a fiber optic cable.

28. The fiber optic connector of claim 27, wherein the fiber optic cable is secured to the retention body with an adhesive, epoxy, or glue.

29. The fiber optic connector of claim 27, wherein the fiber optic cable comprises one or more tensile yarns that are secured to the retention body.

30. The fiber optic connector of claim 27, wherein the fiber optic cable comprises a round cross-section or a non-round cross-section.

31. The fiber optic connector of claim 3, further comprising one or more heat shrinks.

32. The fiber optic connector of claim 3, further comprising a boot support.

33. A fiber optic cable assembly comprising:
a fiber optic cable having an optical fiber and a fiber optic connector, wherein the fiber optic connector comprises:
a retention body comprising a rear end and a front end with a passageway from the rear end to the front end, and at least one retention body securing portion formed in the retention body;
a connector housing comprising a rear end and a front end with a longitudinal passageway extending from the rear end to the front end, and at least one connector housing aperture in the connector housing; and
one or more securing buttons, wherein the one or more securing buttons are sized to fit into the at least one connector housing aperture and the at least one retention body securing portion for securing a portion of the retention body within the connector housing, wherein the one or more securing buttons comprises a larger portion and a smaller portion with the larger portion comprising a round shape and sized for the at least one connector housing aperture and the smaller portion comprises a rectangular shape and sized for the at least one retention body securing portion, and a snap-feature that cooperates with the retention body or connector housing.

34. The fiber optic cable assembly of claim 33, wherein the at least one retention body securing portion of the retention body is aligned with the at least one connector housing aperture when a portion of the at least one retention body is inserted into an opening at the rear end of the connector housing and the one or more securing buttons are disposed in the at least one retention body securing portion and at least one connector housing aperture.

35. The fiber optic connector of claim 33, wherein the fiber optic cable is secured to the retention body with an adhesive, epoxy, or glue.

36. The fiber optic cable assembly of claim 33, the fiber optic cable further comprising one or more strength members secured to the retention body.

37. The fiber optic cable assembly of claim 36, wherein the one or more strength members are secured to the retention body with a crimp band.

38. The fiber optic cable assembly of claim 33, the fiber optic cable further comprising the one or more strength members being folded over a front portion of the retention body.

39. The fiber optic cable assembly of claim 33, wherein the at least one retention body securing portion comprises a first retention body securing portion configured as a notch and a second retention body securing portion configured as a notch disposed on opposing portions of the retention body, and the at least one connector housing aperture comprises a first connector housing aperture and a second connector housing aperture disposed on opposing portions of the connector housing.

40. The fiber optic cable assembly of claim 39, wherein the first retention body securing portion and the second retention body securing portion are disposed about 180 degrees apart.

41. The fiber optic cable assembly of claim 39, wherein the first connector housing aperture and the second connector housing aperture are disposed about 180 degrees apart.

42. The fiber optic cable assembly of claim 33, wherein the at least one connector housing aperture is disposed in a rear portion of the connector housing.

43. The fiber optic cable assembly of claim 33, wherein the at least one retention body securing portion may be aligned with the at least one connector housing aperture when a portion of the at least one retention body is inserted into an opening at the rear end of the connector housing so that the one or more securing buttons comprises an interference fit with the at least one retention body securing portion or the at least one connector housing aperture.

44. The fiber optic cable assembly of claim 33, wherein the retention body securing portion comprises a slot, a groove, a pocket, or an aperture for cooperating with the one or more securing buttons.

45. The fiber optic cable assembly of claim 33, wherein the at least one retention body securing portion comprises a slot.

46. The fiber optic cable assembly of claim 33, wherein an interface between the connector housing and the retention body comprises one or more clocking features for rotational alignment.

47. The fiber optic cable assembly of claim 33, wherein the retention body comprises a front portion forward of the at least one retention body securing portion and a medial portion with medial cross-section greater than a cross-section of the forward portion, wherein the at least one retention body securing portion is disposed in the medial portion.

48. The fiber optic cable assembly of claim 33, wherein the one or more securing buttons comprises a first securing button connected to a second securing button with a connecting arm.

49. The fiber optic cable assembly of claim 33, wherein the connector housing, wherein a part of a rear portion of the connector housing comprises a round cross-section and a part of a front portion of the connector housing comprises a non-round cross-section with a transition region disposed between the rear portion and the front portion, wherein the transition region comprises an asymmetric portion.

50. The fiber optic cable assembly of claim 49, wherein the connector housing comprises a locking feature integrally formed in the rear portion of the connector housing for retaining the fiber optic connector in a complementary device for securing an optical mating of the fiber optic connector.

51. The fiber optic cable assembly of claim 50, wherein the locking feature comprises a ramp with a ledge.

52. The fiber optic cable assembly of claim 49, further comprising a female key that extends into a portion of the transition region for keying the fiber optic connector with a complementary device for optical mating of the fiber optic connector.

53. The fiber optic cable assembly of claim 52, the connector housing further comprising a locking feature integrally formed in the rear portion of the connector housing, and the female key that extends into a portion of the transition region, wherein the locking feature is disposed about 180 degrees apart from the female key.

54. The fiber optic cable assembly of claim 33, further comprising a ferrule having one or more fiber bores.

55. The fiber optic cable assembly of claim 54, further comprising a ferrule holder.

56. The fiber optic cable assembly of claim 55, wherein the connector housing further comprises one or more latch arms for securing the ferrule holder.

57. The fiber optic cable assembly of claim 55, further comprising a resilient member for biasing the ferrule holder to a forward position.

58. The fiber optic cable assembly of claim 33, wherein the fiber optic cable comprises a round cross-section or a non-round cross-section.

59. The fiber optic cable assembly of claim 33, further comprising one or more heat shrinks.

60. The fiber optic cable assembly of claim 33, further comprising a boot support.

61. A method of making a fiber optic cable assembly comprising:

inserting a fiber optic cable having an optical fiber into a passageway of a retention body comprising at least one retention body securing portion formed in the retention body;

securing the fiber optic cable to the retention body;

inserting a portion of the retention body into a connector housing comprising a longitudinal passageway extending from a rear end to a front end, and at least one connector housing aperture so that the at least one connector housing aperture is aligned with the at least one retention body securing portion of the retention body; and inserting one or more securing buttons into the at least one connector housing aperture and the at least one retention body securing portion where the one or more securing buttons comprises a larger portion and a smaller portion with the larger portion comprising a round shape and sized for the at least one connector housing aperture and the smaller portion comprises a rectangular shape and sized for the at least one retention body securing portion, and a snap-feature that cooperates with the retention body or connector housing for securing a portion of the retention body within the connector housing.

62. The method of claim 61, further comprising securing the retention body to the fiber optic cable using an adhesive, epoxy, or glue.

63. The method of claim 61, further comprising securing the retention body to the fiber optic cable using a crimp band.

64. The method of claim 61, wherein the connector housing further comprises a locking feature integrally formed in a rear portion of the connector housing for retaining the fiber optic connector in a complementary device for securing an optical mating of the fiber optic cable assembly.

65. The method of claim 64, wherein the locking feature comprises a ramp with a ledge.

66. The method of claim 61, the connector housing further comprising a female key that extends into a portion of a transition region for keying the fiber optic connector with a complementary device for optical mating.

* * * * *